United States Patent
Alexander et al.

(10) Patent No.: US 12,549,505 B2
(45) Date of Patent: Feb. 10, 2026

(54) AUTOMATION OF ONLINE RESPONSE TO ONLINE QUERY

(71) Applicant: AsqMe Inc., Chappaqua, NY (US)

(72) Inventors: James Alexander, Chappaqua, NY (US); Paul Shustak, Los Angeles, CA (US)

(73) Assignee: AsqMe Inc., Chappaqua, NY (US)

( * ) Notice: Subject to any disclaimer, the term of this patent is extended or adjusted under 35 U.S.C. 154(b) by 0 days.

(21) Appl. No.: 18/913,813

(22) Filed: Oct. 11, 2024

(65) Prior Publication Data

US 2025/0039122 A1 Jan. 30, 2025

Related U.S. Application Data

(62) Division of application No. 18/444,371, filed on Feb. 16, 2024, now Pat. No. 12,149,497.

(60) Provisional application No. 63/608,054, filed on Dec. 8, 2023, provisional application No. 63/529,096, filed on Jul. 26, 2023.

(51) Int. Cl.
*G06F 15/16* (2006.01)
*G06F 16/3329* (2025.01)
*H04L 51/52* (2022.01)
*H04L 67/141* (2022.01)

(52) U.S. Cl.
CPC .......... *H04L 51/52* (2022.05); *G06F 16/3329* (2019.01); *H04L 67/141* (2013.01)

(58) Field of Classification Search
CPC ...... G06Q 50/01; G06Q 20/384; H04L 51/52; H04L 67/141; G06F 16/3329
See application file for complete search history.

(56) References Cited

U.S. PATENT DOCUMENTS

| | | | |
|---|---|---|---|
| 2001/0042117 A1 | 11/2001 | Yoshino et al. | |
| 2012/0036077 A1* | 2/2012 | Quinn, Jr. | G06Q 50/18 705/310 |
| 2013/0211967 A1* | 8/2013 | Ogilvy | G06Q 20/12 705/26.82 |
| 2013/0246300 A1* | 9/2013 | Fischer | G06Q 50/12 705/347 |
| 2015/0026604 A1* | 1/2015 | Mulukuri | G06F 16/9535 715/758 |
| 2018/0367495 A1 | 12/2018 | Kim et al. | |
| 2019/0020606 A1 | 1/2019 | Vasudeva et al. | |

(Continued)

OTHER PUBLICATIONS

International Search Report & Written Opinion; PCT Application No. PCT/US2024/039581; mailed Jan. 10, 2025.

*Primary Examiner* — John B Walsh
(74) *Attorney, Agent, or Firm* — NOVAK DRUCE CARROLL LLP

(57) ABSTRACT

The disclosed technology provides solutions for creating a channel through which a content creator can interact with consumers that access the creator's content over different media platforms. A process of the disclosed technology can include steps for: enrolling a content creator in a communication service for directly communicating with content consumers, identifying a communication session initiation between a content consumer and the content creator, creating a private communication channel, and facilitating transmission of communications between the content consumer and the content creator through the private communication channel. Systems and machine-readable media are also provided.

20 Claims, 47 Drawing Sheets

(56) References Cited

U.S. PATENT DOCUMENTS

| | | | |
|---|---|---|---|
| 2019/0102929 A1* | 4/2019 | Davis | G06T 15/00 |
| 2021/0224858 A1* | 7/2021 | Khoury | G06Q 30/0276 |
| 2024/0211971 A1* | 6/2024 | Cunningham | G06Q 30/06 |
| 2024/0311895 A1* | 9/2024 | O'Brien | G06Q 30/0611 |

* cited by examiner

AUTOMATION OF ONLINE RESPONSE TO ONLINE QUERY

CROSS-REFERENCE TO RELATED APPLICATIONS

This application is a divisional of U.S. Non-Provisional application Ser. No. 18/444,371 filed Feb. 16, 2024, which claims benefit of U.S. Provisional Application No. 63/529,096 filed Jul. 26, 2023, and claims benefit of U.S. Provisional Application No. 63/608,054 filed Dec. 8, 2023, which are incorporated herein by reference.

BACKGROUND

The present disclosure generally relates to communications and, more specifically, to creating a channel through which a content creator can interact with consumers that access the creator's content over different media platforms.

Learning from online content has become a ubiquitous and transformative experience for content consumers, i.e., users, in today's digital age. Through a diverse array of platforms, such as informative websites, video tutorials, interactive courses, and other applicable media platforms, e.g. social media platforms, content consumers have access to a wealth of information spanning various subjects.

Online content offers the flexibility for content consumers to navigate and learn at their own pace, preferences, and schedules. Whether acquiring new skills, expanding knowledge in a specific field, or pursuing formal education, users can choose from a vast repository of content curated by experts and educators worldwide.

Often content consumers have questions unique to their circumstances and related to content that they have consumed. However, it can be difficult for content consumers to efficiently access and answer such questions. In particular, as content creators distribute content across many different communication channels, otherwise platforms, it can be difficult for content creators to answer questions that are received across the different communication channels. Specifically, it can be difficult for content creators to manage communications with different consumers who ask questions in relation to content that is produced by the content creators and distributed across different communication channels.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
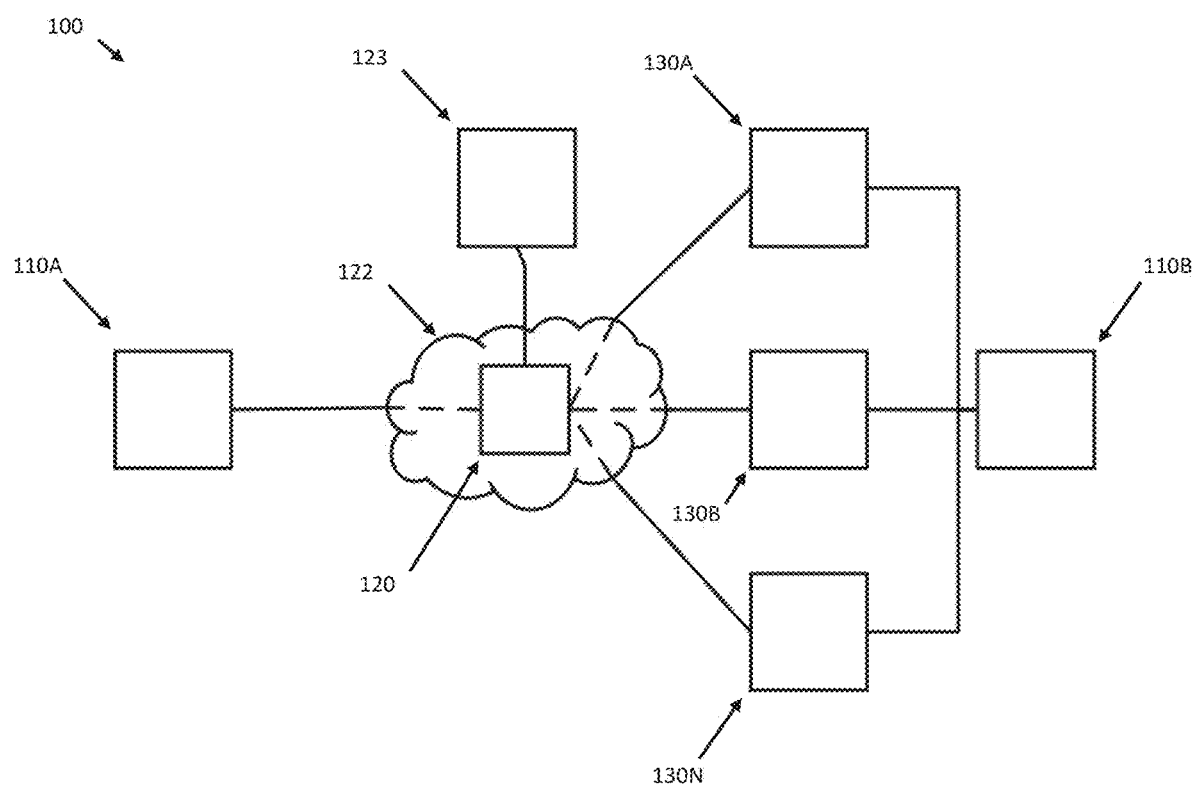
FIG. 1 illustrates an example of a system for implementing certain aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

In general, the examples described herein relate to a centralized channel of communication between a content consumer and content creator across various social platforms of the content creator, so as to facilitate the direct/private exchanging of questions and answers. To facilitate the centralized channel of communication, the content creator can onboard a Direct/Private Communication Platform, a direct, or otherwise private, communication channel in which content consumers can directly or privately communicate with the content creator. As follows, the content creator designates which content platforms or accounts they want to associate with the direct communication platform. The Direct Communication platform can then add to the different content platforms that are associated with the direct communication platform functionalities for directly communicating with the content creator through the Direct Communication platform.

In one instance, the functionalities can facilitate a private channel of communication directly between the content creator and content consumer to exchange questions and answers through the direct communication channel. In turn, this can minimize the content creators' effort in searching and answering content consumer questions across different platforms through which the questions are generated. Specifically, a content creator can manually search through all dedicated comment sections and direct message sections that are aggregated across the different platforms. Another benefit is that content consumers can directly ask their questions on that social media platform without navigating to the content creator's message or comment section. Furthermore, if the content consumer has an urgent question, a direct or otherwise live communication session, can be established between the content creator and content consumer.

The Direct Communication platform can allow the content creator to select different tiers of communication in conjunction with the questions asked. Each tier can be a different medium of communication with the content creator such as a first tier can be communications via text, a second tier can be communications via audio, and a third tier can be communications via video, audio and/or text. For example, the content consumer can request that the question is answered within a set time limit, immediately, and/or on demand live communications such as audio or video conference. The use of different monetary models may vary depending on the level of communication offered and/or selected.

Another aspect of the present technology is that the Direct Communication platform can scan a content creator's social platform for questions posted or asked and aggregate the questions so as to provide them to the content creator. For example, a content consumer can post a question in a comment section of a creator's video that is distributed through an online video sharing platform. Further in the example, the Direct Communication platform can identify the posted question and present it to the content creator. A benefit this provides is minimizing/eliminating the need of the content creator to constantly search a platform for questions posed by content consumers. As follows, this can reduce or otherwise eliminate the chances that the content creator overlooks an asked question.

Where questions are presented in a non-native language to the content creator, or are otherwise not presented in a form that is understood by the content creator, then the Direct Communication platform can utilize an active translation process. The Direct Communication platform can translate questions and attachments into a form that can be understood by the content creator. As follows, the platform can translate the content creator's answer back into the content consumer's native language or a form that is understandable by the content consumer. Moreover, where audio or video responses are submitted, the Direct Communication platform can translate such as well.

Other aspects of the present technology include an AI/ML generative response, discussed in detail below. In one example, the AI/ML generative response utilizes content data from the content creator's social platforms and corpus of content. Optionally, the content creator can pool with other content creators to share their corpus of content. This data can be used by the AI/ML generative response to generate responses for the content creator. The answers submitted to the content consumers can then be rated and used to further train the AI/ML generative response and/or stored on the creator's corpus of content.

Now turning to FIG. 1, an example of a system facilitating a centralized communication channel between a content consumer and content creators is illustrated. For example, in FIG. 1, terminals 110A and 110B interact with a network via communication module. The network can be a server 120 and/or a cloud server 122 or the combination thereof. Additionally, the network can include more than one server or cloud server which can be in sync with one another. The terminal 110A and 110B can be an electronic device capable of interacting with a server 120 via data connection. For example, a cellular device, computer processing device, and the like. The communication module can include a Wireless Fidelity (Wi-Fi) module, Ethernet or landline module, or any other module capable of communicating with the network.

The terminals 110A and 110B together with the network, i.e., server 120 and/or cloud server 122, can facilitate communications between the terminals 110A and 110B. For example, terminal 110A can represent content creators and terminal 110B can represent content consumers. In at least one aspect, the system 100 can include the content creator's social platforms 130A-N, e.g., Youtube®, FaceBook®, LinkedIn®, Instagram, Twitter®, TikTok®, and the like. The social platforms 130A-N with the use of the Direct Communication platform, discussed in detail below, can initiate direct/private communications between the content creators 110A and content consumer 110B. For example, the Direct Communication platform can bridge the content creators and the content consumer to communication with each other directly. In at least one example, communications from the various social platforms 130A-N can be channeled to a single communication channel. For instance, questions posed on Youtube® and LinkedIn® are all pulled into the direct communication platform. As follows, the questions pulled from the various social platforms 130A-N can be accessible by both terminals 110A and 110B and can be answered by the content creator directly.

The use of artificial intelligence (AI) 123 and/or machine learning models can be paired with the cloud server 122 and/or server 120. In some aspect, the cloud server 122 and/or server 120 can be incorporated on the terminals, e.g., computers, laptop, cellular device, or the like. The AI 123 can utilized by the Direct Communication Platform in conducting its operations discussed in detail below.

Figure 2A:
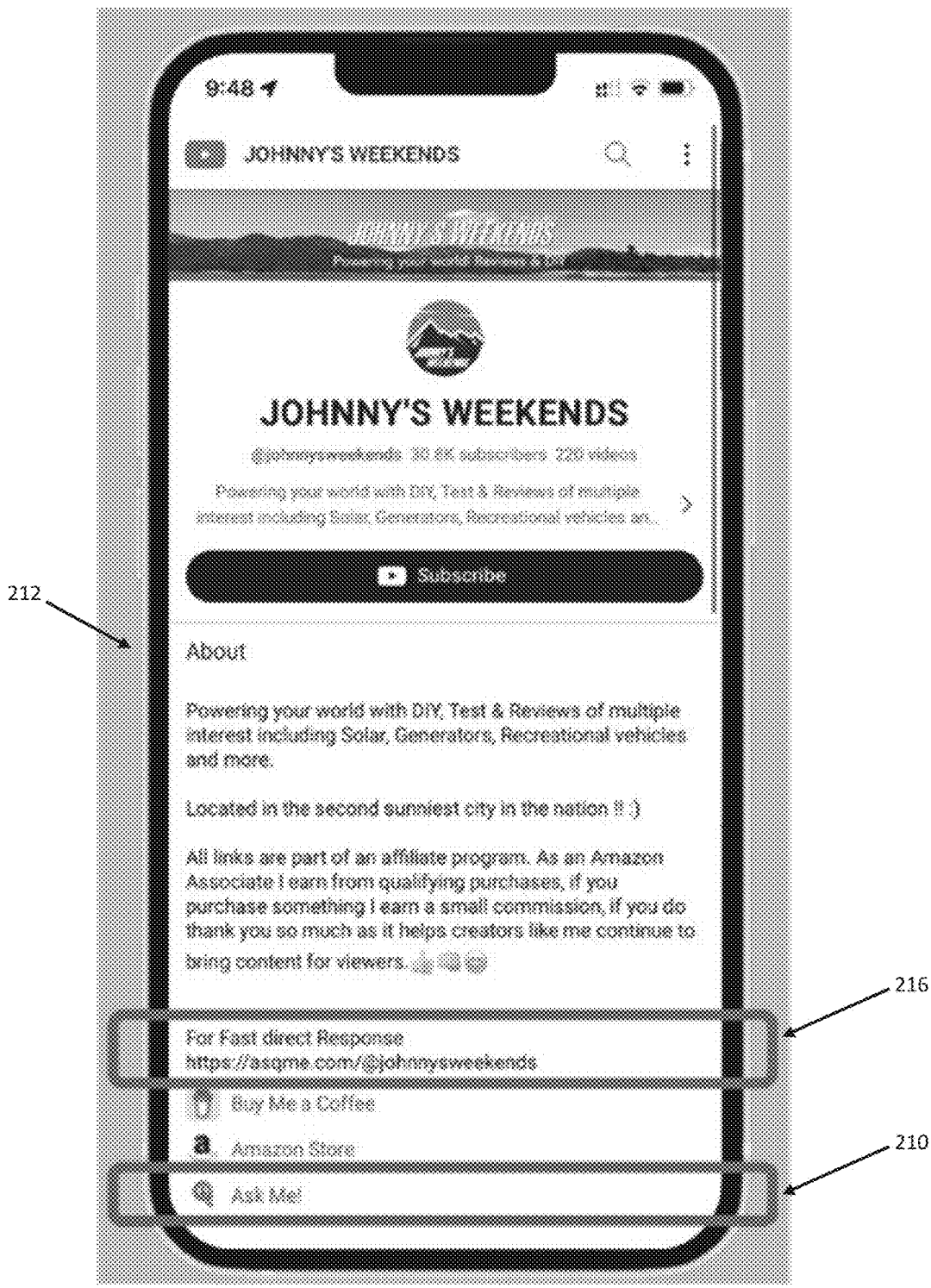
FIG. 2A through FIG. 2C illustrate example interfaces implementing certain aspects of the present disclosure.
Figure 2B:
Figure 2C:
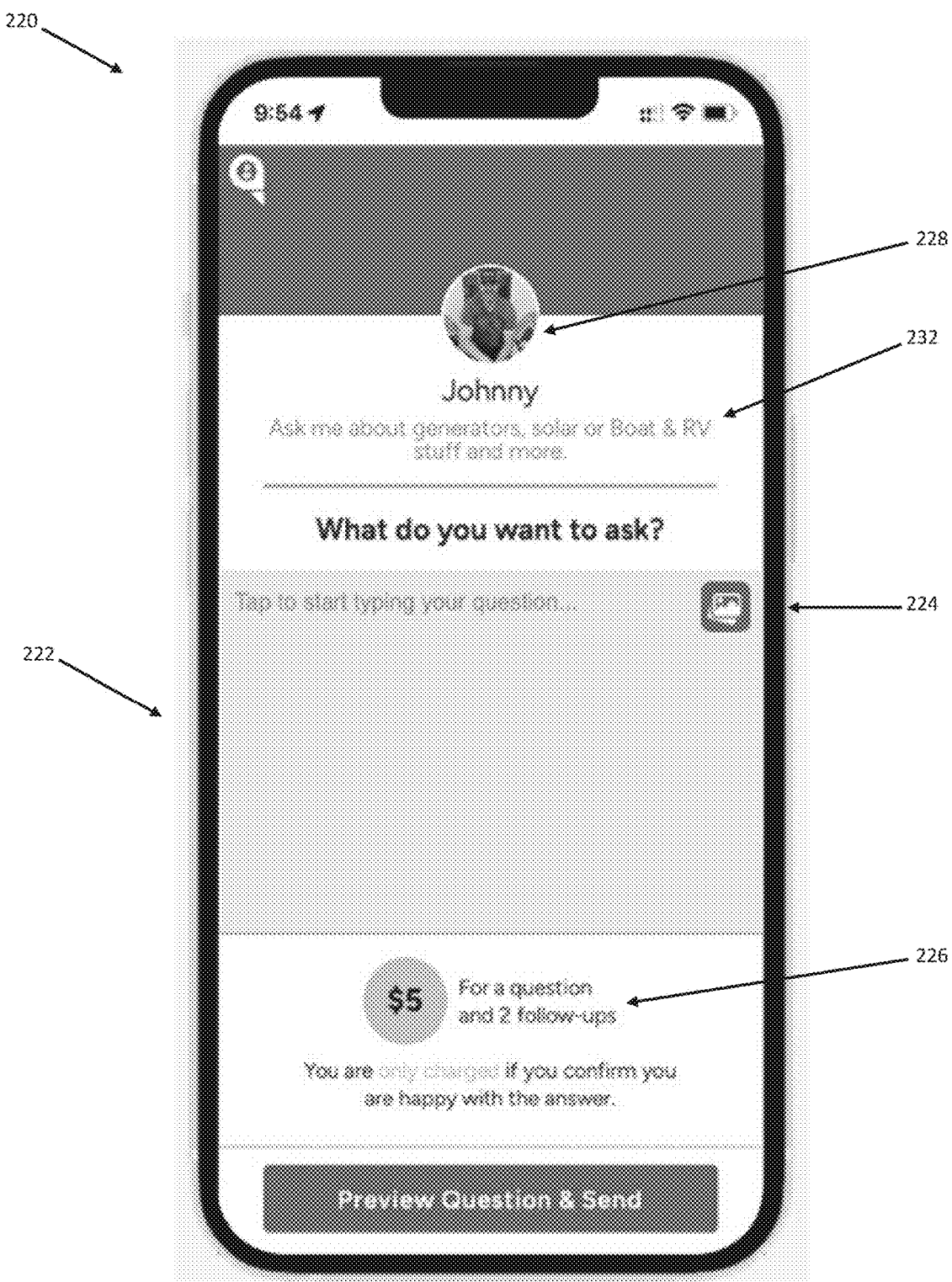

FIG. 2A through FIG. 2C illustrate example interfaces implementing certain aspects of the present disclosure. Specifically, the interfaces shown in FIGS. 2A through 2C include actionable icons 210 that can be selected by a content consumer to send a question to a content provider designating varying degrees of urgency and/or cost. In some instances, the actionable icons 210 can be placed in the content creator's biography 212 and/or the content description section 214. By way of example, FIGS. 2A through 2C illustrate the use of the interfaces on the social platform YouTube®. The actionable icons 210 are not limited to just icons but can be in the form of links 216 or other items that a user can interact with to perform one or more functionalities. Other forms of redirecting a content consumer to the Direct Communication platform can be implemented.

Upon selecting the actionable icons 210 or links 216, the content consumer is redirected to the Direct Communication platform questionnaire page 220 as for illustration, displayed in FIG. 2C. On the questionnaire page 220, the content consumer can submit their question(s) into the dedicated questionnaire section 222. Further, the content consumer can add necessary attachments with their question(s), for instance, via an actionable attachment icon 224. In at least one aspect, the questionnaire page 220 can include a time stamp of the content or capture the content of interest with the submitted question (not displayed).

The questionnaire page 220 can display the content creator's image 228, portfolio icon, or the like, and contain a synopsis of the content creator's knowledge/expertise 232. Additionally, the page 220 can include a payment indication 226 for directly communicating with the content creator. By way of example, the content consumer can be charged to ask their question. Forms of payments can be monetary or non-monetary payments. In one aspect, the content consumer can be charged only upon confirmation that the content consumer is satisfied with the answer. Other methods of payment models or charging models are discussed below.

A content creator, as used herein, can include an entity that creates content which is distributed across various platforms. For example, a content creator can be an entity who generates and shares information, entertainment, or educational material with content consumers, e.g., audience or viewers of the content. Particular examples of content creators include experts, professionals, tradespeople, influencers, doctors, lawyers, plumbers, electricians, craftsmen, engineers, and the like.

In submitting a question to the content creator, the content consumer has the ability to append attachments with their questions. By way of example, attachments can include supplementary or additional items, documents, files, or objects that are linked, appended, or included with a main form of communication. This main form of communication can include an applicable form of communication, such as an email, a message, a document, or the like. For example, particular attachments can include files, images, links, videos, or a combination thereof.

Figure 3:
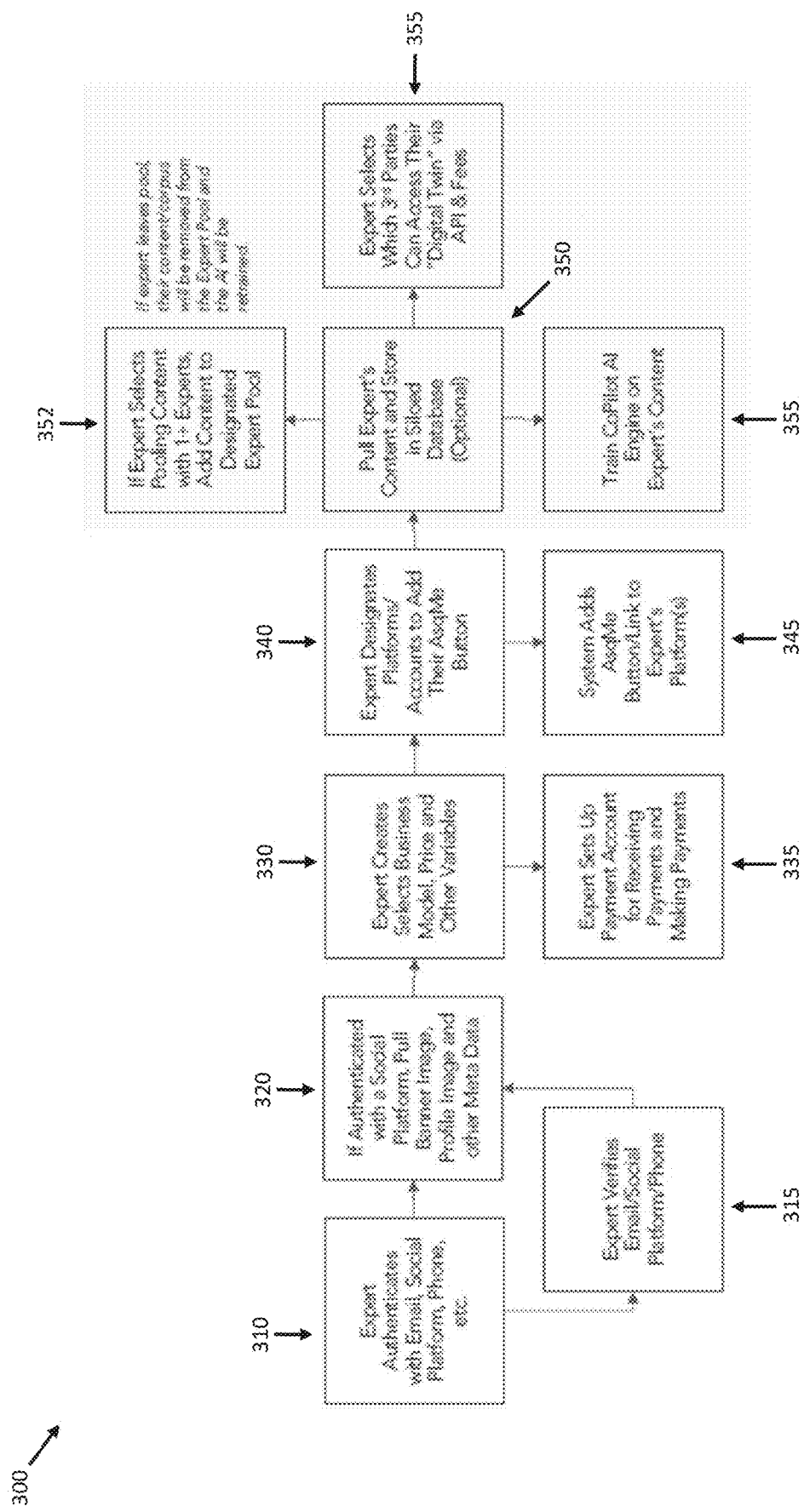
FIG. 3 is a flowchart illustrating an example process for implementing an onboarding platform for content creators, experts, and influencers, according to some examples of the present disclosure.

FIG. 3 is a flowchart illustrating an example process 300 for implementing an onboarding platform for content creators, according to some examples of the present disclosure. The method shown in FIG. 3 is provided by way of example, as there are a variety of ways to carry out the method. Additionally, while the example method is illustrated with a particular order of operations, those of ordinary skill in the art will appreciate that FIG. 3 and the modules shown therein can be executed in any order and can include fewer or more modules than illustrated. Each module shown in FIG. 3 represents one or more operations, processes, methods or routines in the method.

The process 300 begins at operation 310 where the content creator selects their form of authentication. Examples of forms of authentication include email, social platforms (i.e., social media), phone, biometrics, or the like. The content creator is not limited to only one form of authentication and may select forms of authentication that are desirable to the content creator.

In one aspect, the process 300 may optionally proceed to 315 where the content creator verifies their form of authentication. For example, verifying can be achieved by confirming or validating the form of authentication, e.g., email, social platforms, phone, or the like. The process 300 can proceed to 320 to collect data from the content creator's social media if the form of authentication is with a social platform. In at least one example, the collected social media data can include user profile data, content data, interaction data, connection data, temporal data, location data, and device and platform information. Specific examples of social media data include banner images, profile images, usernames, bio/descriptions, location, text posts, photos, videos, audio clips, link shared, hashtags used, likes or favorites, comments, share or retweets, reactions (e.g., emojis), tagging other users, friends or followers, following or friend lists, group or communities joined, mutual connections, date and time of posts, activity history, check-ins or location tags, geotagged posts or photos, type of device used (e.g., mobile, desktop) operating system, browser information, engagement rates, and ad clicks and impressions.

At 330, the content creator can create and select business models, prices, and other variables suitable to the content creator's needs. Upon selection of a business model or plan, the content creator can set up a payment account for receiving payments and making payments at 335. The process 300 can proceed to 340 where the content creator designates which platforms or accounts they desire to associate with the direct communication platform. Specifically, this can include selecting which platforms will include a link or other functionalities for communicating with the content creator through the direct communication platform. In one instance, the functionalities can facilitate a channel of communication directly between the content creator and content consumer to exchange questions and answers. The process 300, can proceed to 345 where the system adds the functionalities to the content creator's platform. In other examples, the functionalities can take the form of a scannable QR code or scannable images with encoded information that can be quickly processed, allowing content consumers to access relevant content, perform transactions, and obtain additional information associated with the scannable images. As follows, the scannable functionalities can be appended within a book or magazine to allow the content consumer to readily ask the content creator questions.

Optionally at 350, the process 300 can access the content creator's content, collect social media data, and store it in a database. At 355, the content creator's data and content can be utilized to train machine learning models and/or artificial intelligence. AI/ML generative response is one specific example of a machine learning model the process 300 can utilize. In one example, the machine learning model is trained to allow computers to make predictions and decisions or identify patterns based on the content creator's data and content. Optionally, the content creator can have their data and content pooled with other content creators/experts at 352. This can be beneficial as the machine learning model now has additional data and content for further training and otherwise improving the model. If the content creator chooses to leave the pool, their content/corpus will be removed from the expert pool and the AI/ML will be retrained with the exclusion of the removed content creator's content/corpus.

The process 300 can proceed to 360 where the content creator selects which third party can access their digital twin via API and Fees. In one aspect, a digital twin is AI/ML representation of the content creator, encompassing the content creator's personal corpus of content and blending it with LLM to provide a personal answer via the AI/ML generative response.

Figure 4:
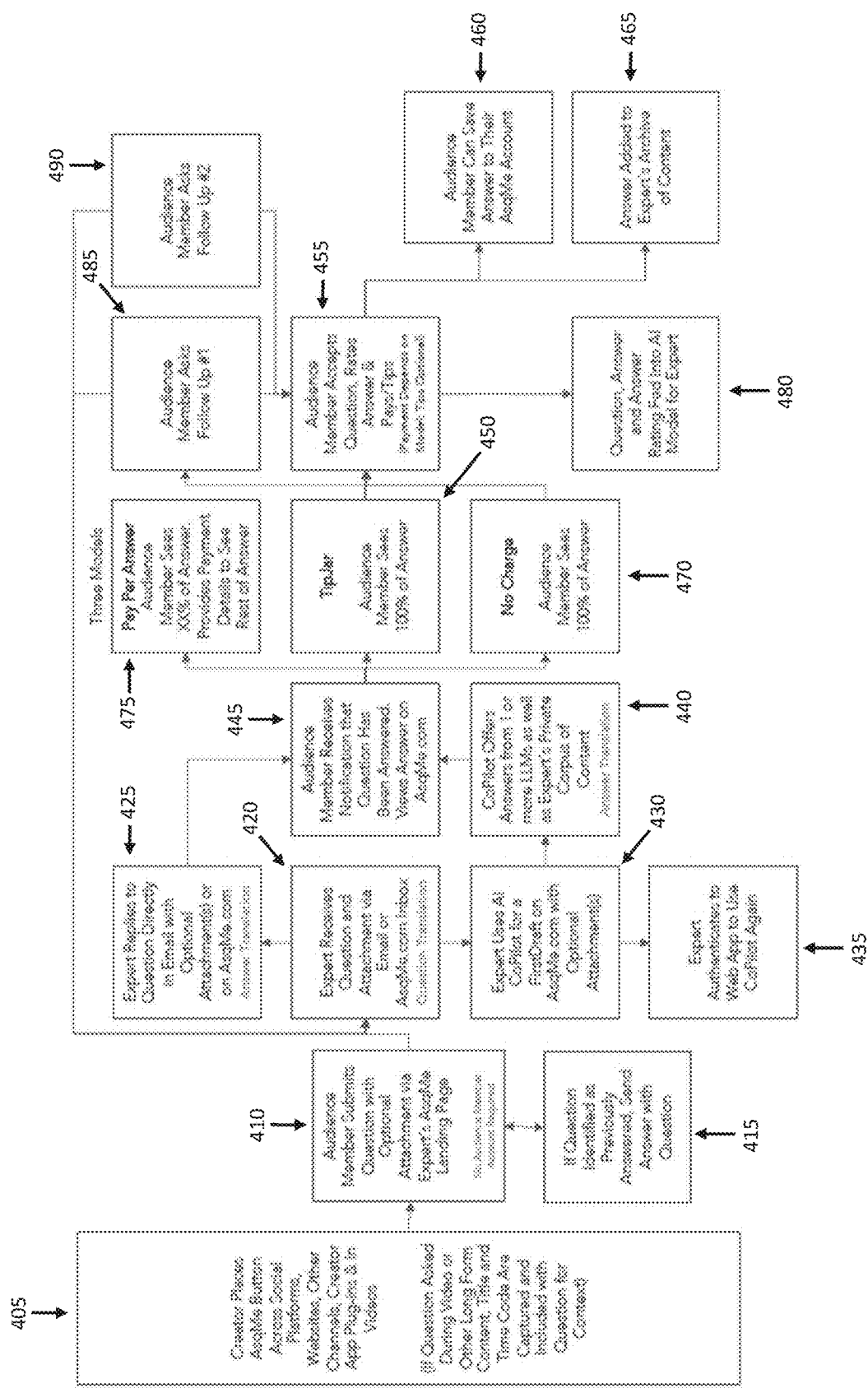
FIG. 4 is a flowchart illustrating an example process for implementing a centralized forum in communicating among various social media platforms, according to some examples of the present disclosure.

FIG. 4 is a flowchart illustrating an example process 400 for implementing a centralized forum in communicating among various social media platforms, according to some examples of the present disclosure. The method shown in FIG. 4 is provided by way of example, as there are a variety of ways to carry out the method. Additionally, while the example method is illustrated with a particular order of operations, those of ordinary skill in the art will appreciate that FIG. 4 and the modules shown therein can be executed in any order and can include fewer or more modules than illustrated. Each module shown in FIG. 4 represents one or more operations, processes, methods or routines in the method.

The process 400 begins at operation 405 where an functionalities is placed across the content creator's social platforms including websites, channels, app plug-ins, and/or embedded in videos. In other aspects, the functionalities can be placed on tangible contents such as textbooks, magazines, newspapers, DIY kits, manuals, instructions, and the like. If a question is asked during a video or other long-form content, the metrics, e.g., title and/or time code, are captured and provided with the question for context. If a question is asked from a tangible content, the tangible references or pincite is provided with the question. For example, the paragraph, page, title, or the like of a book. This context information can be provided to the content creator and/or AI/ML generative response to formulate a draft response.

The process 400 can proceed to operation 410. At operation 410, the content consumer can submit question(s) with the option of including one or more attachments. In one aspect, the attachment may be attached via the content creator's direct communication platform landing page. For example, the direct communication platform landing page can be a redirect from the functionalities that takes the content consumer to a direct communication channel to ask their question and upload attachments. A direct communication channel, as used herein, provides a mode of communication that includes the direct exchange of dialogues or information between two parties, e.g., content consumer and content creator. Facilitating the transmission of one or more communications between the content consumer and the content creator can be completed via, in at least one example, a private communication channel. Private communication channels include, but not limited to, a short message service communication channel, a text communication channel, a video communication channel, an augmented reality communication channel, a virtual reality communication channel, or a combination thereof. Additional examples of private communication channels can include any channel capable of transmitting audio or visual communications including verbal, written, and non-verbal, or a combination thereof. By way of example, specific communication channels can include phone, emails, website chat, online messaging platforms, video conferencing, social media, and/or live chat.

At operation 415, the submitted question can be analyzed to determine whether the question asked has been previously answered. The analysis, in some instances, can be conducted via the AI/ML generative response or another applicable AI/ML. If the submitted question has been previously answered, the answer to the previously asked question is automatically provided to the content consumer. In other examples, the content creator can first view and approve the automatic response prior to content consumer receiving the automatic response. Otherwise, the process 400 can proceed to operation 420 where the content creator receives the question and attachment. Retrieval of the question and attachment can be via the content creator's email, a dedicated inbox of the direct communication platform, text message, or other communication channels.

After a content creator receives a question and/or attachments to the question 420, the question undergoes a screening to determine whether necessary translations are to be conducted. In some examples, the determination to translate the received question is determined when the received question is in a non-native language with respect to the content creator. The questions can come in the form of text, audio, and/or video. When a translation is determined, the received question is then translated into the native language or a form that can be understood by the the content creator prior to presenting the received question to the content creator. In some examples, the translation of questions in the form of audio and video can begin with converting the audio and video into text. After the text conversion, the text can then be converted into the native language of the content creator. The use of AI, ML, localization platforms, language translation APIs, and/or applicable techniques can be utilized to facilitate the translation of texts to the native language of the content creator. In at least one example, the determination and translation process can be done automatically.

The translation process is not limited to the received questions but can be applied to any attachments appended to the received questions.

At 425, the content creator can reply directly to the question with optional attachment(s). In some instances, the reply can be facilitated via email or on the direct communication platform. Alternative to 425, the process 400 can proceed to operation 430. At operation 430 the content creator can utilize AI/ML generative response (e.g., AI/ML) to generate a first draft response with optional attachment(s). The optional attachments can be automatically generated with necessary attachments via the AI/ML generative response. For example, the AI/ML can generate a unique image or video specific to the content consumer's question and attachments provided. Specifically, if a content consumer has a question about wiring a circuit, the AI/ML generative response can generate a unique schematic and step by step image instruction for the content consumer. In at least one example, the use of AI/ML generative response is facilitated on the direct communication platform. At operation 435, the content creator can authenticate the direct communication platform to use the AI/ML generative response again in generating additional draft responses.

At operation 440, the AI/ML generative response can offer answers from one or more large language models and/or in conjunction with the content creator's private corpus of content. Once the content creator replies either by responding directly or with the use of AI/ML generative response, the process 400 proceeds to operation 445 where the content consumer receives notification that their question has been answered. In one instance, the answer can be viewable on direct communication platform. In another example, the answer can be published in its original social platform that it was derived from.

Following the submission of a response from the content creator, the process 400 can proceed to screen the content creator's response to determine whether the language of the response is native or non-native to the content consumer. In instances where the content creator's response is in a non-native language, a translation is conducted on the response to the native language of the content consumer, prior to displaying the content creator's response. The reversion translation process is not limited to the response but can be applied to any attachments supplied with the content creator's response. The process of translating can be done automatically with the implementation of AI, ML, localization platforms, language translation APIs, and/or applicable techniques. In one aspect, where the content creator's response is in text format, the response can be converted to audio and/or video format. For example, the use of text-to-speech tools may be implemented to convert text to speech or other applicable techniques. In another example, AI and ML can be implemented to convert text to a video or visual response.

The process 400 can then proceed to alternative pay models. By way of example, a three-way alternative pay model may be implemented. The first alternative is a pay-per-answer model 475 where the content consumer previews a portion of the answer and provides payments to see the entire answer. The second alternative is a TipJar model 450 where the content consumer can view the entire answer and provide a gratuitous payment. The third alternative is a No Charge model 470 where the audience can view the entire free of charge. The implementation of which model can depend on the type of question, complexity of the question, frequency of the question, or the content creator's selection. In at least one aspect, such implementation can be done automatically via the direct communication platform.

At operation 455, the content consumer can accept the question, rate the answer, and pay/tip depending on which model is implemented. Follow-up questions are facilitated at operation 485 and 490. In some aspects, the process 400 can provide necessary follow-up questions to answer or exhaust questions the content consumer may have. Again, pay models may be implemented for each follow-up question. At operation 480, the question, answer, and answer rating can be fed into the AI/ML model (e.g., AI/ML generative response) for further training of the model.

At 460, the content consumer may save or archive the answer to their specific account on the direct communication platform. The answer can be added to the content creator's archive of content at 465.

Figure 5A:
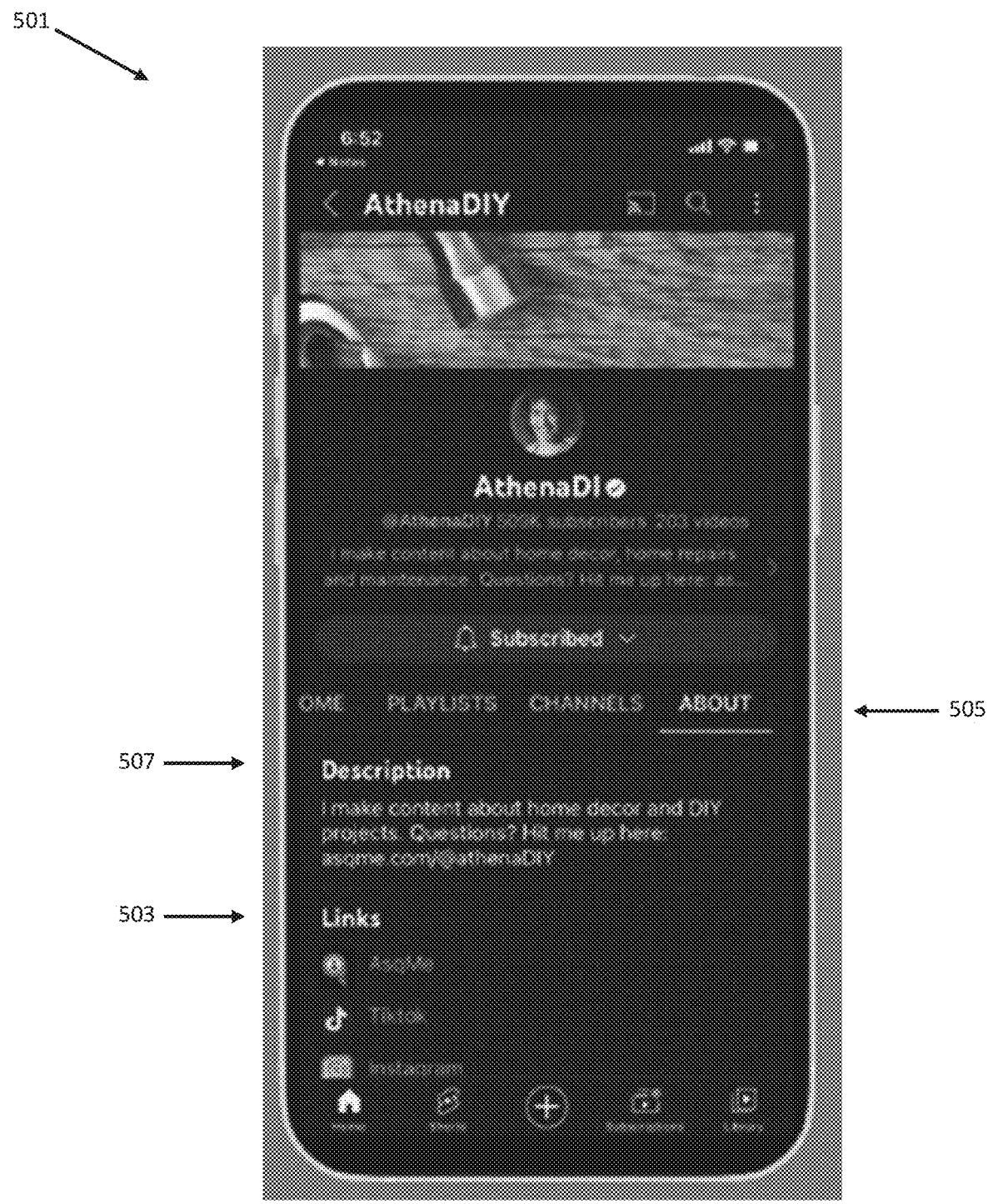
FIG. 5A through FIG. 5E illustrate examples of interfaces implementing aspects of the present disclosure.

FIG. 5A through FIG. 5E illustrate examples of interfaces implementing aspects of the present disclosure. In particular, where creators promote their functionalities on their social media, consumers (audience members) can submit questions via the content creator's profile page, as well as notify creators of new questions. FIG. 5A is an example of promoting the functionalities taking the form of either a link or icon on a content creator's social platform. As an illustration, one of the content creator's social platforms can be their YouTube®) account 501. Promotion of the content creator's direct communication platform can be in the form of inserting functionalities such as a link or redirecting means on their social platforms. For example, the content creator can insert their functionalities 503 in their social platform biography 505 or description section 507. Additionally, the content creator can place an interactive icon on their social platform or embed an interactive link or icon directly on their content (not illustrated).

Figure 5B:
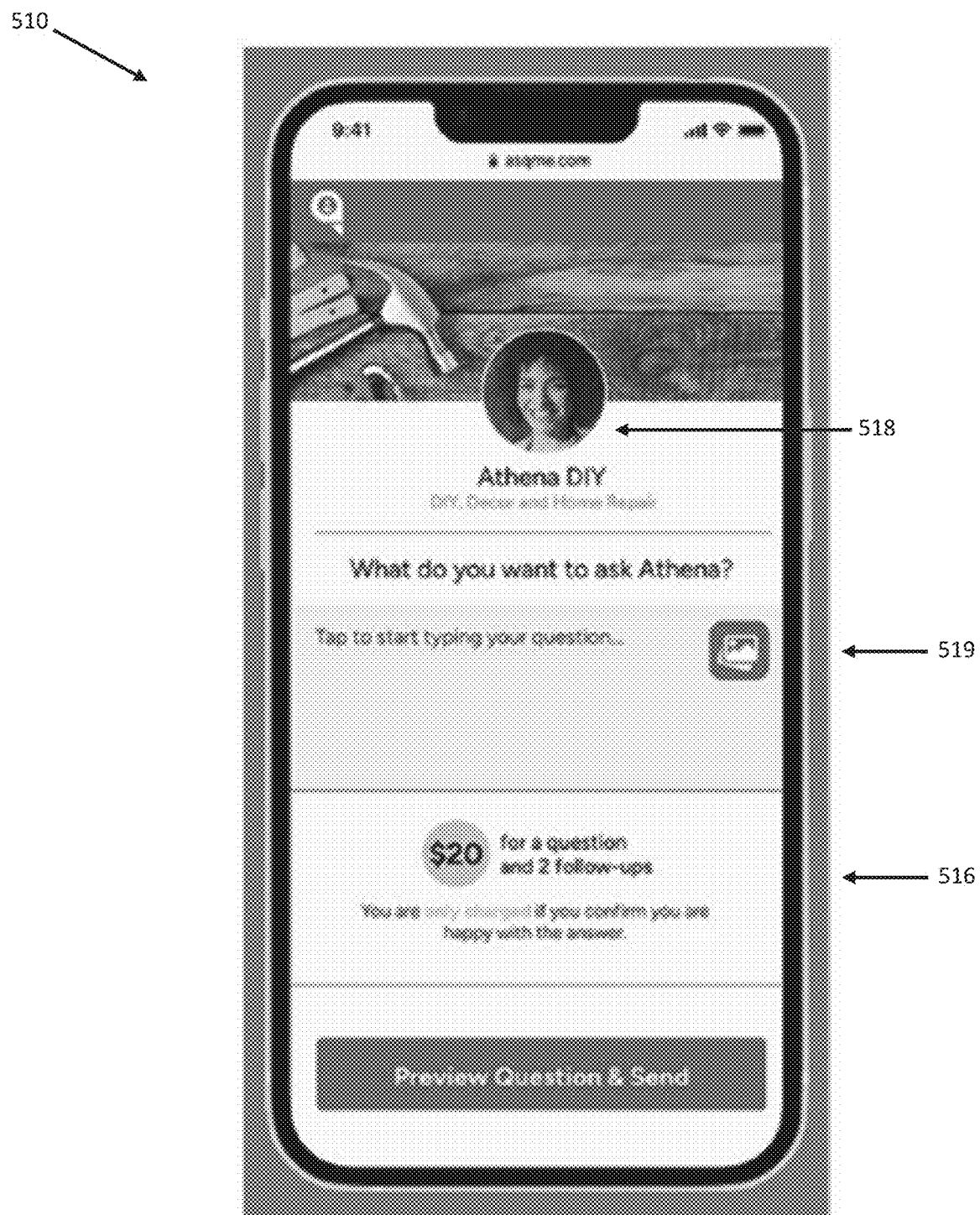

FIG. 5B is an example of a content consumer submitting questions via the content creator's personal direct communication platform, e.g., the content creator's questionnaire page 510. The questionnaire page 510 can display the content creator's image 518, portfolio icon, or the like. By way of example, the content consumer can be charged to ask their question or additional follow-up questions by an indicator 516. Forms of payments can be monetary or non-monetary payments. In one aspect, the content consumer can be charged only upon confirmation that the content consumer is satisfied with the answer. Other methods of payment models or charging models as discussed above can be implemented.

In submitting a question to the content creator, the content consumer has the ability to append attachments with their questions), for instance, via an actionable attachment icon 519. By way of example, attachments can include supplementary or additional items, documents, files, or objects that are linked, appended, or included with a main form of communication. For instance, particular attachments can include files, images, links, videos, or a combination thereof. The main form of communication can include an applicable form of communication, such as be an email, a message, a document, or any other form of communication or object.

Figure 5C:
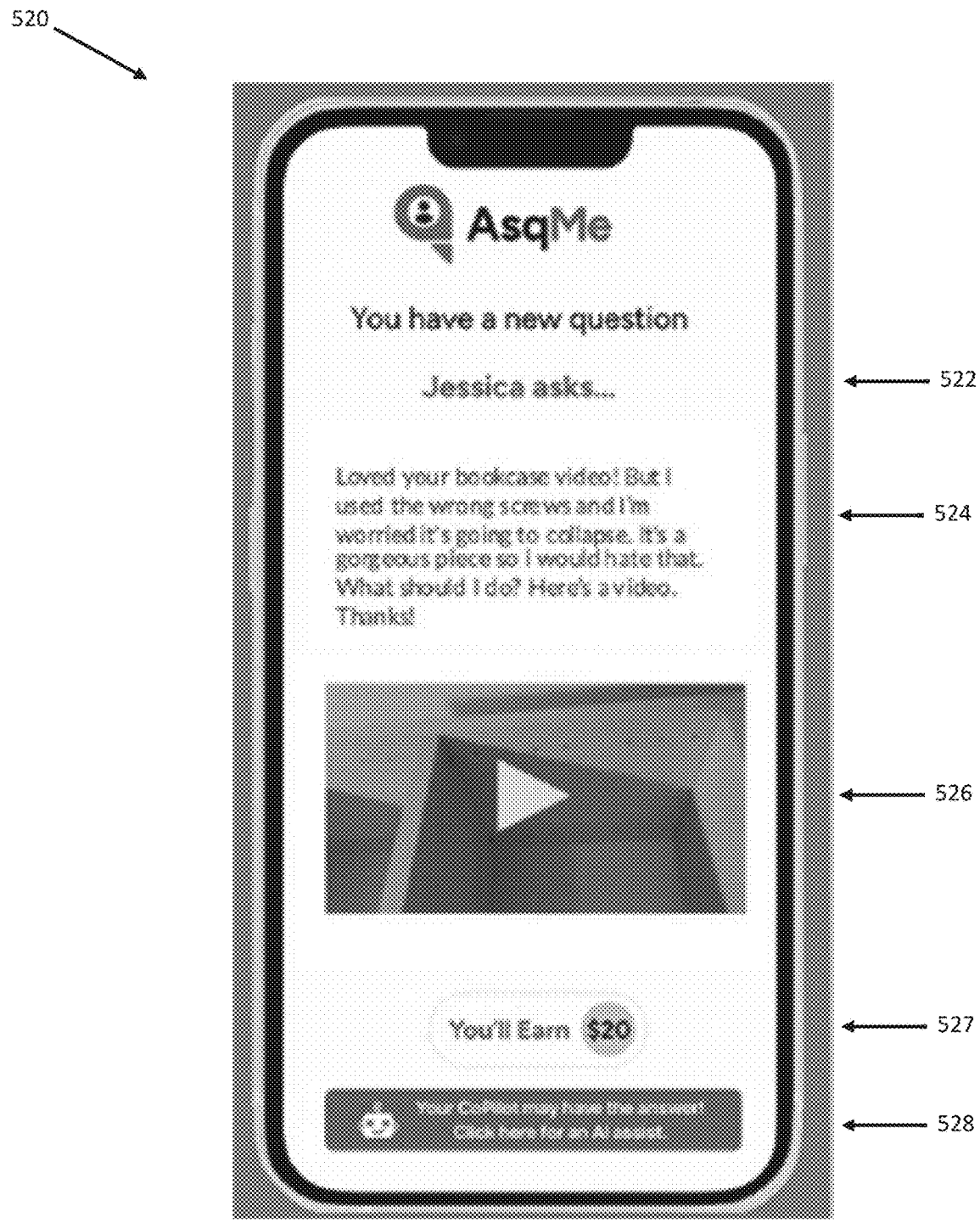
Figure 5D:
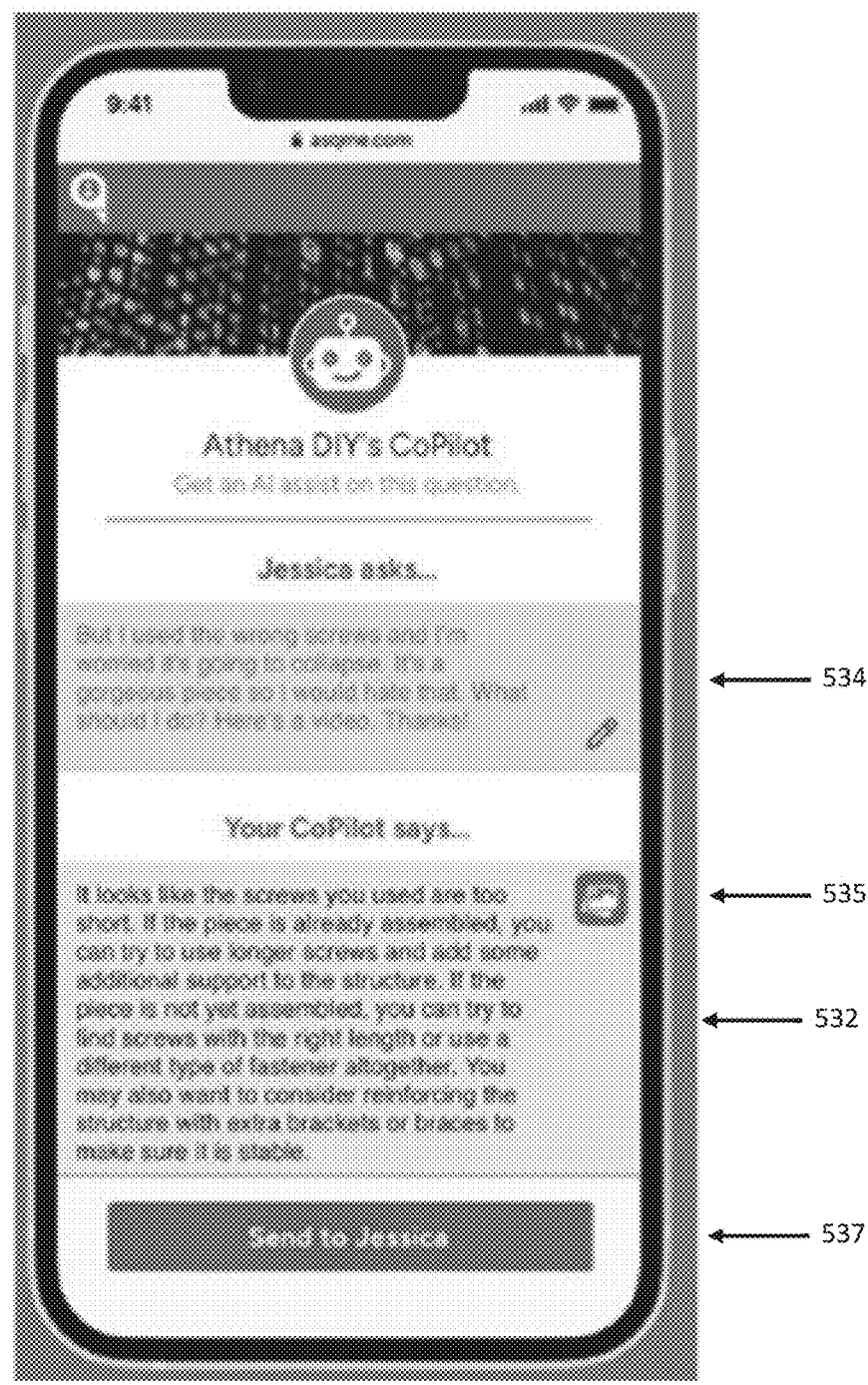
Figure 5E:

FIG. 5C is an example of a preview/notification 520 to the content creator of a question submitted. The preview 520 can be illustrated on the direction communication platform as illustrated in FIG. 5C. In at least one example, the preview 520 can include the content consumers username 522, name, alias, and the like. The content creator's question 524 is displayed in the preview 520. The preview 520 can include the content creator's attachment 526. For example, and as illustrated in FIG. 5C, a video recording is attached alongside with the question pertaining to trouble shooting a bookcase assembly. The preview 520 can illustrate a question that the content consumer provided. As discussed above, the preview 520 can provide the content creator with AI/ML generative response 528 to generated a draft response.

5D demonstrates the use of AI/ML generative response to answer (or begin an answer) to a consumer's question. The direct communication platform in displaying the AI/ML generative response generated answer 532 can display the consumers question 534 in conjunction with the AI/ML generative response generated answer 532. The answer 532 can be editable by the content creator to further redefine the generated answer 532 to the creator's satisfaction or the content creator can approve the answer 532. In at least one example, attachments can be attached via the actionable attachment icon 535. Upon approval by the content creator, the answer 532 can be submitted 537 to the content consumer.

5E illustrates a mechanism for capturing payment/billing information before the answer is revealed to the consumer. A portion 542 of the answer can be previewed by the content consumer alongside with the payment/billing information inquires 544. The inquires 544 can include credit card data, bank account information, and the like. In at least one aspect, upon submitting and processing the payment/billing information 544, the remaining answer can be displayed to the content consumer. In inserting the payment/billing information 544, the content consumer can optionally insert a gratuitous tip depending on the alternative pay models that is implemented as discussed above. Additionally, in some aspects, a human verified badge 546 can appear on the partial answer preview to the content consumer. The human verified badge 546 or a suitable image or icon can serve as a verification that the content creator either approved the answer or manually drafted/edited the answer.

Figure 6:
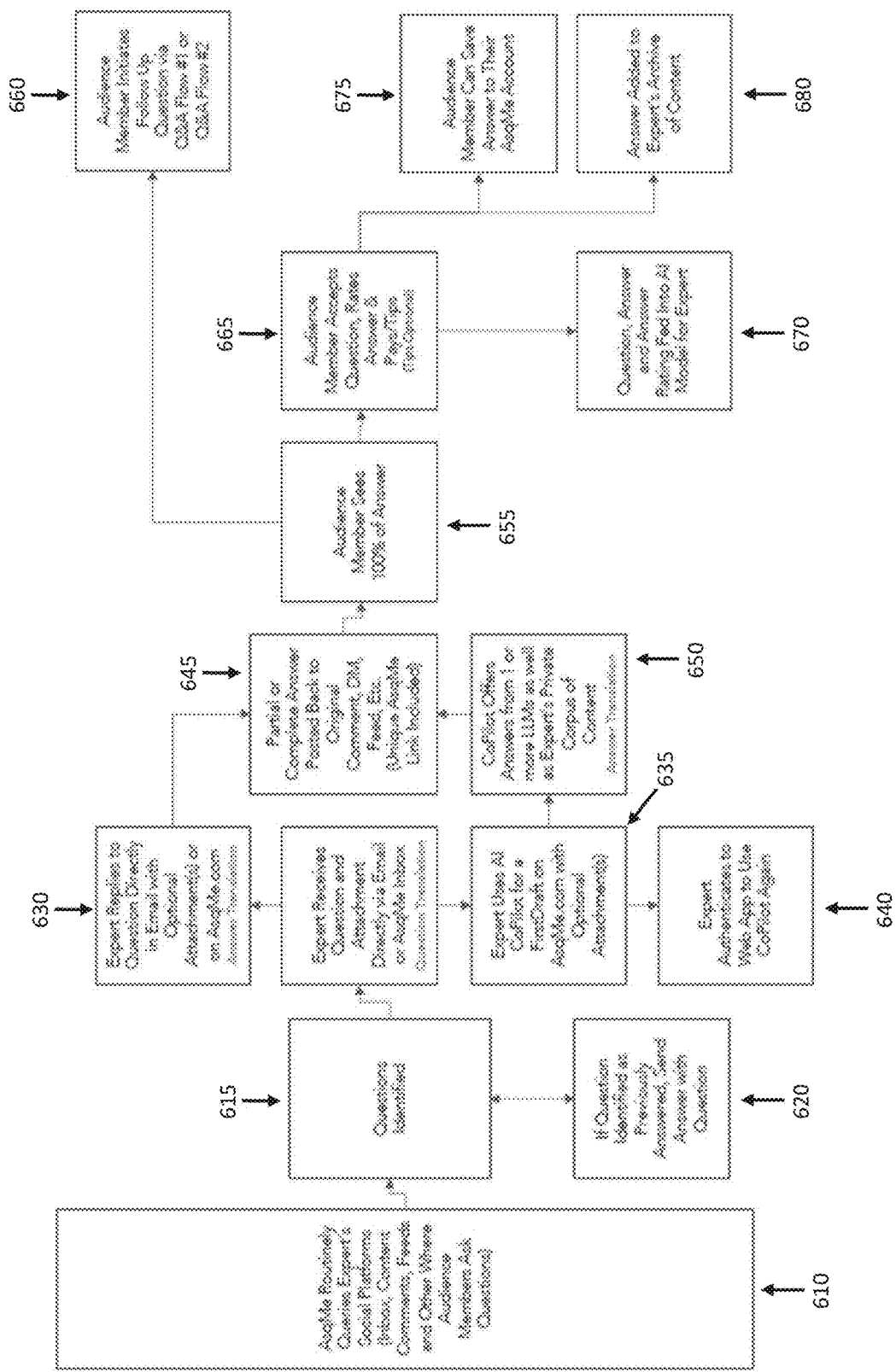
FIG. 6 is another example of a flowchart illustrating an example process for implementing a centralized forum in communicating among various social media platforms, according to some examples of the present disclosure.

FIG. 6 is another example of a flowchart illustrating an example process 600 for implementing a direct communication platform in communicating among various social media platforms, according to some examples of the present disclosure. The method shown in FIG. 6 is provided by way of example, as there are a variety of ways to carry out the method. Additionally, while the example method is illustrated with a particular order of operations, those of ordinary skill in the art will appreciate that FIG. 6 and the modules shown therein can be executed in any order and can include fewer or more modules than illustrated. Each module shown in FIG. 6 represents one or more operations, processes, methods or routines in the method.

The process 600 can begin at operation 610 where the direct communication platform routinely queries the content creator's platforms and the derived collected social media data for questions posed by content consumers. For example, the direct communication platform can query the content creator's inbox, comment sections, feeds, and other sections within the social platforms where content consumers ask questions. Examples of techniques for querying questions include APIs and Automation, the use of AI/ML, or other applicable techniques.

At operation 615, questions are identified and the process can proceed to operation 620 where the submitted question can be analyzed to determine whether the question asked has been previously answered. If the submitted question has been previously answered, the answer to the previously asked question is automatically provided to the content consumer or upon approval by the content creator. Otherwise, the process 600 can proceed to operation 625 where the content creator receives the question and attachment. Retrieval of the question and attachment can be via the content creator's email, a dedicated inbox on the direct communication platform, text message, or other form of communication channels.

At operation 630, the content creator can reply directly to the question with optional attachment(s). In some instances, the reply can be facilitated via email, text message, or on the direct communication platform. Alternative to operation 630, the process 600 can proceed to operation 635. At 635 the content creator can utilize an AI/ML generative response to generate a first draft response with optional attachment(s). AI/ML generative response can generated necessary attachment along with the generated answer. For example, AI/ML generative response can generated an animated video with a step-by-step process to assemble a furniture that the content creator asked. In at least one example, the use of AI/ML generative response is facilitated on the direct communication platform. At 640, the content creator can authenticate the direct communication platform to use AI/ML generative response again in generating additional draft responses. At operation 650, AI/ML generative response can provide answers from one or more large language models and/or in conjunction with the content creator's private corpus of content.

At operation 645, the content creator's answer(s), completed or partial answer(s), is posted back where the original question was derived with a unique functionalities link. For example, if the direct communication platform queried the question from a comment section, the answer is posted on the comment. The unique functionalities link can redirect the content consumer to the direct communication platform to view the entire answer, submit a follow-up question(s), and/or provide payment.

Once the content consumer views the entire answer 655, the process proceeds to operation 665 where the content consumer accepts the question, rates the answer, and pays/tips at their option. Follow-up questions are facilitated at operation 660. In some aspects, the process 600 can provide necessary follow-up questions to answer or exhaust questions the content consumer may have. At operation 670, the question, answer, and answer rating can be fed into the AI/ML generative response for further training of the model.

At operation 675, the content consumer may save or archive the answer to their account on the direct communication platform. The answer can be added to the content creator's archive of content at operation 680 which can optionally be shared/pooled with other content creators' archive of content.

Figure 7:
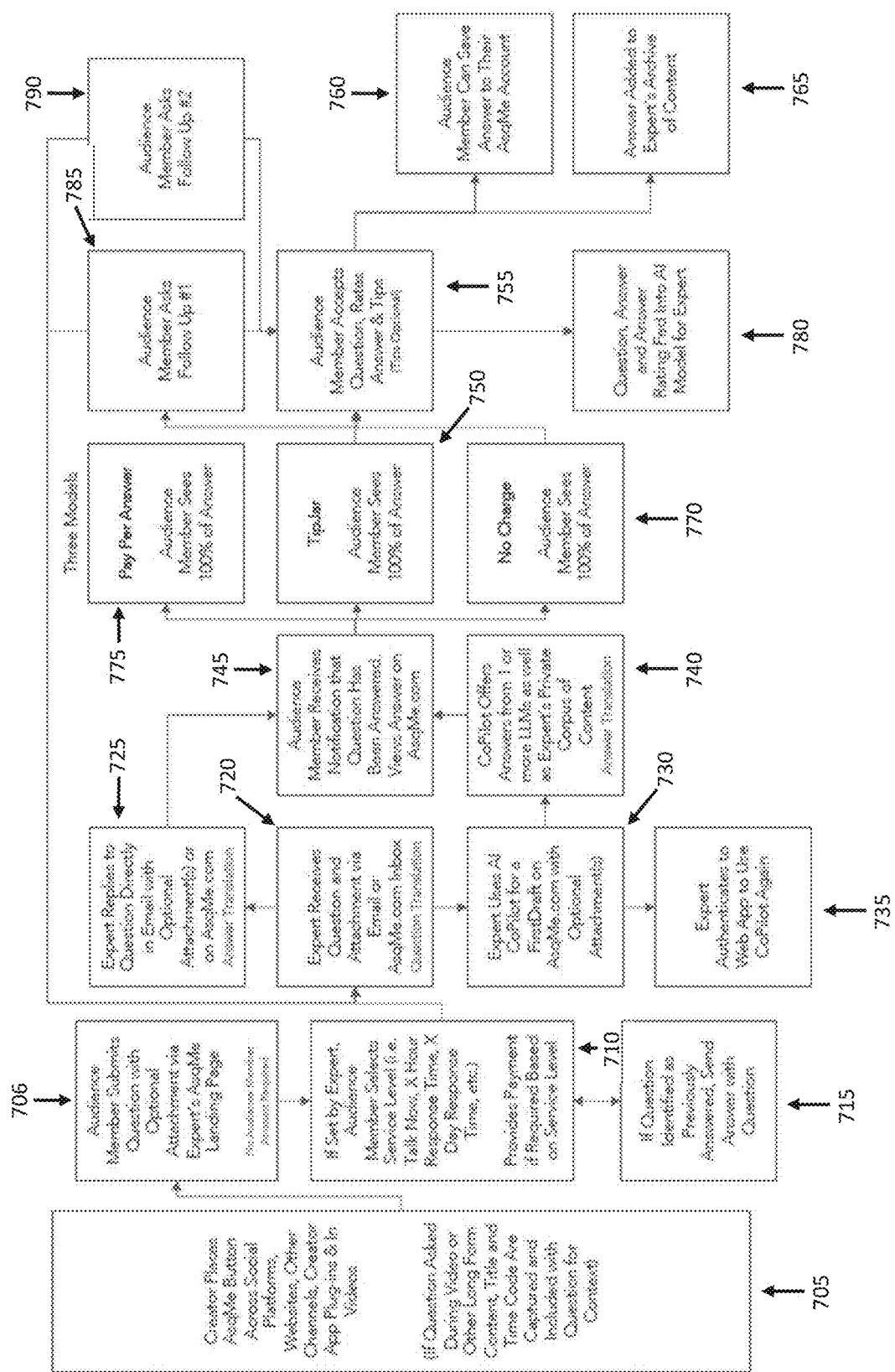
FIG. 7 is a flowchart illustrating an example process for implementing a prepaid answer in a centralized forum in communicating among various social media platforms, according to some examples of the present disclosure.

FIG. 7 is a flowchart illustrating an example process 700 for implementing a prepaid answer in a direct communication platform in communicating among various social media platforms, according to some examples of the present disclosure. The method shown in FIG. 7 is provided by way of example, as there are a variety of ways to carry out the method. Additionally, while the example method is illustrated with a particular order of operations, those of ordinary skill in the art will appreciate that FIG. 7 and the modules shown therein can be executed in any order and can include fewer or more modules than illustrated. Each module shown in FIG. 7 represents one or more operations, processes, methods or routines in the method.

The process 700 can begin at operation 705 where functionalities are placed across the content creator's social platforms including websites, channels, app plug-ins, and/or embedded in videos. In one example, if a question is asked during a video or other long-form content, the metrics, e.g., title and/or time code, are captured and provided with the question for context to the content creator and/or AI CoPilot.

The process 700 can proceed to 706. At 706, the content consumer can submit question(s) with the option of attaching one or more attachments. In one aspect, the attachment may be attached via the content creator's direct communication platform landing page. For example, the direct communication platform landing page can be a redirection from the functionalities that takes the content consumer to a communication channel to ask their question and upload attachments.

After a content creator receives a question and/or attachments to the question 706, the question undergoes a screening to determine whether necessary translations are to be conducted. In some examples, the determination to translate the received question is determined when the received question is in a non-native language with respect to the content creator. As discussed above, the questions can come in the form of text, audio, and/or video. When a translation is determined, the received question is then translated into the native language of the content creator prior to presenting the received question to the content creator. In some examples, the translation of questions in the form of audio and video can begin with converting the audio and video into text. After the text conversion, the text can then be converted into the native language of the content creator. The use of AI, ML, localization platforms, language translation APIs, and/or applicable techniques can be utilized to facilitate the translation of texts to the native language of the content creator. In at least one example, the determination and translation process can be done automatically.

The translation process is not limited to the received questions but can be applied to any attachments appended to the received questions.

Optionally, the process 700 can proceed to operation 710 where the content creator sets service levels, i.e, hierarchies in channels of direct communication with the content creator, for the content consumer to select from. The channel in one example can be a private communication channel between the content creator and the content consumer. Examples of service levels include a talk now option and rush or time restraint on the content creator to reply (e.g., N hour response time, N day response time). Cost associated with the levels of service can depend on the urgency weight assigned to the service levels.

The talk now option provides an instant private communication channel between the content creator and content consumer to discuss. Facilitating the transmission of one or more communications between the content consumer and the content creator can be completed via, in at least one example, a private communication channel. Private communication channels include, but not limited to, a short message service communication channel, a text communication channel, a video communication channel, an augmented reality communication channel, a virtual reality communication channel, or a combination thereof. Additional examples of private communication channels can include any channel capable of transmitting audio or visual communications including verbal, written, and non-verbal, or a combination thereof. By way of example, specific communication channels can include phone, emails, website chat, online messaging platforms, video conferencing, social media, and/or live chat.

At operation 715, the submitted question can be analyzed to determine whether the question asked has been previously answered. If the submitted question has been previously answered, the answer to the previously asked question is provided to the content consumer. Otherwise, the process 700 can proceed to operation 720 where the content creator receives the question and attachment. Retrieval of the question and attachment can be via the content creator's email, a dedicated inbox in the direct communication platform, text message, or other form of communication channels.

At operation 725, the content creator can reply directly to the question with optional attachment(s). In some instances, the reply can be facilitated via email, text, or on the direct communication platform. Alternative to operation 725, the process 700 can proceed to operation 730. At operation 730 the content creator can utilize an AI/ML generative response to generate a first draft response with optional attachment(s). In at least one example, the use of an AI/ML generative response is facilitated on the direct communication platform. At operation 735, the content creator can authenticate the direct communication platform to use an AI/ML generative response again in generating additional draft responses. At 740 operation, an AI/ML generative response can offer answers from one or more large language models and/or in conjunction with the content creator's private corpus of content. Once the content creator replies either by responding directly or with the use of an AI/ML generative response, the process 700 proceeds to operation 745 where the content consumer receives notification that their question has been answered. In one instance, the answer can be viewable on the direct communication platform.

Following the submission of a response from the content creator, the process 700 can proceed to screen the content creator's response to determine whether the language of the response is native or non-native to the content consumer. In instances where the content creator's response is in a non-native language, a translation is conducted on the response to the native language of the content consumer, prior to displaying the content creator's response. The reversion translation process is not limited to the response but can be applied to any attachments supplied with the content creator's response. The process of translating can be done automatically with the implementation of AI, ML, localization platforms, language translation APIs, and/or applicable techniques. In one aspect, where the content creator's response is in text format, the response can be converted to audio and/or video format. For example, the use of text-to-speech tools may be implemented to convert text to speech or other applicable techniques. In another example, AI and ML can be implemented to convert text to a video or visual response.

The process 700 can then proceed to alternative pay models. By way of example, a three-way alternative pay model may be implemented. The first alternative is a pay-per-answer model 775 where the content consumer previews a portion of the answer and provides payments to see the entire answer. The second alternative is a TipJar model 750 where the content consumer can view the entire answer and provide a gratuitous payment. The third alternative is a No Charge model 770 where the audience can view the entire free of charge. The implementation of which model can depend on the type of question, complexity of the question, frequency of the question, the content creator's selection, or the combination thereof.

At operation 755, the content consumer can accept the question, rate the answer, and pay/tip depending on which model is implemented. Follow-up questions are facilitated at operations 785 and 790. In some aspects, the process 700 can provide necessary follow-up questions to answer or exhaust questions the content consumer may have. The follow-up question can be related to the content creator's content and/or the content consumer's question. Additionally, the follow-up question can be a further detailed question inspired by the content creator's response. The follow-up question is not limited to a single question but can include a series of questions necessary for additional information to answer questions of the content consumer.

As discussed above, pay models may be implemented for each follow-up question. At operation 780, the question, answer, and answer rating can be fed into the AI/ML generative response for further training of the model.

At operation 760, the content consumer may save or archive the answer to their account on the direct communication platform. The answer can be added to the content creator's archive of content at operation 765 and optionally pooled with other content creators' archive of content.

Figure 8A:
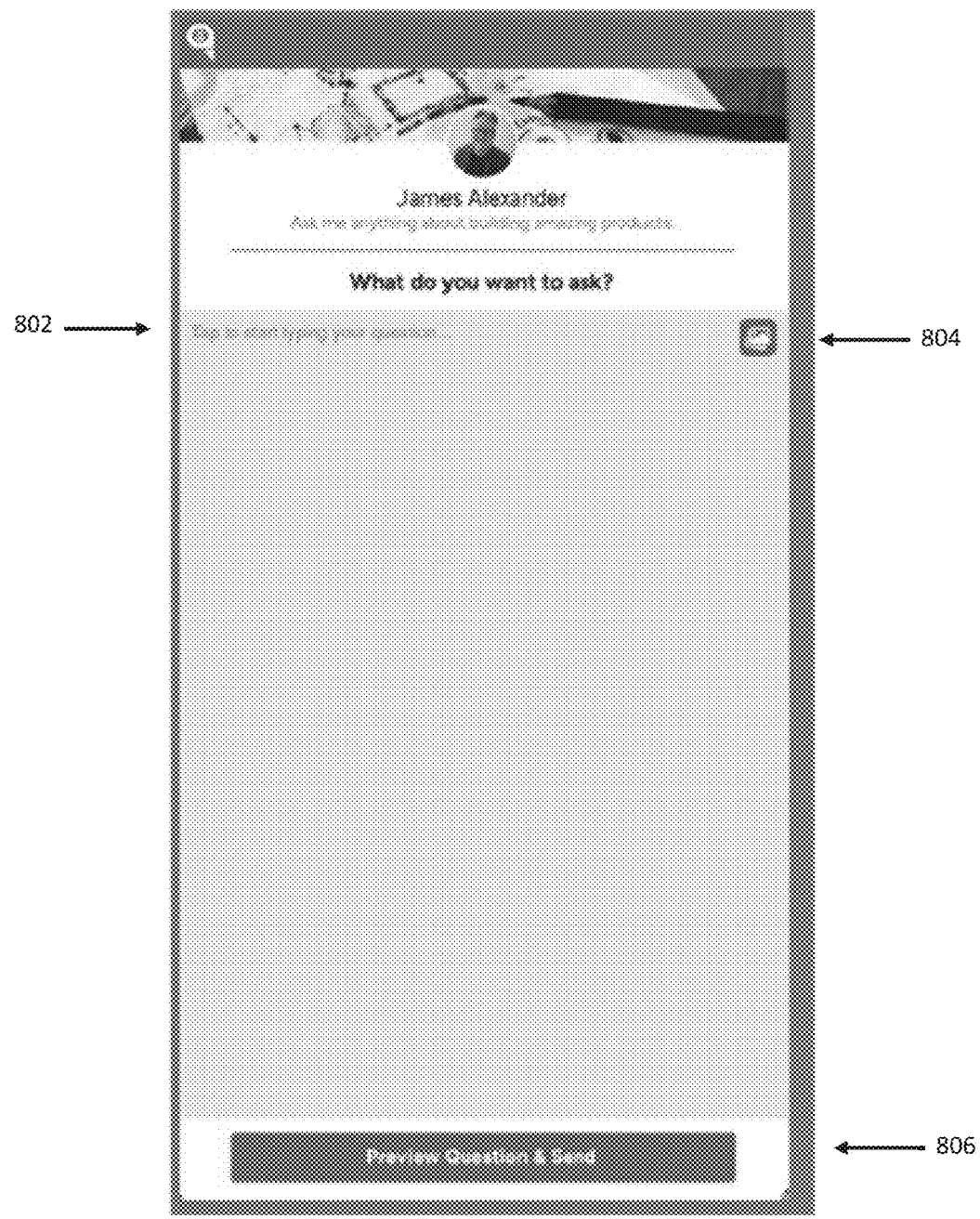
FIG. 8A through FIG. 8D illustrate example interfaces implementing aspects of the present disclosure.
Figure 8B:
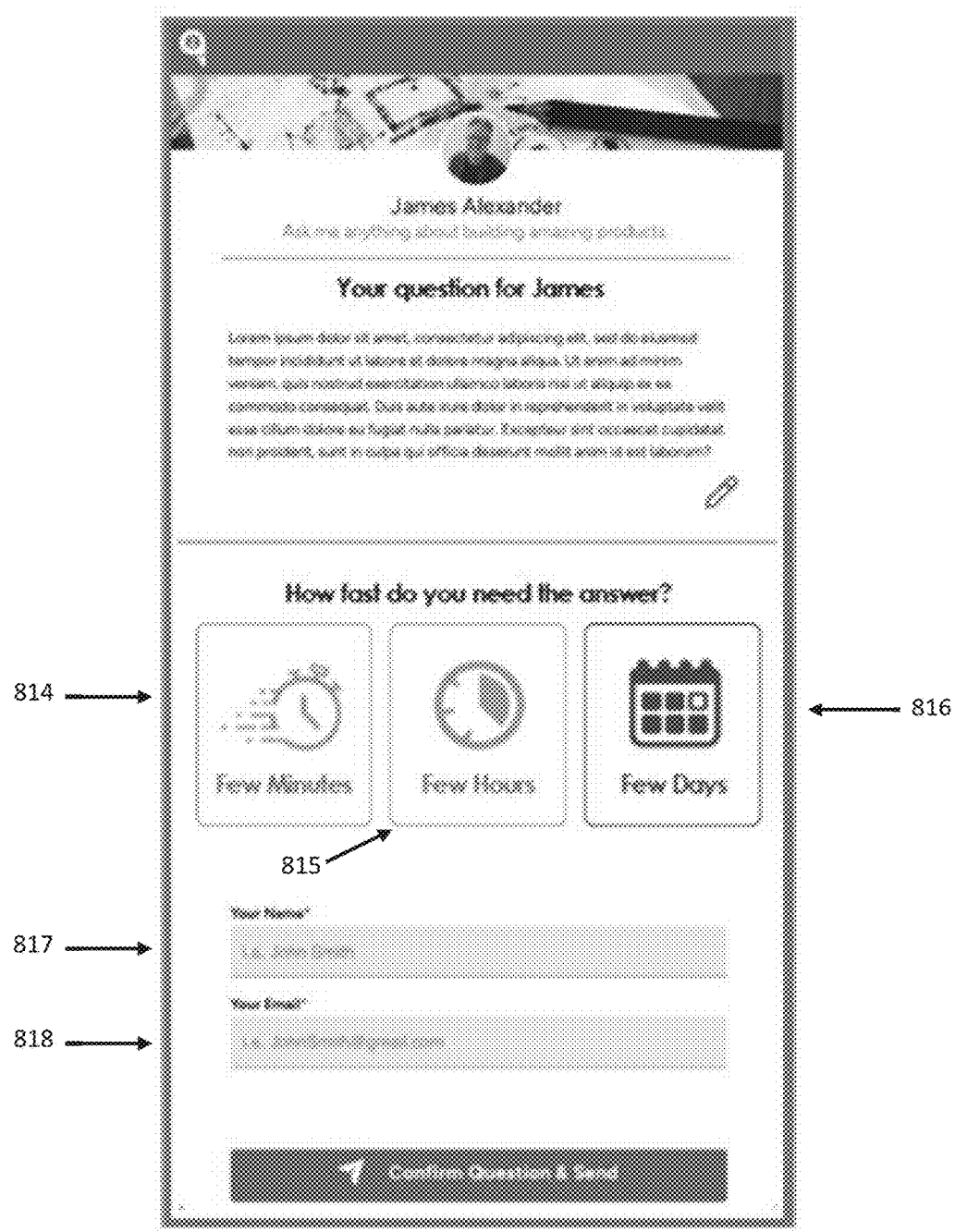
Figure 8C:
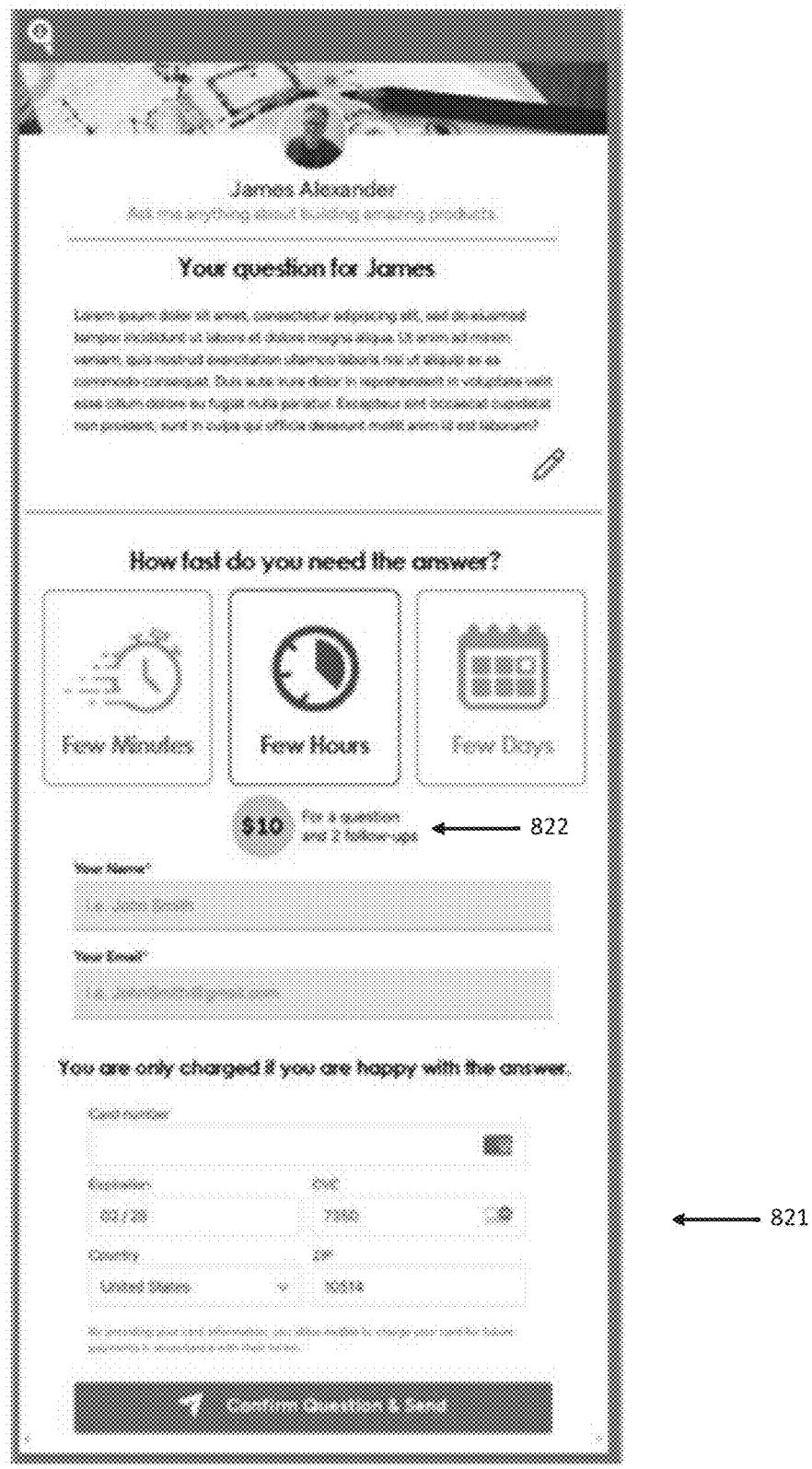
Figure 8D:
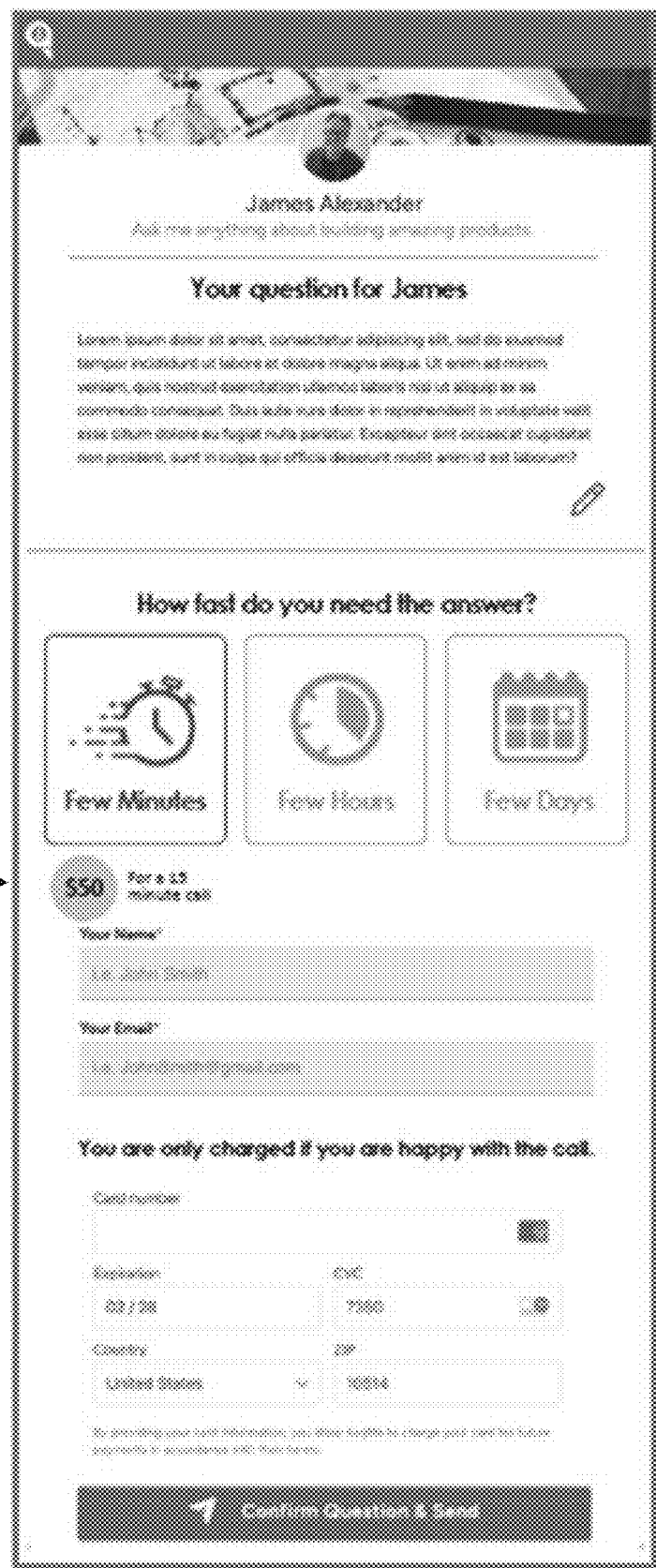

FIG. 8A through FIG. 8D illustrate example interfaces implementing aspects of the present disclosure. 8A illustrates a field 802 into which a question is described/input. Optionally, the content consumer can submit necessary attachments, for instance, via an actionable attachment icon 804, with their questions. The content can proceed by previewing their question 806 as displayed in FIG. 8B. FIG. 8B illustrates an interface in which to input aspects of the question such as selecting an urgency weight and a contact information template of the consumer asking the question. Examples of urgency weight can be how fast the content consumer needs the content creator to respond/answer; the options can include instant on-demand communication with the content creator (not displayed), within a few minutes 814, within a few hours 815, or within a few days 816. Examples of the contact information template include the content creator's name 817, email 818, phone number (not displayed), and/or the like. FIG. 8C is a template in which credit cards and similar or other forms of payment methods can be input 821. Optionally, follow-up questions can be offered along with a designated price 822. For example, the consumer can prepay for a primary question and two follow-up questions. 8D illustrates a template for ordering a 15-minute question/conversation 831. The 15-minute question/conversation can be on demand or scheduled for a future time.

Figure 9A:
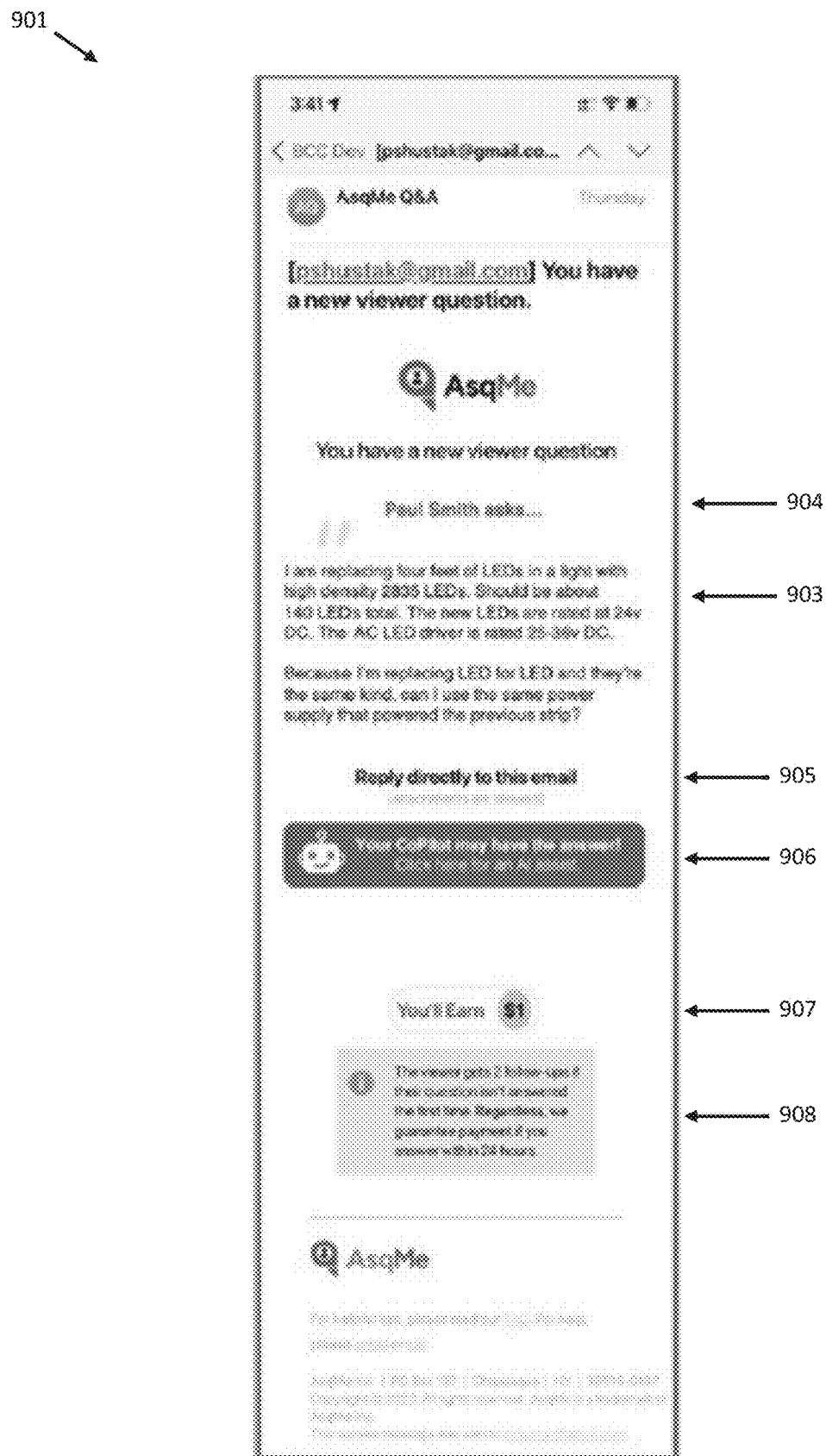
FIG. 9A through FIG. 9M illustrate example interfaces implementing artificial intelligence (AI) for generating human-like answers, according to some aspects of the present disclosure.

FIG. 9A through FIG. 9M illustrate example interfaces implementing artificial intelligence (AI) for generating human-like answers, according to some aspects of the present disclosure. FIG. 9A is a template in which an example notification 901 is provided to the content creator. The notification 901 can include a preview of the question asked, the content consumers identity 904, and the like. In some examples, the notification 901 can be in the form of an email, text message, a mobile or electronic device application, the like, or the combination thereof. The notification 901 can provide different forms of response. In one instance, the content creator can respond directly 905 such as replying via email or on the direct communication platform. In another instance, the content creator can utilize the AI/ML generative responder 906, to generate response draft. The notification 901 can display an amount of payment to be paid to the content creator. Moreover, the notification 901 can notify the content creator of the amount of follow-up questions 908 the content consumer may have.

Figure 9B:
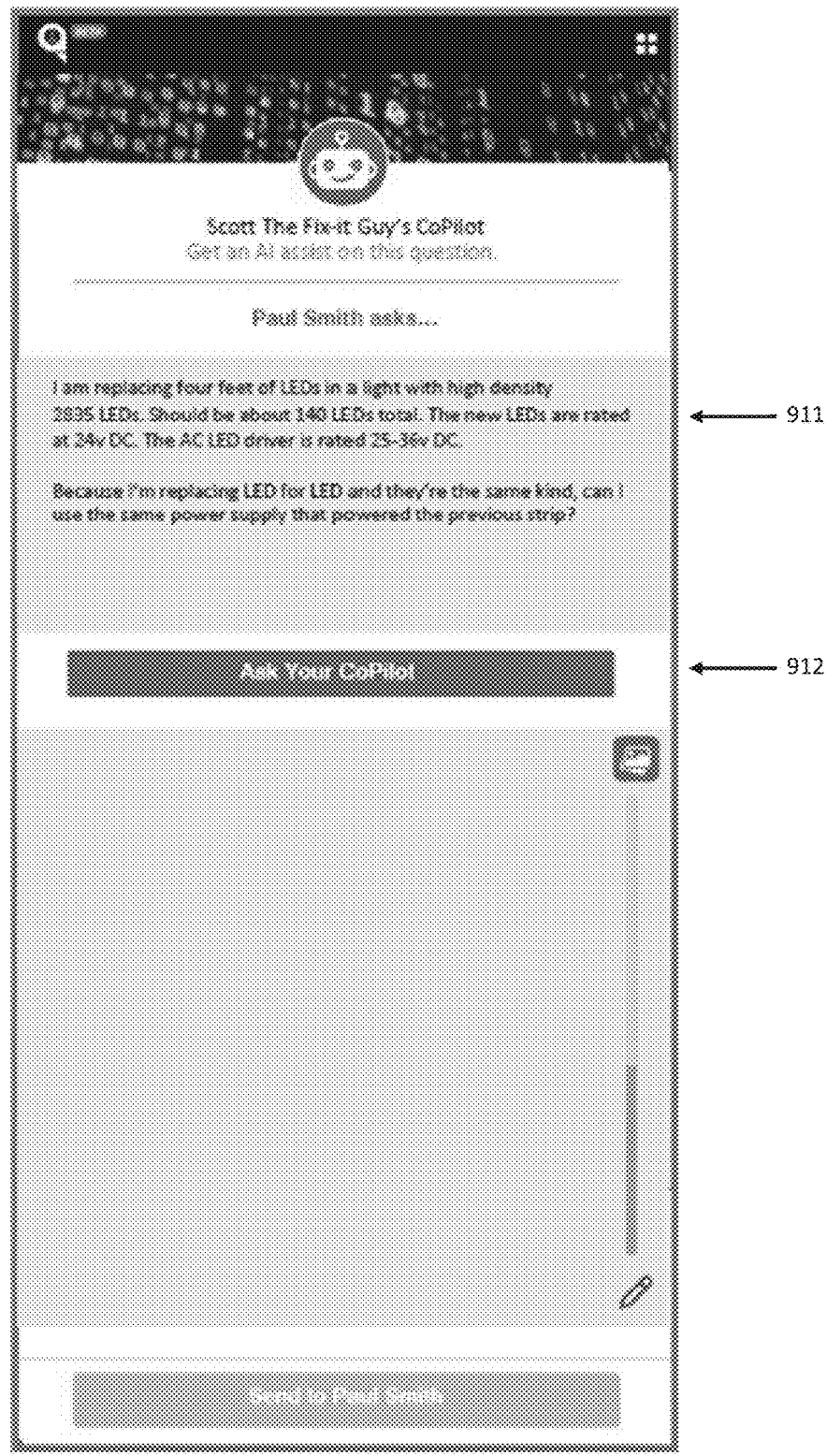
Figure 9C:
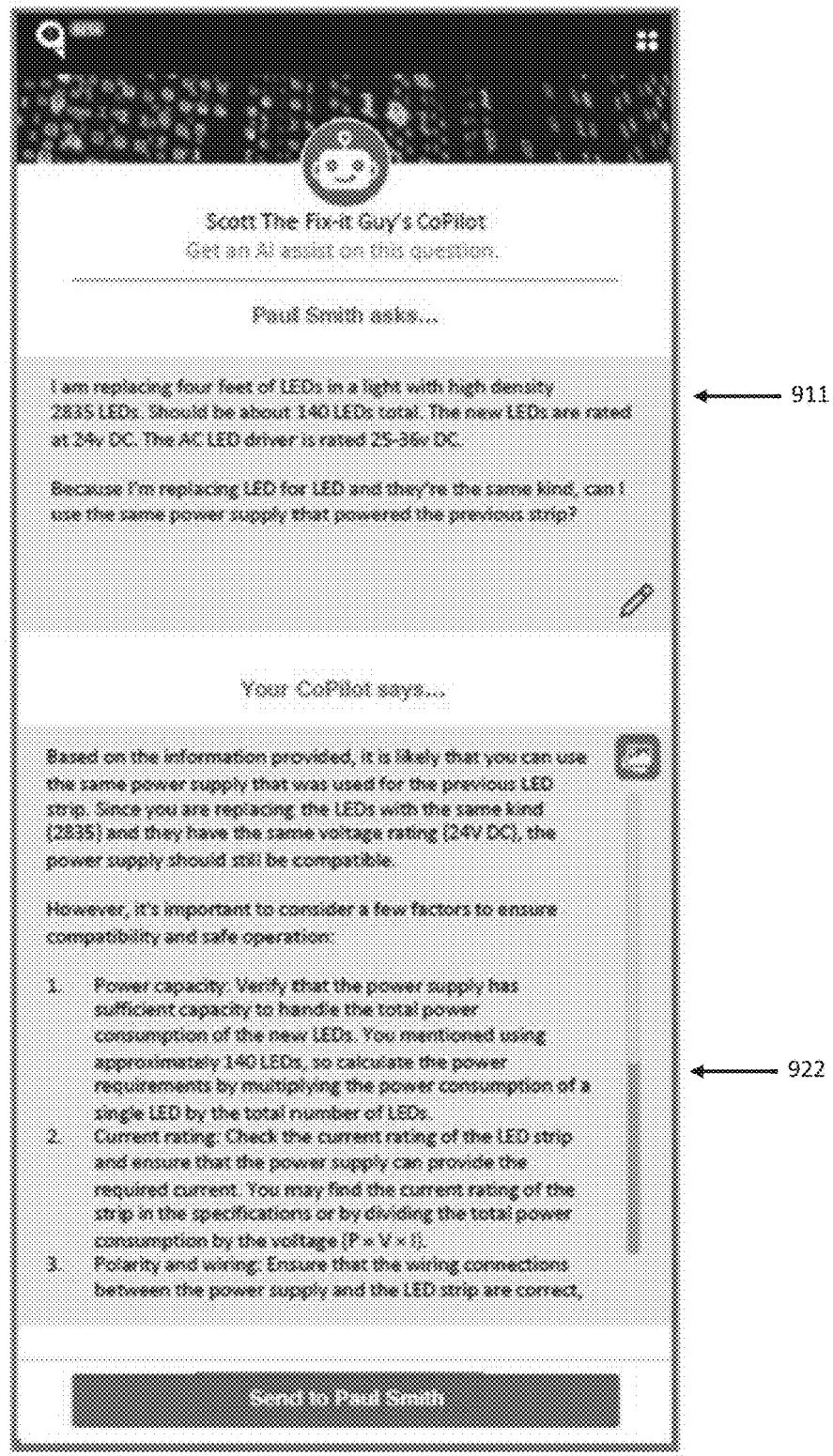
Figure 9D:
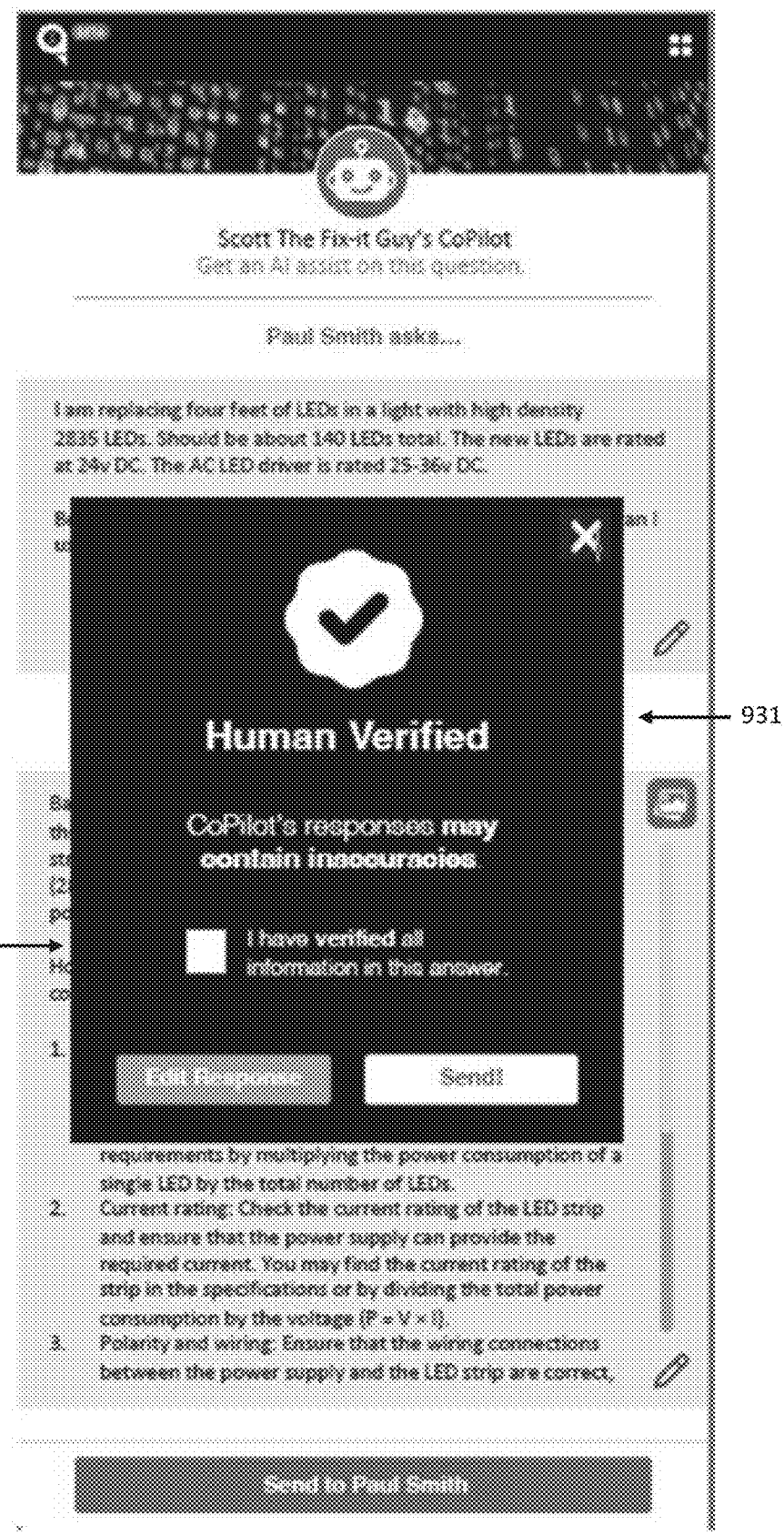
Figure 9E:
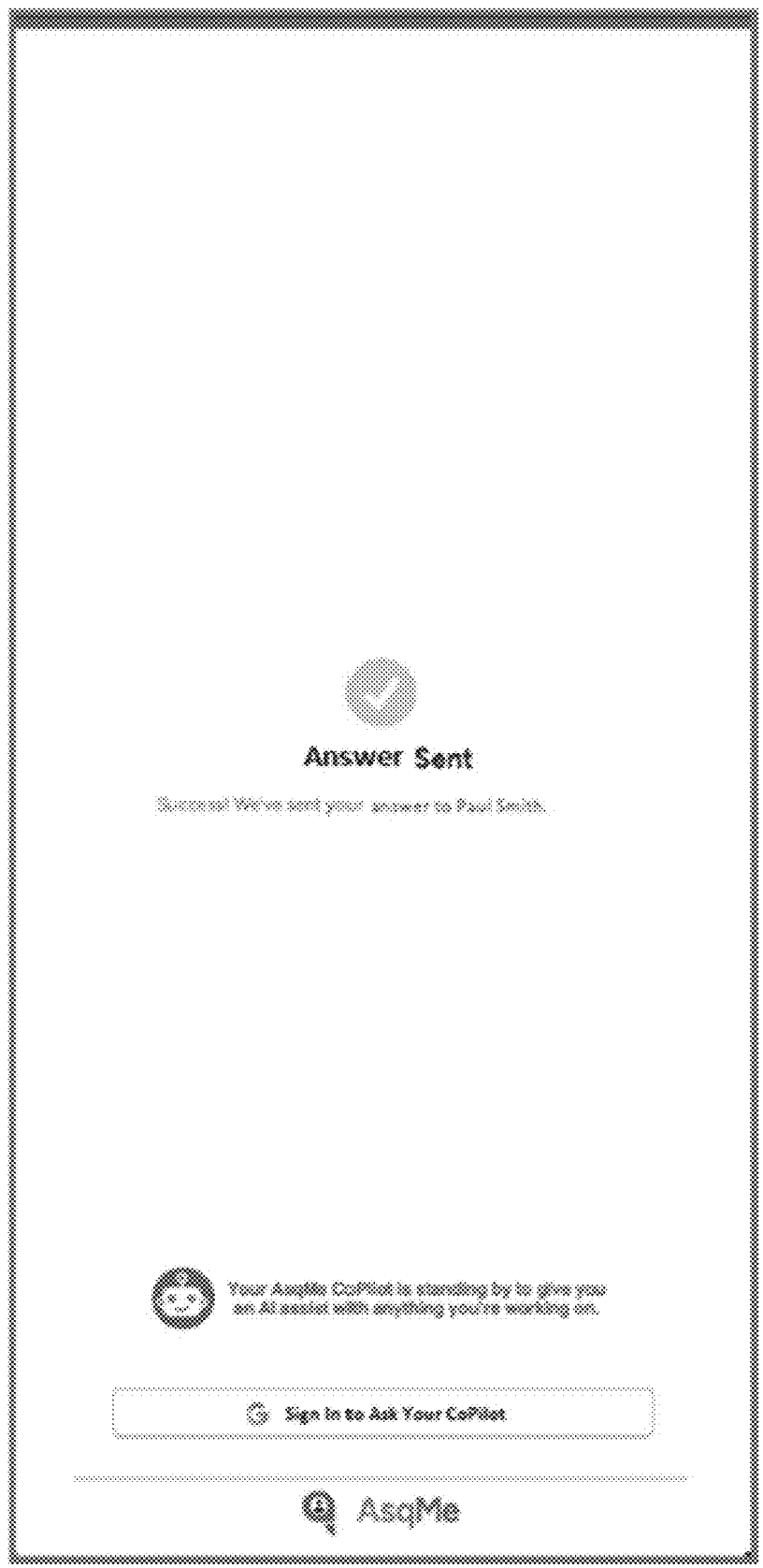
Figure 9F:
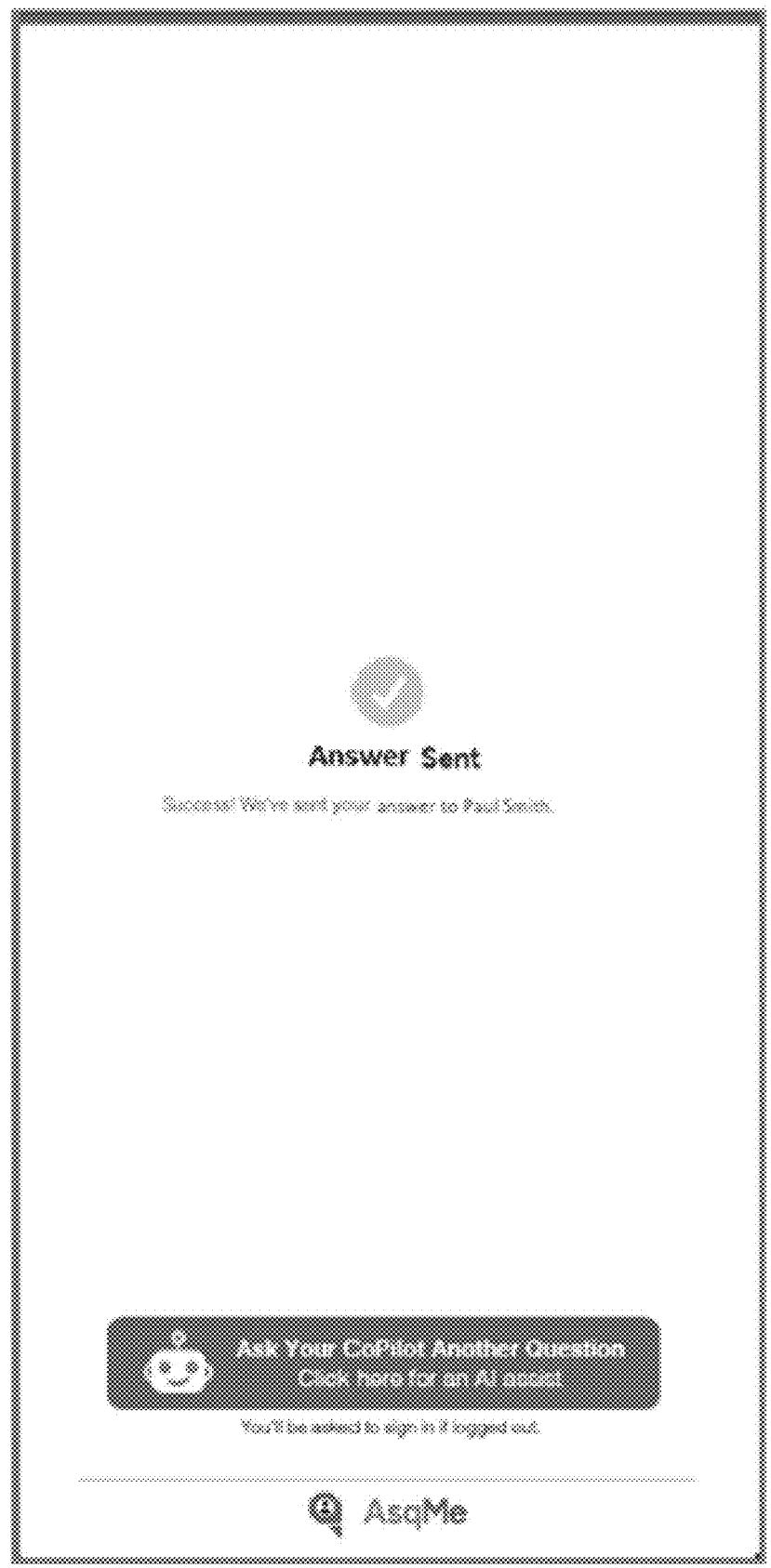
Figure 9G:
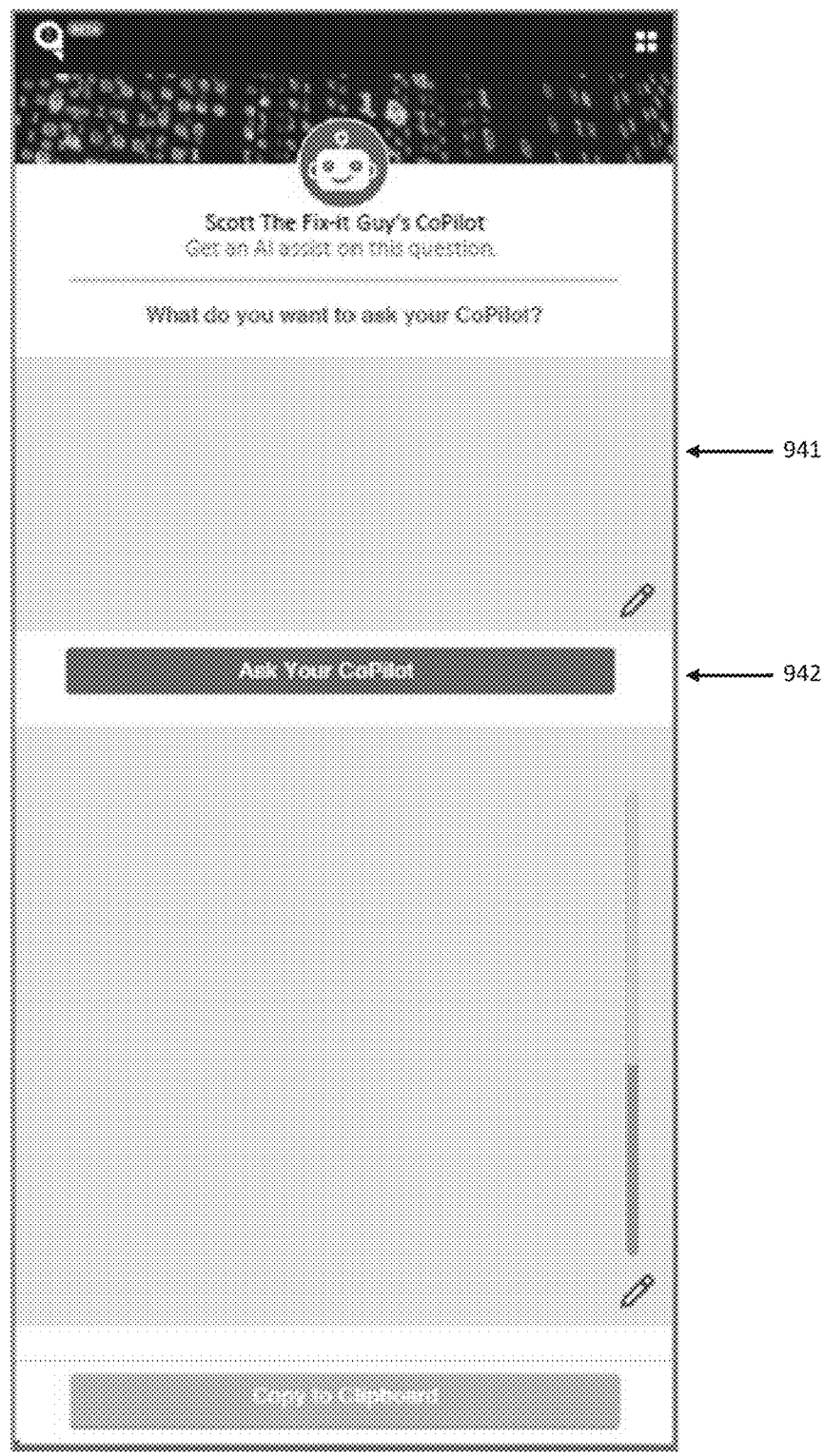
Figure 9H:
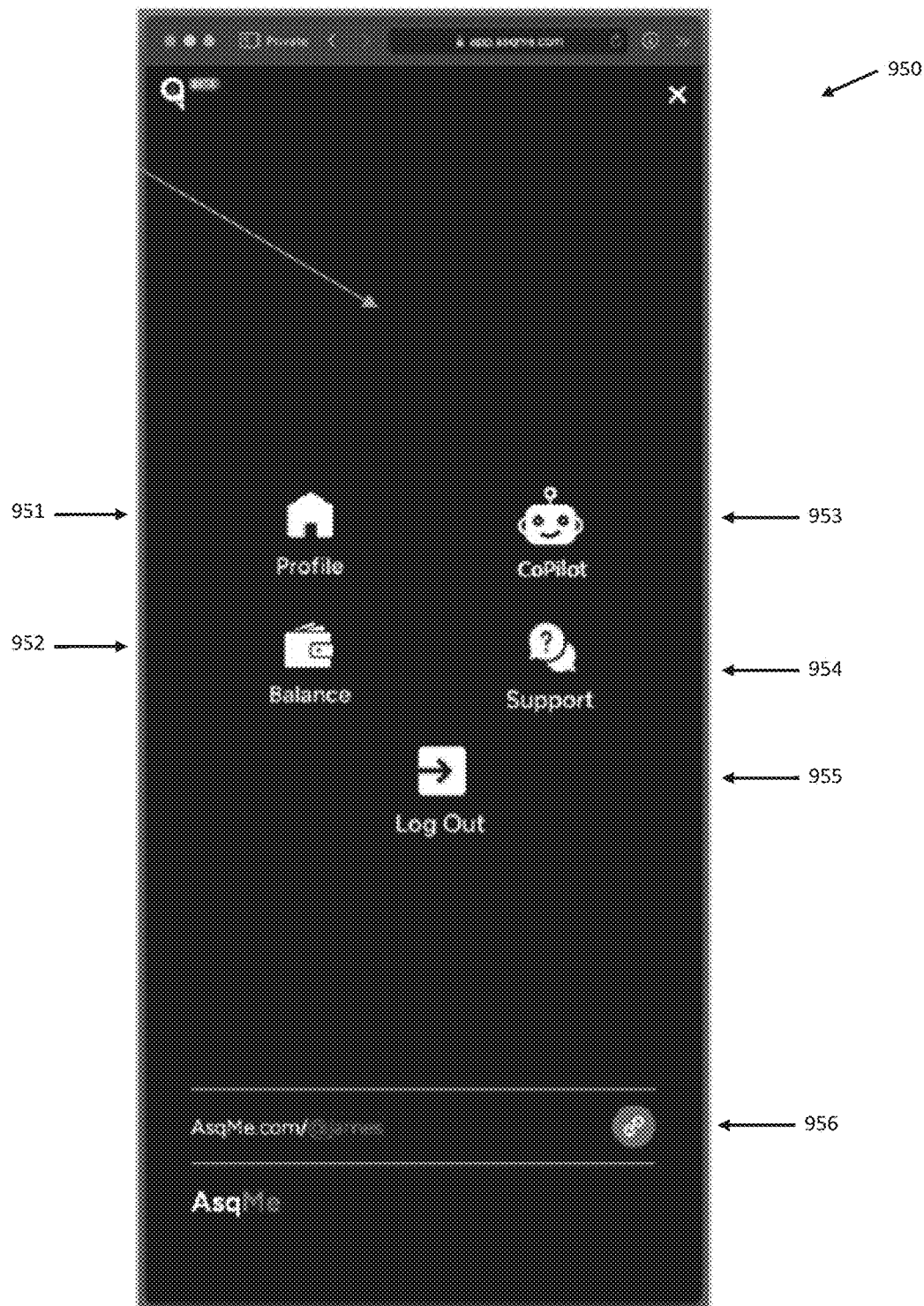
Figure 9I:
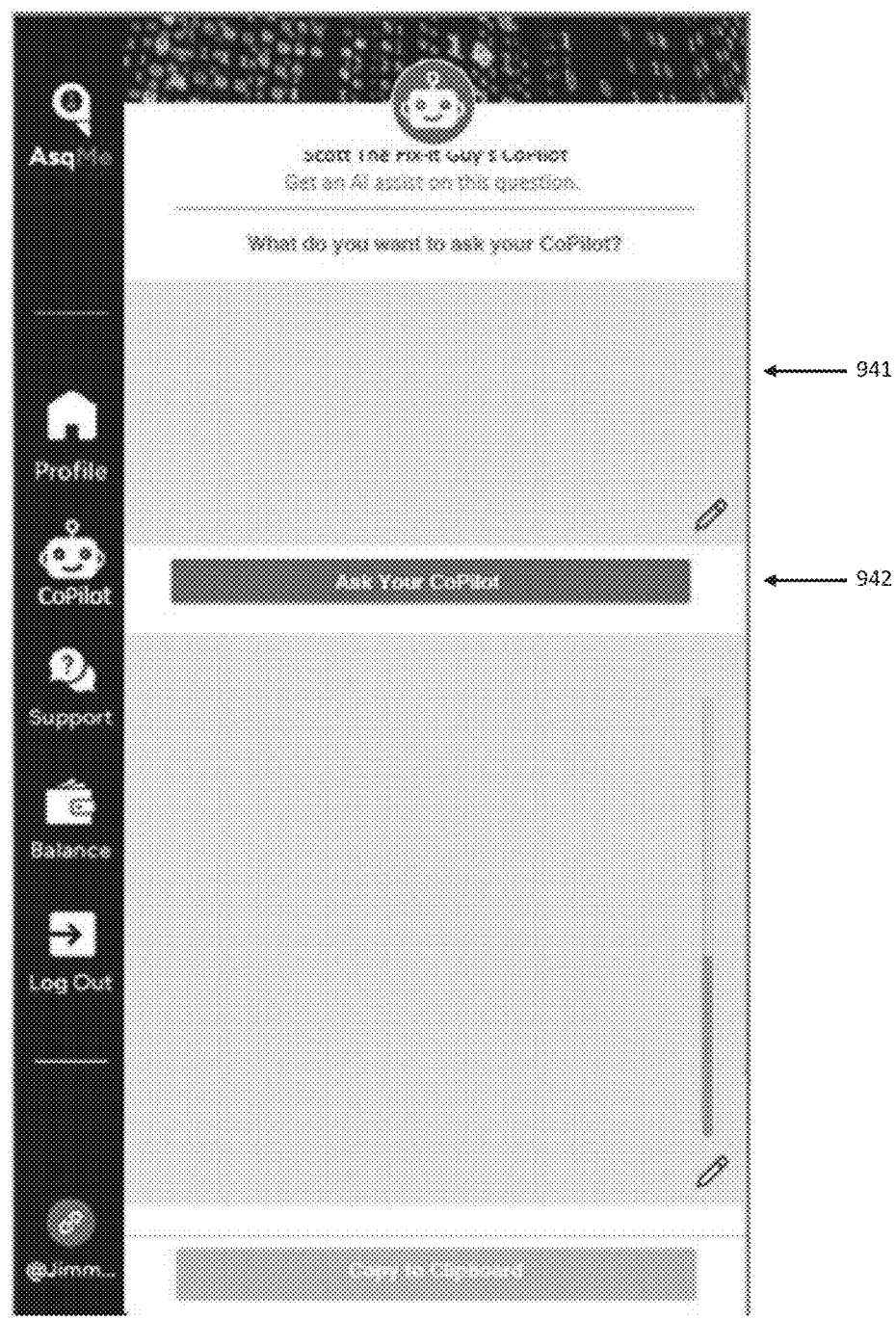
Figure 9J:
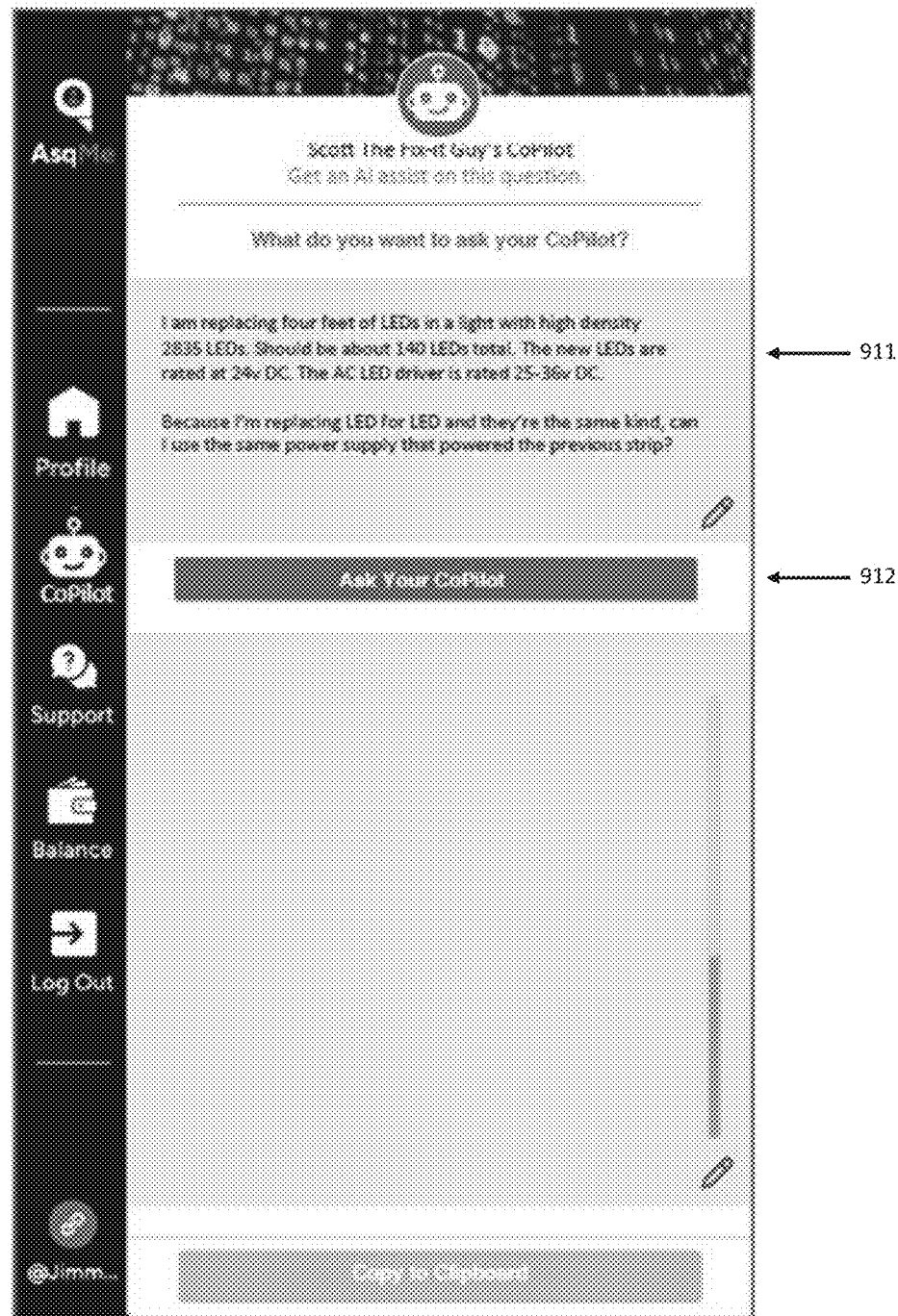
Figure 9K:
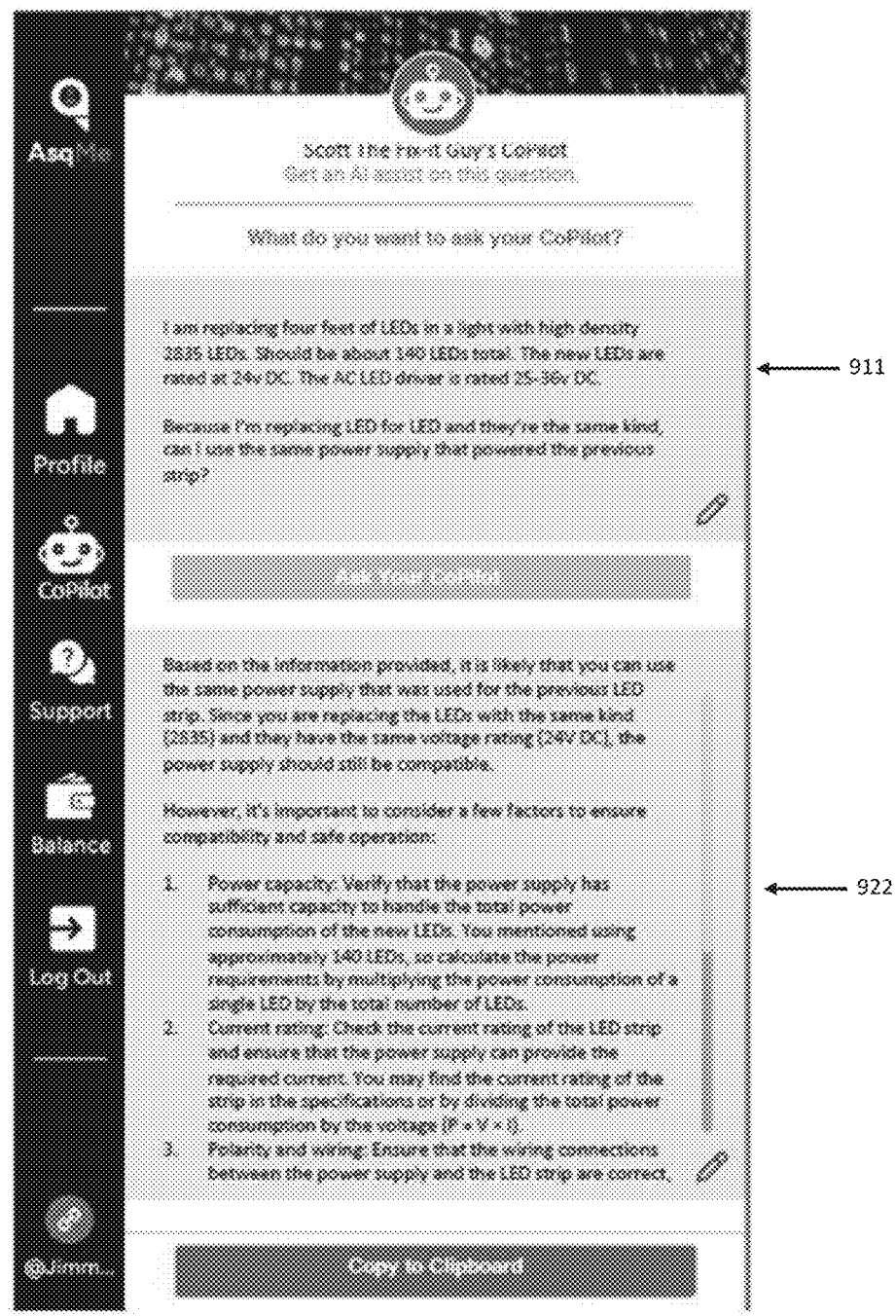
Figure 9L:
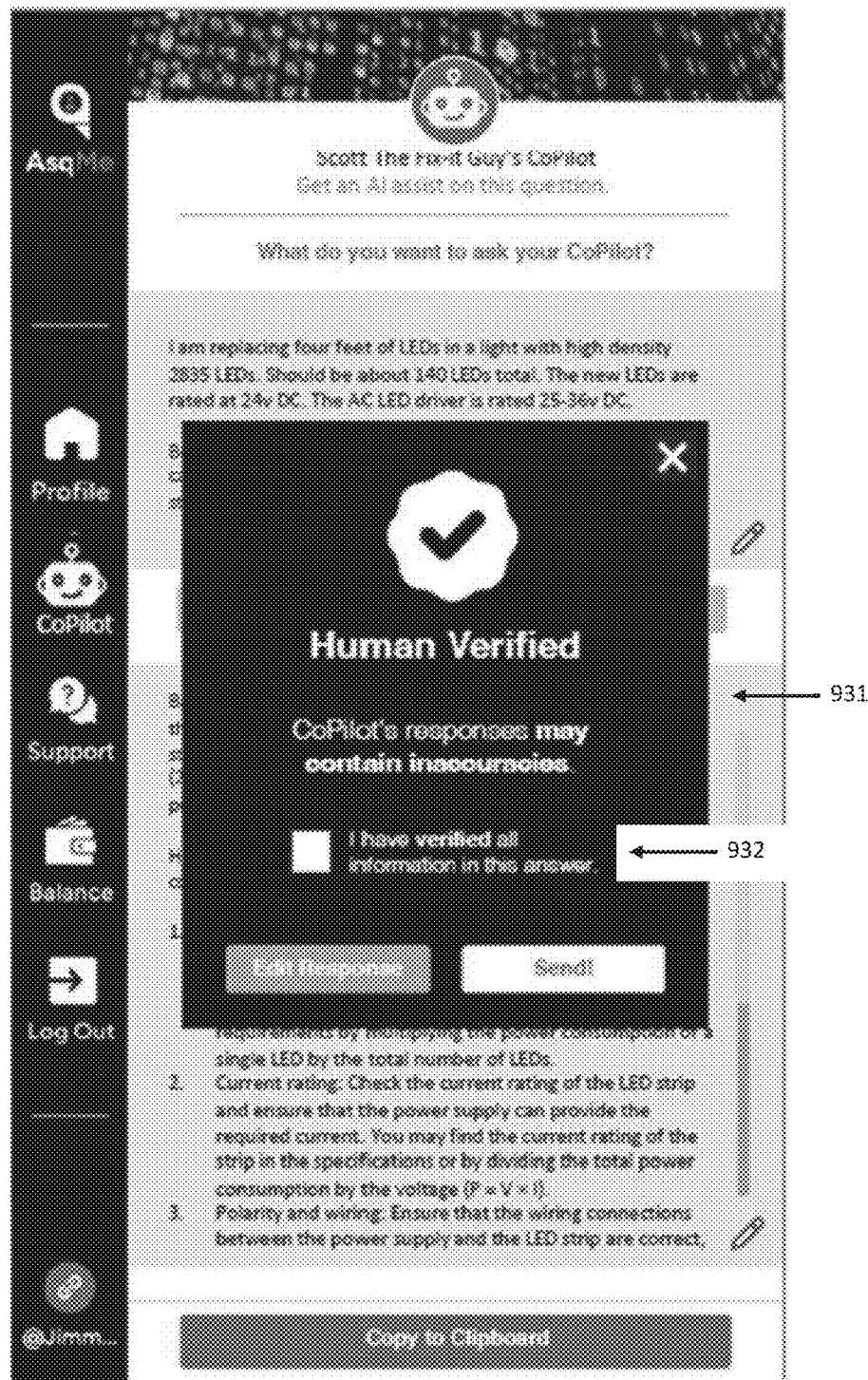

FIGS. 9B and 9J illustrate an example template with the option to use an AI/ML generative responder to respond to the content consumer's question 911. By way of illustration, FIGS. 9C and 9K display an example response 922 from the AI/ML generative responder to the content consumer's question. The content creator can then further edit the AI/ML generative response 922 or approve the response to be sent out to the content consumer. FIGS. 9D and 9L illustrate a human verification confirmation template 931. The confirmation template 931 can prompt a request confirmation 932 to the content creator for the creator's review and approval of the AI/ML generative responder.

Figure 9M:
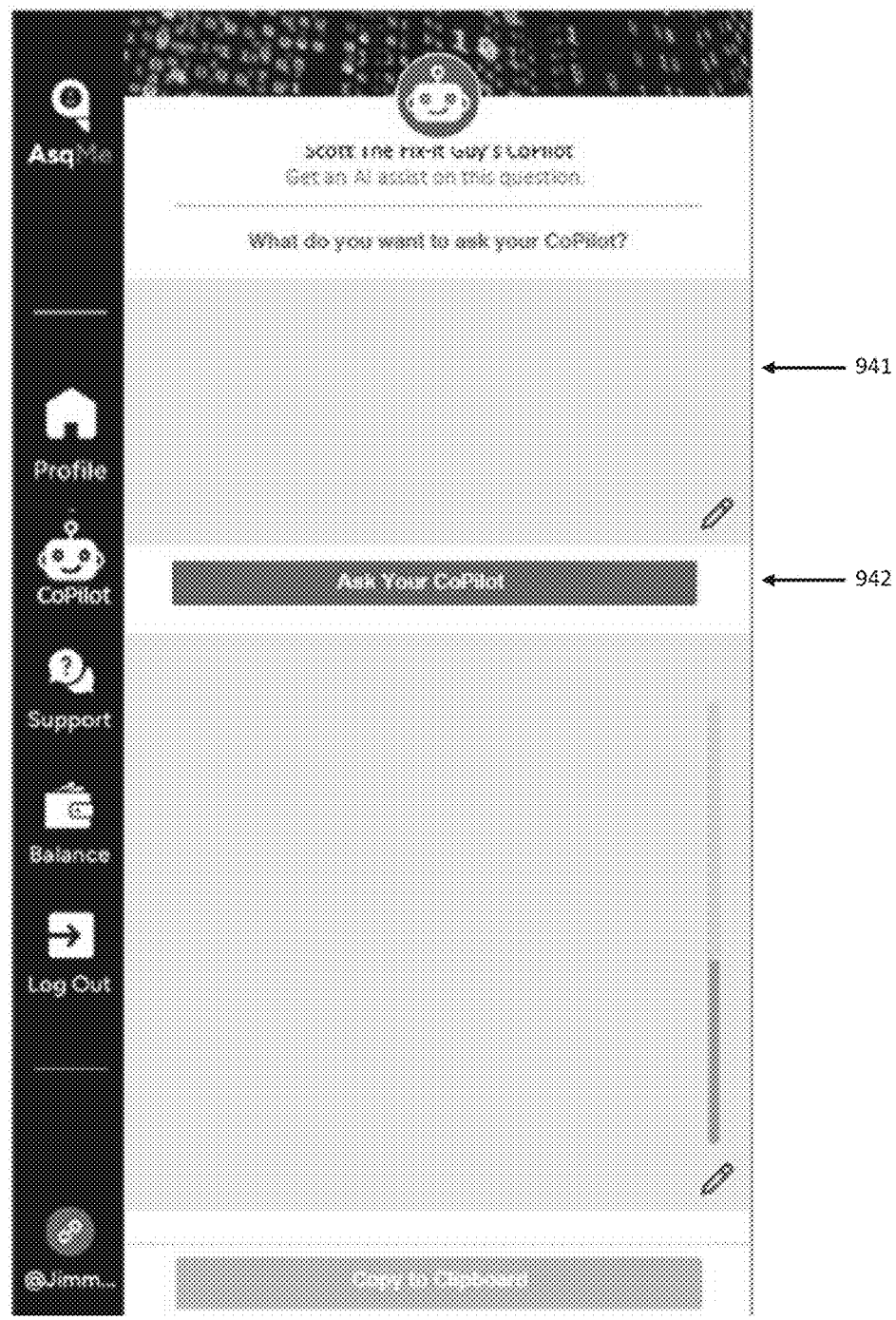

FIG. 9E illustrates an example template confirming the response was successfully sent to the content consumer. FIG. 9F is an alternative example confirmation template of the response being successfully sent. As follows, this provides the content creator the option to ask AI/ML generative responder an additional question. FIGS. 9G and 9M is continuation after asking/utilizing the AI/ML generative responder as displayed in FIG. 9F. A dedicated section 942 is provided to ask the AI/ML generative responder the additional question to generate an AI response. FIGS. 9H and 9I are an example template of a home page 950 on the direct communication platform. The home page 950 can display functionalities (e.g., links/icons) to redirect the content creator to the respective defined functionalities displayed. For example, the home page 950 can include icons such as a profile 951, content creator's balance page 952, AI/ML generative responder 953, support page 954, and log out icon 955. Moreover, the home page 950 can include the content creator's unique functionalities 956 to their respective direct communication platform.

Figure 10A:
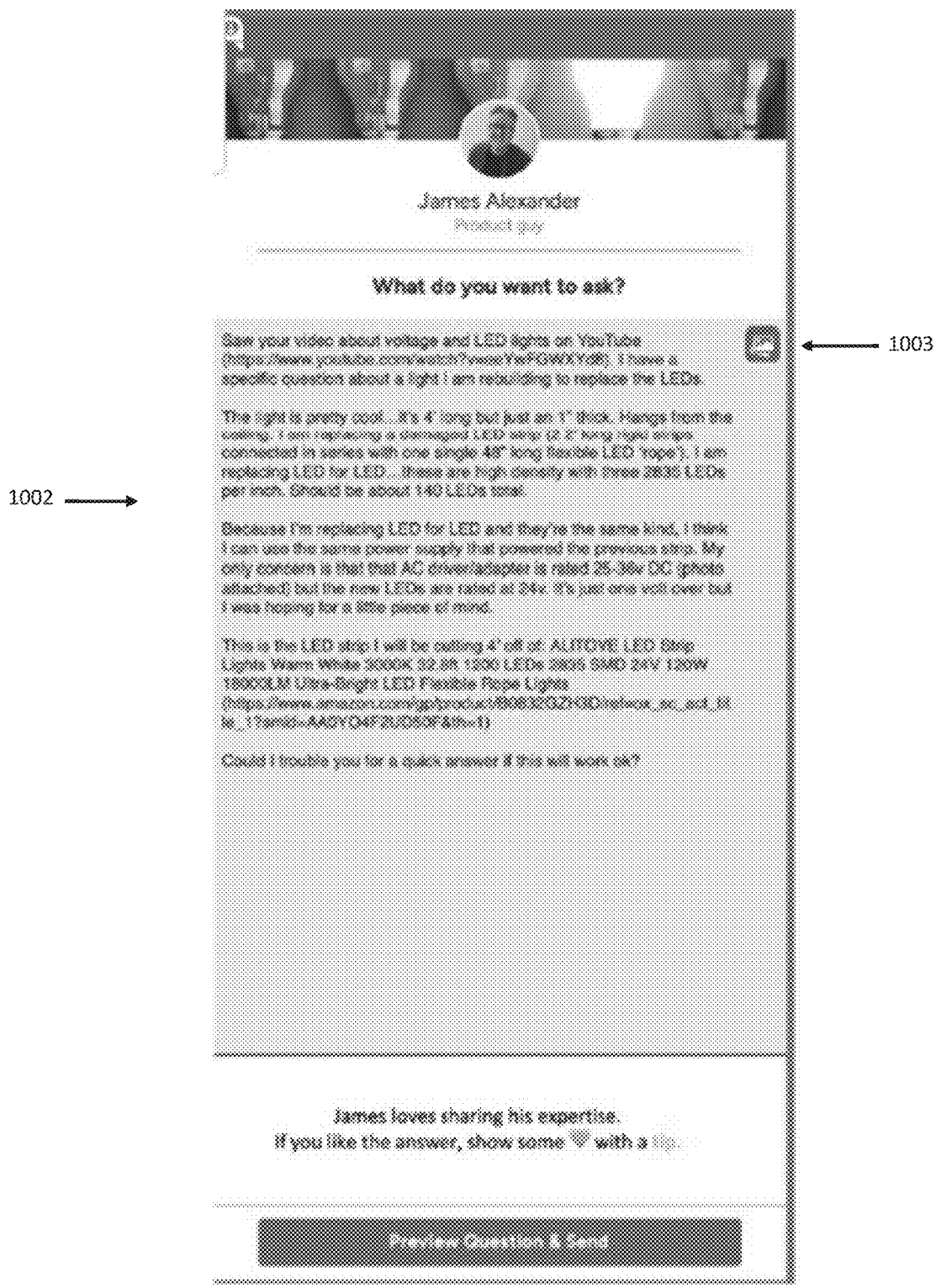
FIG. 10A through FIG. 10I illustrate example interfaces implementing a tip jar, according to some aspects of the present disclosure.
Figure 10B:
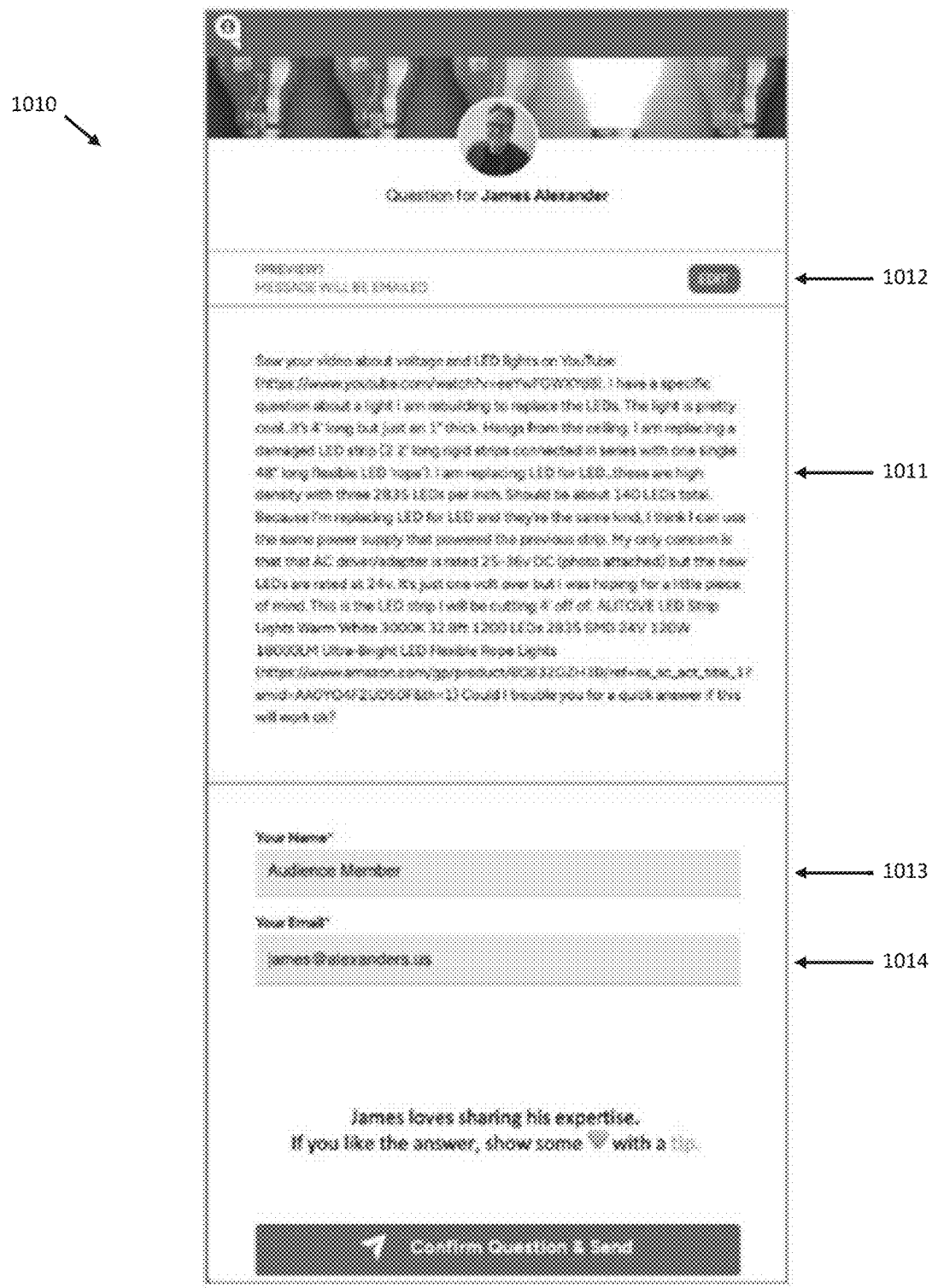
Figure 10C:
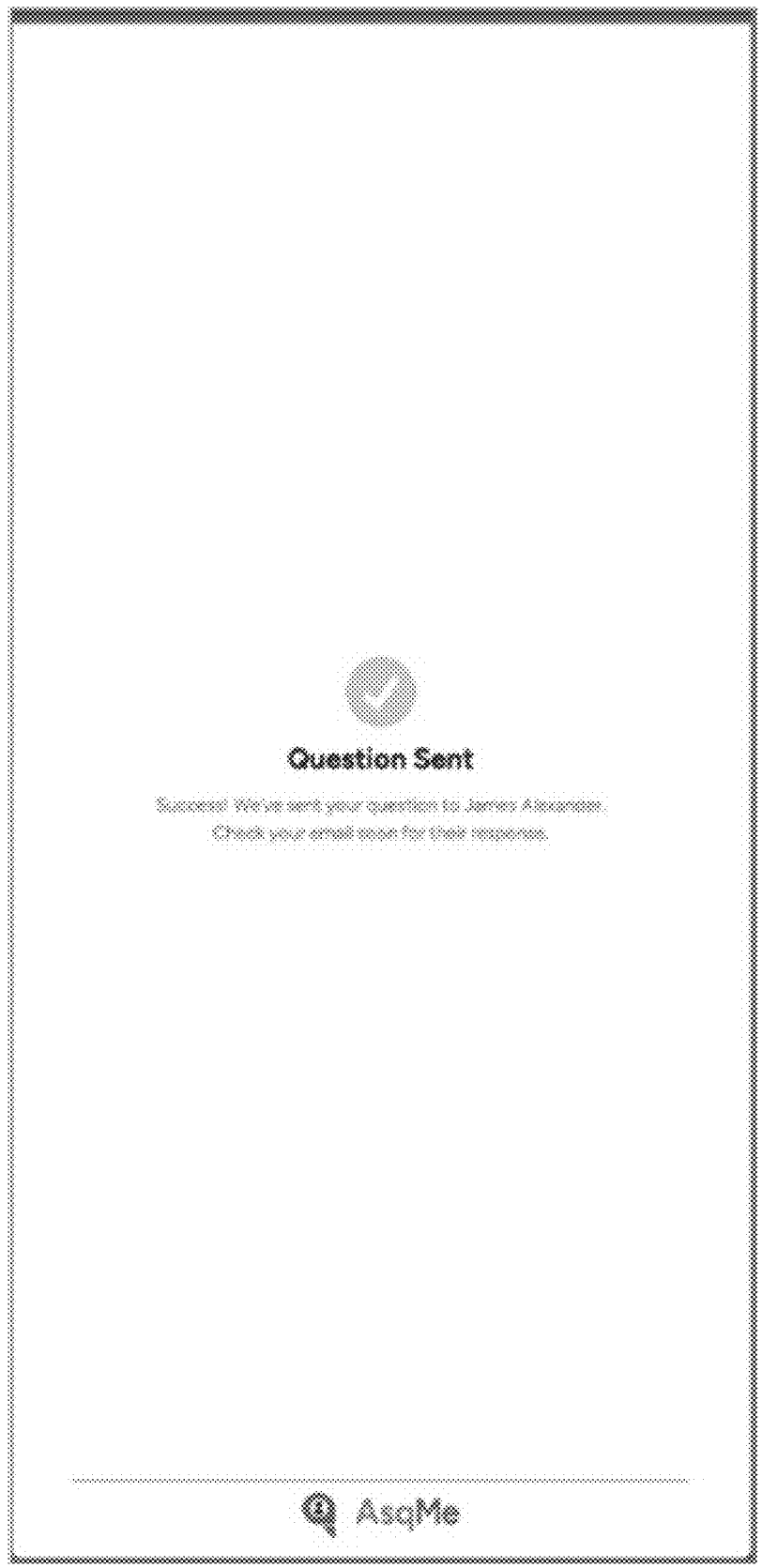

FIG. 10A through FIG. 10I illustrate example interfaces implementing a tip jar, according to some aspects of the present disclosure. FIGS. 10A-10C illustrate a content consumer submitting a question to the content creator via the direct communication platform. The template can include a designated question section 1002 for the consumer to insert their question alongside with an option to attach attachments, for instance, via an actionable attachment icon 1003. Upon submitting the content consumer's question, a preview template 1010 can be displayed to the content consumer. The preview template 1010, in some examples, can include the consumers question(s) 1011, the option 1012 to further edit the consumer's question(s), a section to insert the content consumers name 1013 and/or their email 1014. A benefit of questionnaire template allows consumers to quickly ask their question without the hassle of downloading any apps, creating any accounts, or going through a sign-up process.

Figure 10D:
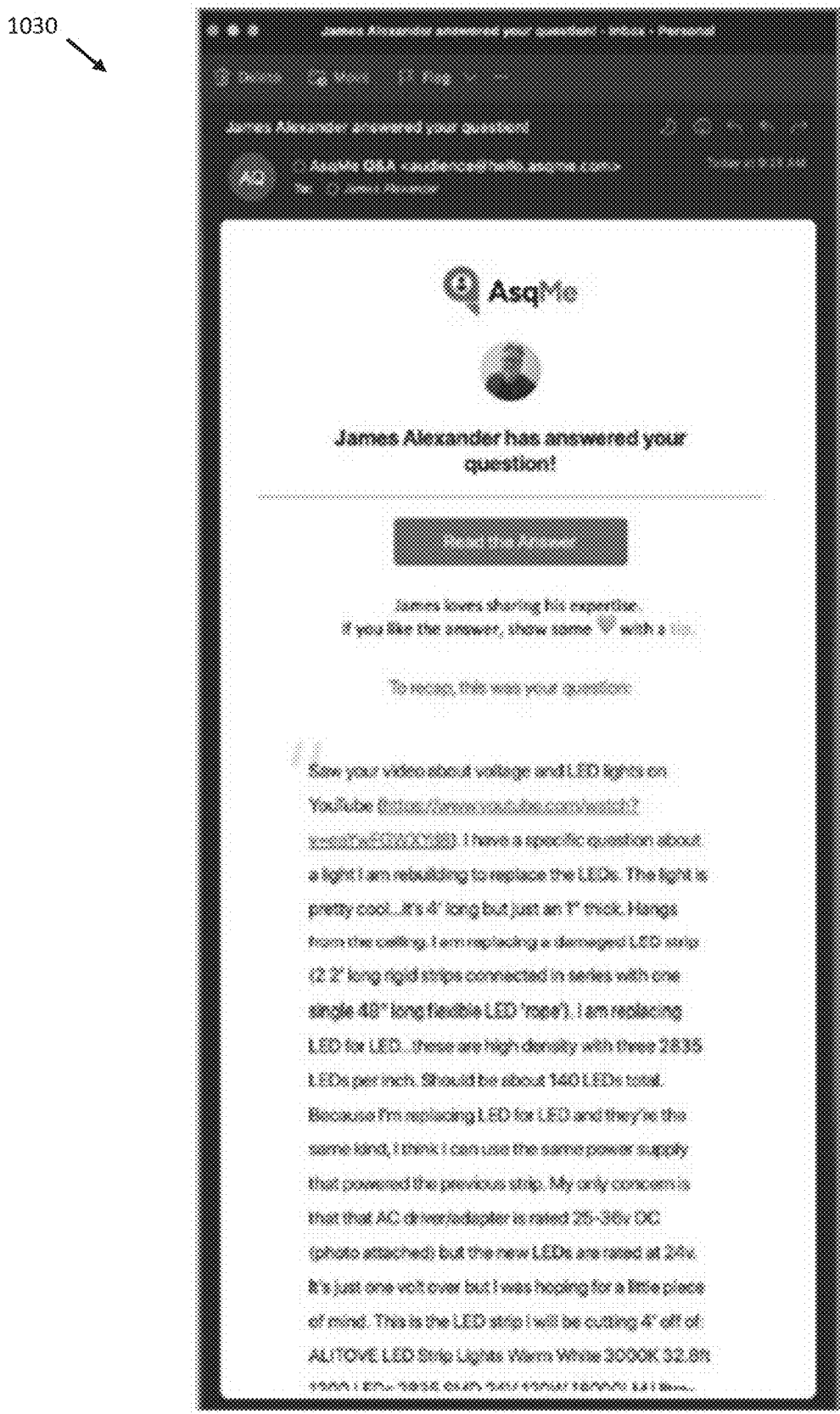
Figure 10E:
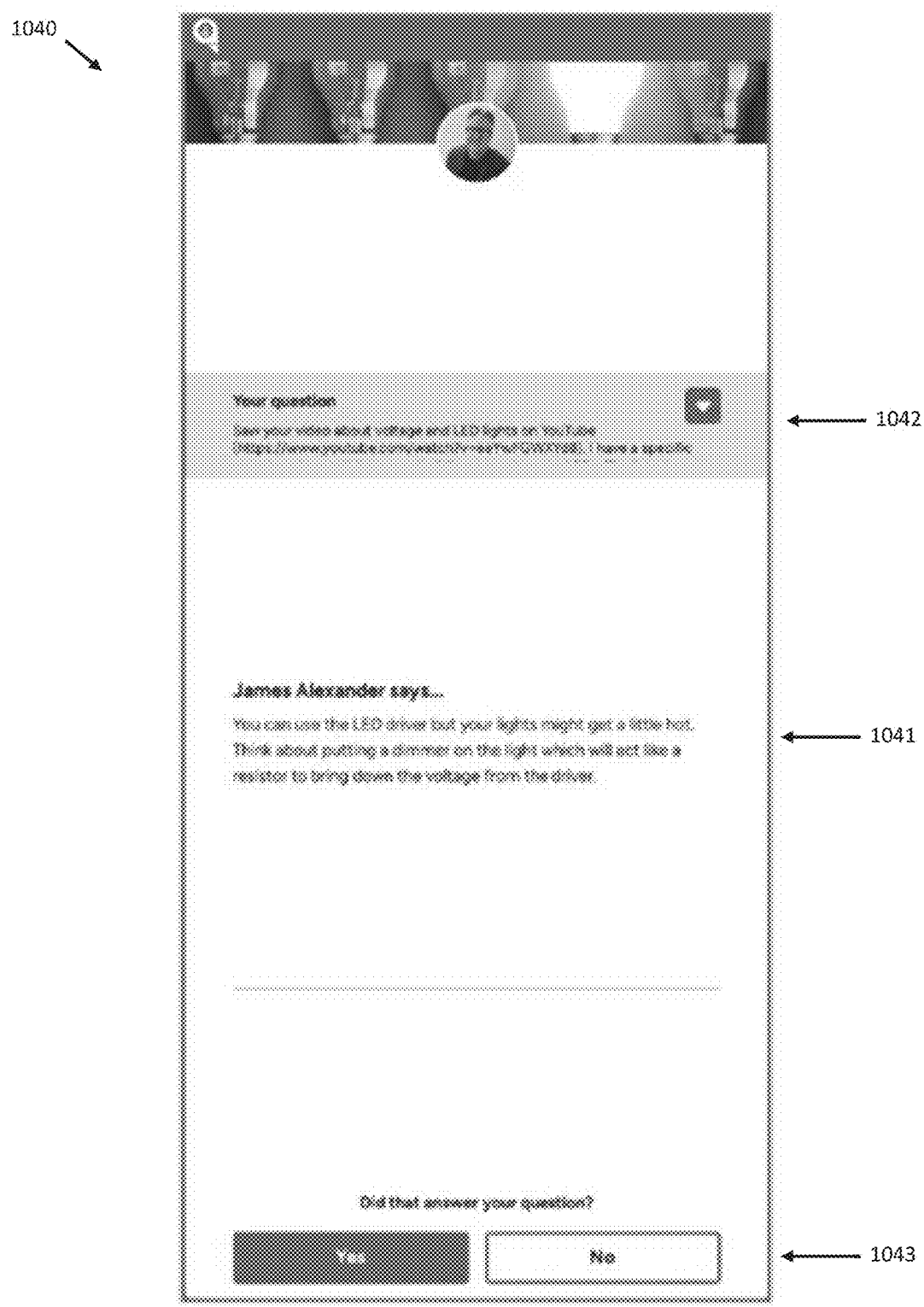

Upon confirming the consumer's question, a confirmation page 1020 appears notifying the consumer that their question has been sent. In one example, the consumer can access the expert's response via the consumer's email, if provided. Alternatively, the consumer can access the expert's response by viewing the original social platform which the consumer posted/submitted their original question. By way of example, FIG. 10D illustrates a notification email 1030 that the creator has responded to the consumer's question(s). The response page 1040, see FIG. 9E, can display the answer 1041 and the question submitted 1042. The consumer can then proceed to either select 1043 whether the response answered the consumer's question(s).

Figure 10F:
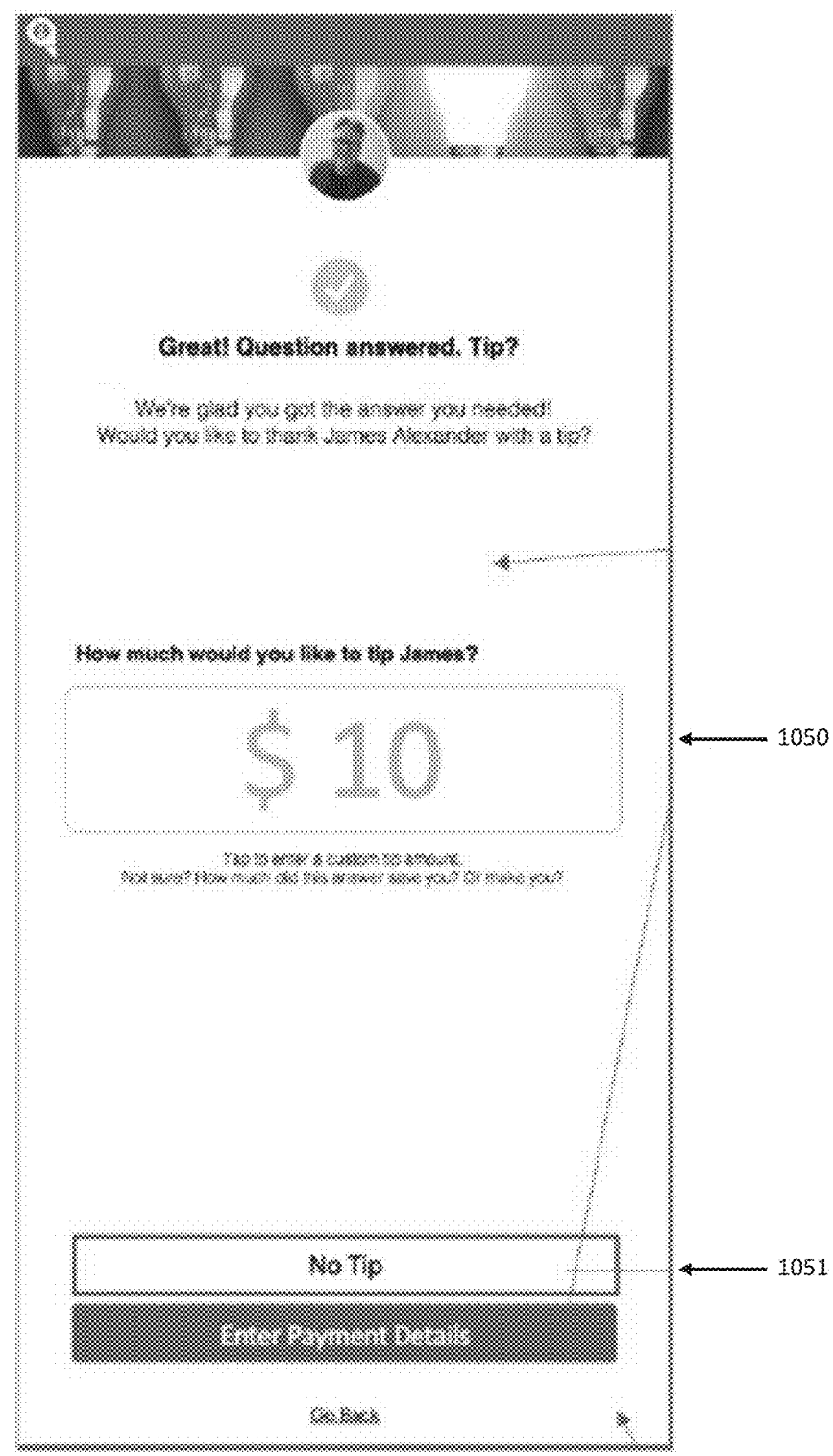
Figure 10G:
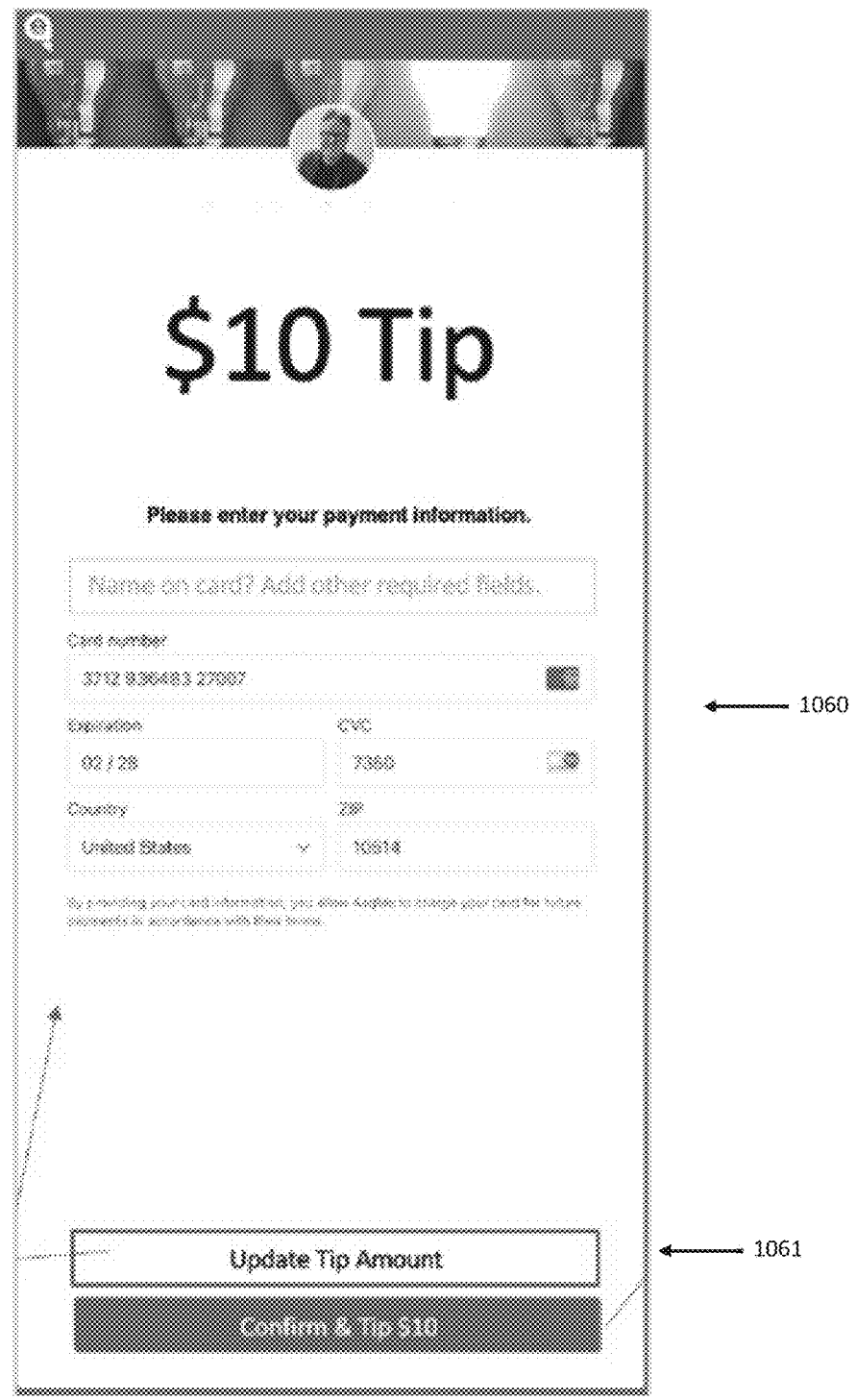

FIG. 10F illustrates a template where the consumer selects that their question was answered. A tip section 1050 can be provided for the consumer to voluntarily insert a tip value at their discretion. Optionally, the consumer can select the no tip option 1051, where no tip is attributed to the content creator. FIG. 10G illustrates a template to insert payment information upon electing to provide a tip. The option of editing/updating the tip amount 1061 can be provided.

Figure 10H:
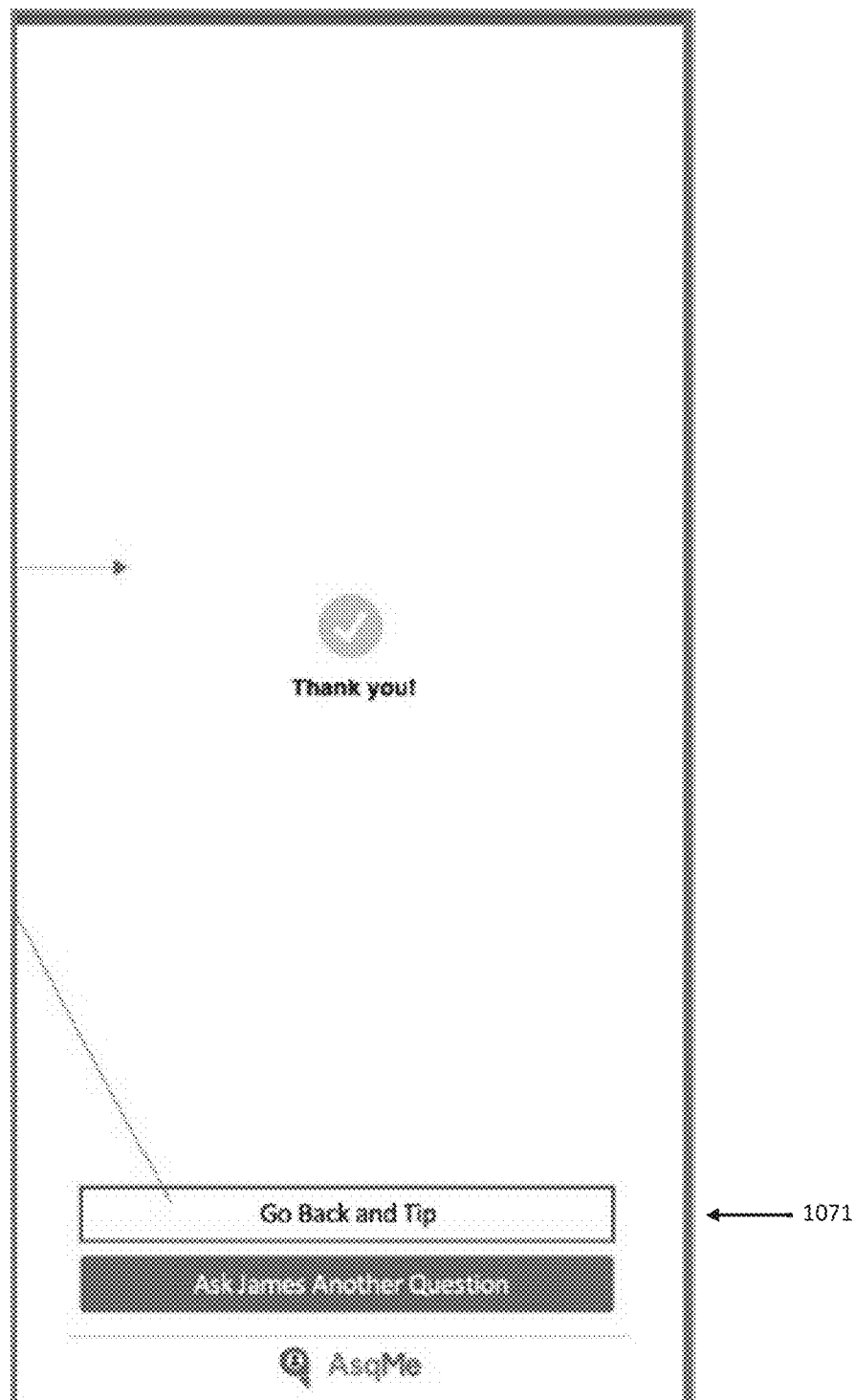
Figure 10I:
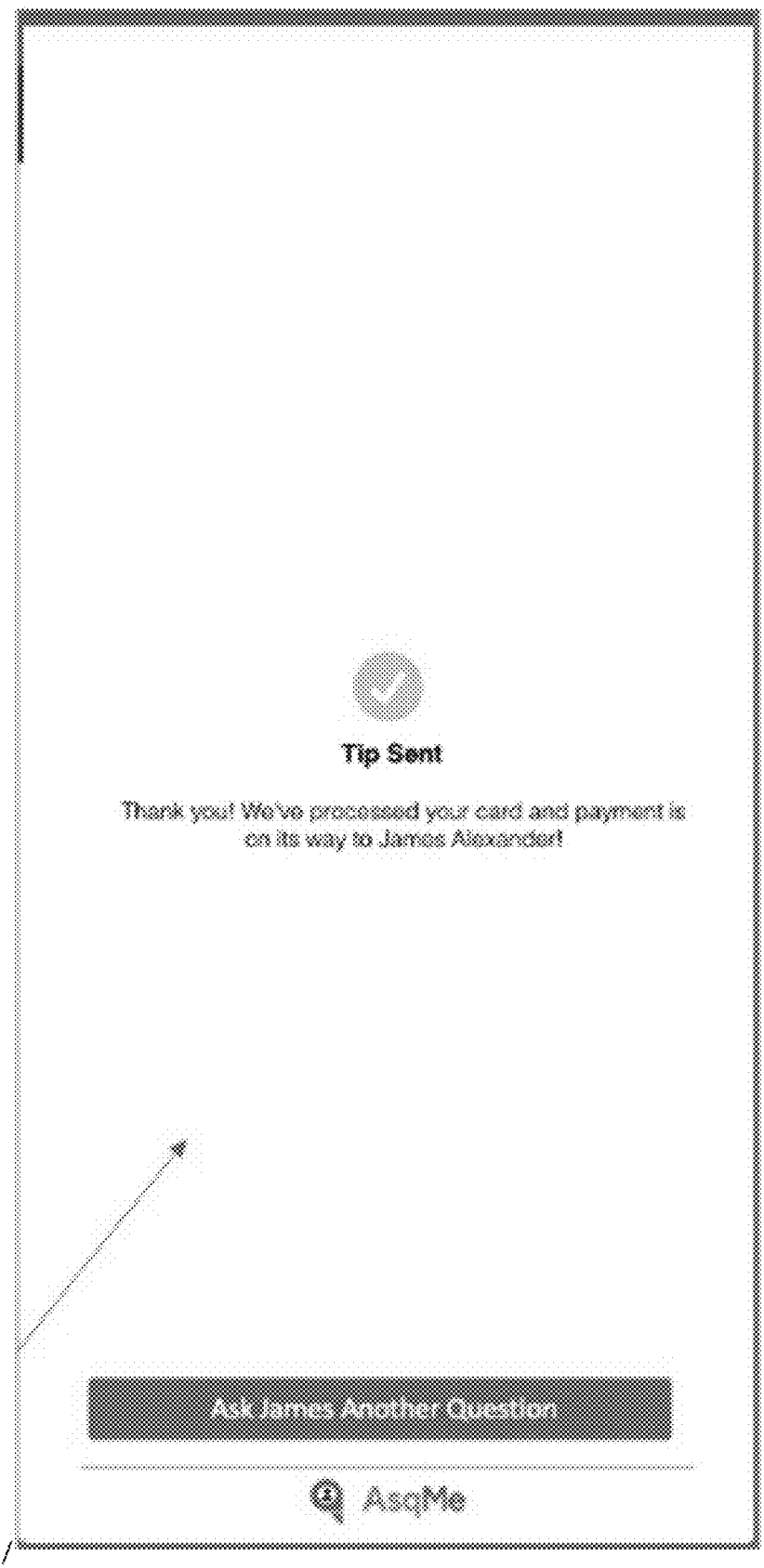

FIG. 10H illustrates a review page thanking the consumer and providing the option 1071 to the previous option of editing the consumer's tip or providing a tip should the consumer elected not to tip. 10I illustrates a template confirming that their tip was successfully processed.

Figure 11A:
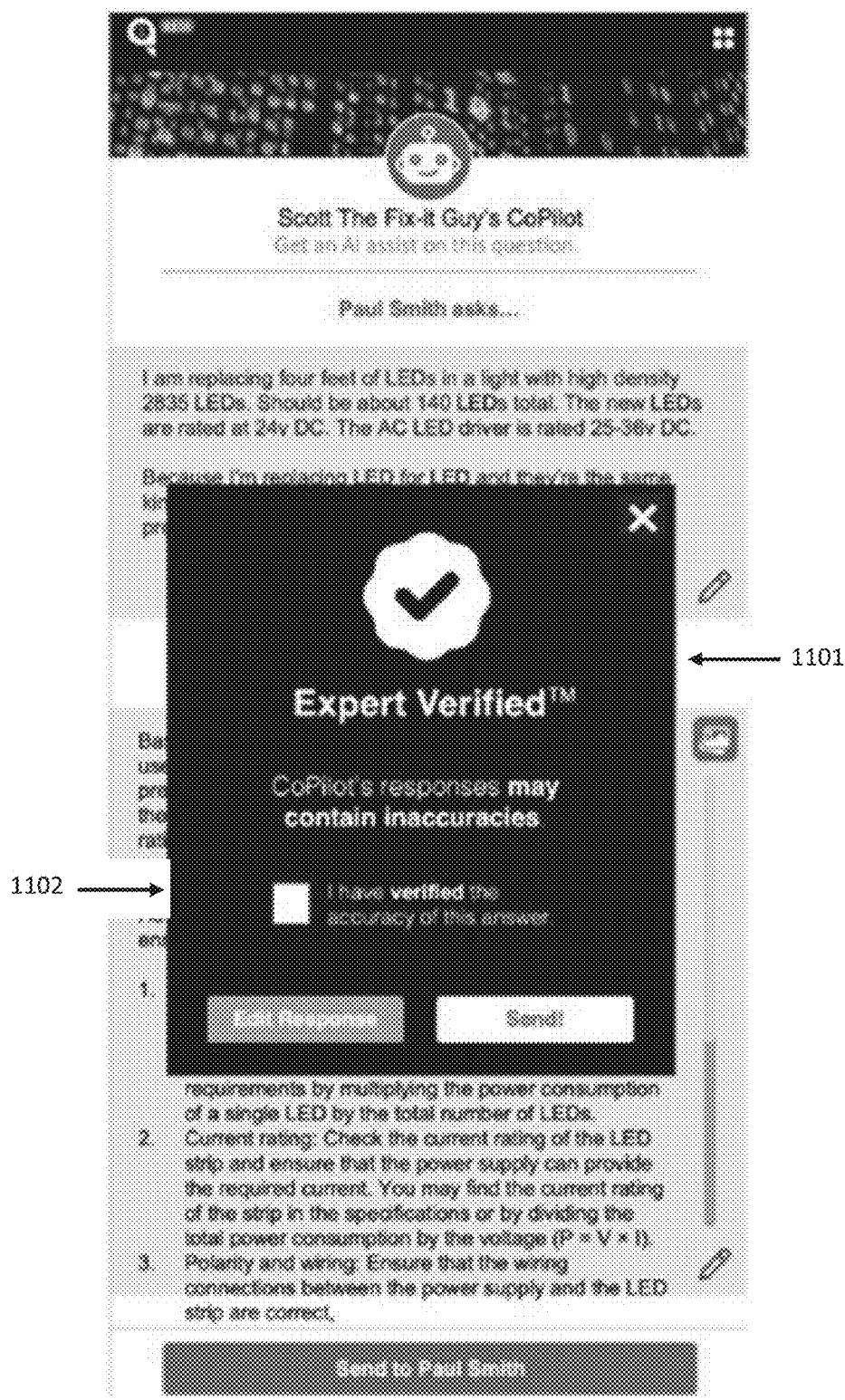
FIG. 11A through FIG. 11C illustrate example interfaces implementing a proactively Expert Verified answer, according to some aspects of the present disclosure.
Figure 11B:
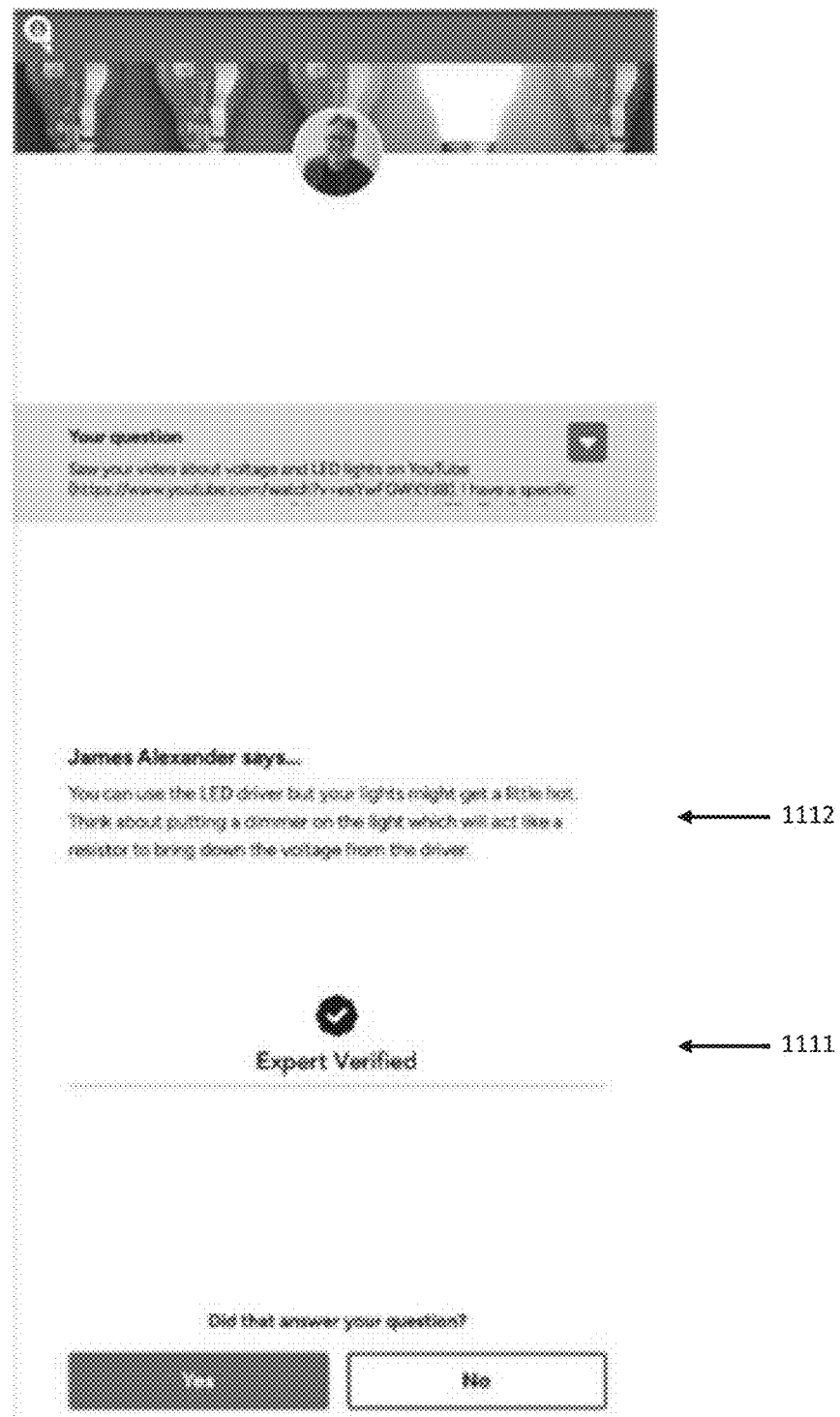
Figure 11C:
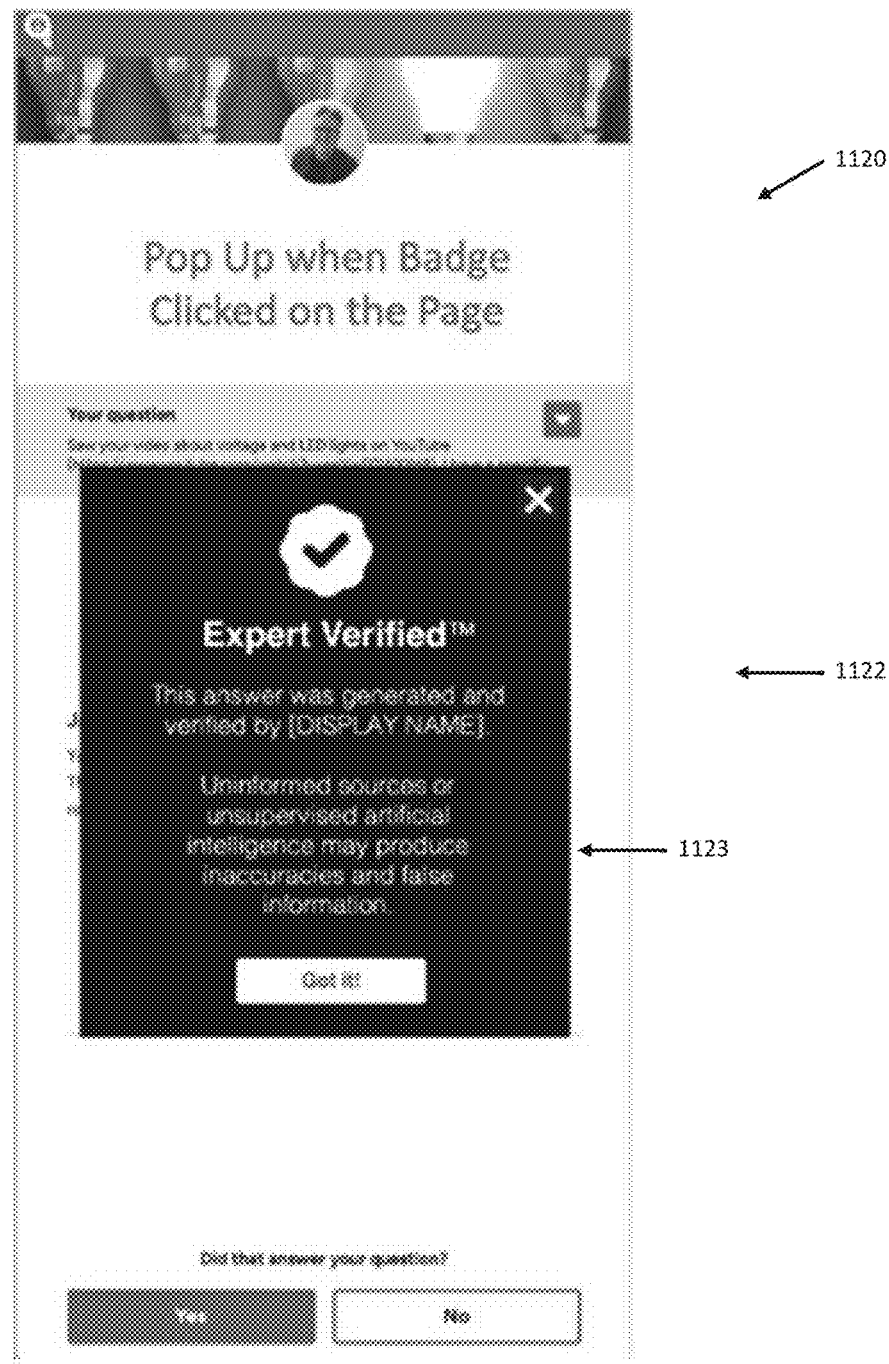

FIG. 11A through FIG. 11C illustrate example interfaces implementing a proactive expert verified answer, according to some aspects of the present disclosure. FIG. 11A illustrates a expert verification confirmation template 1101. The confirmation template 1101 can request confirmation 1102 from the content creator that they reviewed and approved the AI/ML generative response, for instance, by an affirmative input from the creator 1102. Upon approving the response an indicator 1111 such as a badge, emblem, icon, symbol, figure, mark, sign or the like can signify the creator has reviewed and approved the response. For example, FIG. 11B is a template displaying the content creator's response 1112 with the indicator 1111 displayed. A further informative template 1120, by way of example, see FIG. 11C, can inform 1122 the consumer that the content creator has reviewed the provided response for accuracy and approved the response or the generated response. In some instances, a disclaimer 1123 can be provided notifying the consumer of potential inaccuracy with the usage of AI/ML generative response.

In this regard, the present disclosure facilitates a content creator proactively generating what is referred to as an Expert Verified™ answer. For example, when a creator ticks a provided box indicating that the creator has verified the answer in "CoPilot," an Expert Verified badge is displayed with the answer, see FIGS. 11A and 11B. In another example, the creator does not check the box and no indication of verification is included with the answer. Relatedly, if a creator uses ChatGPT or the like (particularly outside of the direct communication platform), no badge can be added since there has been no creator verification of the supplied answer. A benefit of this feature is that it incentivizes creators to work within the direct communication platform platform.

Figure 12:
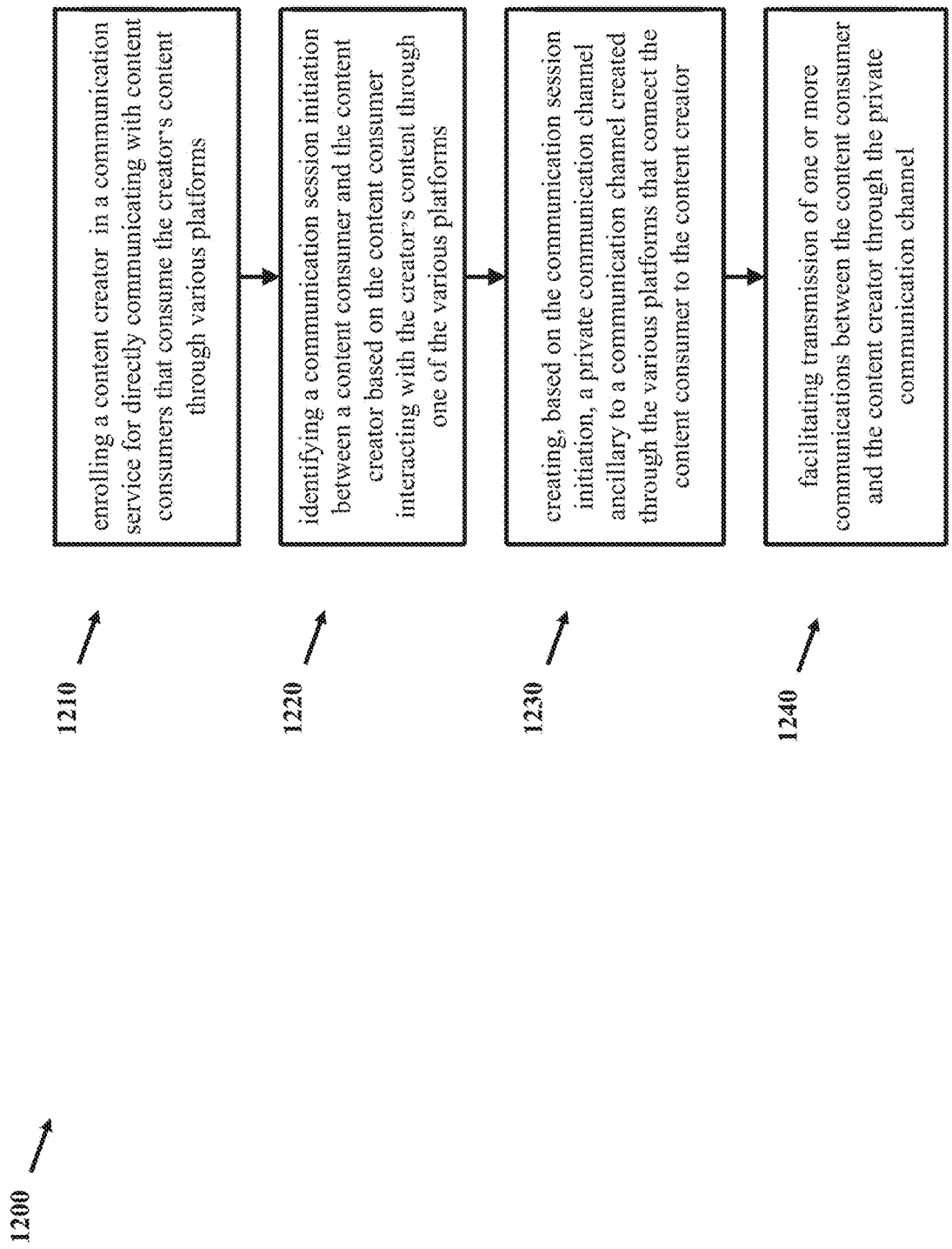
FIG. 12 is a flowchart illustrating an example method for implementing an onboarding platform for content creators, experts, and influencers and implementing a centralized forum in communicating among various social media platforms.

FIG. 12 illustrates an example method 1200 for establishing a private communication channel between a content creator and content consumer in response to a communication session being initiated from various platform of the content creator in accordance with one or more embodiments described herein. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

The method shown in FIG. 12 is provided by way of example, as there are a variety of ways to carry out the method. Additionally, while the example method is illustrated with a particular order of operations, those of ordinary skill in the art will appreciate that FIG. 12 and the modules shown therein can be executed in any order and can include fewer or more modules than illustrated. Each module shown in FIG. 12 represents one or more operations, processes, methods or routines in the method.

At step 1210, the process 1200 includes enrolling a content creator in a communication service for directly communicating with content consumers that each consume the creator's content through on one of a plurality of content-receiving platforms. As discussed above, the communication service provides a channel of communication from a plurality of social platforms into a distinct communication channel as part of direct communication between a content consumer and a content creator. Facilitating/enabling the direct communication between the content creator and content consumer, as discussed above, can be completed via, in at least one example, a private communication channel. Private communication channels include, but not limited to, a short message service communication channel, a text communication channel, a video communication channel, an augmented reality communication channel, a virtual reality communication channel, and combinations thereof.

By way of example, a communication service can be a direct communication platform that a content creator can onboard (e.g., join or create an account). The process of onboarding the communication service/direct communication platform links the content creator social platforms to the direct communication platform. As follows, social data can be derived from all or some of the various social platform of the content creator by the direct communication platform.

At step 1220, the process 1200 includes identifying a communication session initiation between a content consumer and the content creator based on the content consumer interacting with the creator's content on the one of the plurality of content-receiving platforms. The communication session initiation can include a question that is asked or other applicable communication session initiation. For example, activating the functionalities such as a link, button, scannable QR code or the like. In other examples, the communication session initiation can include posting or submitting a question on the content creator's social platform or directly on the creator's direct communication platform, discussed in detailed above.

At step 1230, the process 1200 includes creating, based on the communication session initiation, a private communication channel that connects the content consumer exclusively to the content creator. Examples of private communication channels include phone, emails, website chat, online messaging platforms, video conferencing, social media, and/or live chat. The private communication channel can be created through or otherwise as part of a direct communication platform that spans a plurality of different platforms used by the content creator to distribute content.

At step 1240, the process 1200 includes enabling transmission of at least communication from the content consumer to the content creator through the private communication channel. In at least one example, facilitating/enabling the transmission of one or more communications between the content consumer and the content creator through the private communication channel involve enabling the exchange of messages, information, communications, or the like between the consumer and the creator. Accordingly, the facilitation/enablement of communications can include actively receiving questions and transmitting them to the creator. In a similar fashion, the facilitation of communication can include actively receiving the creator's answers and transmitting them to the consumer. Moreover, the facilitation of communications can scan or ascertain published questions and deliver the questions to the creator.

Figure 13:
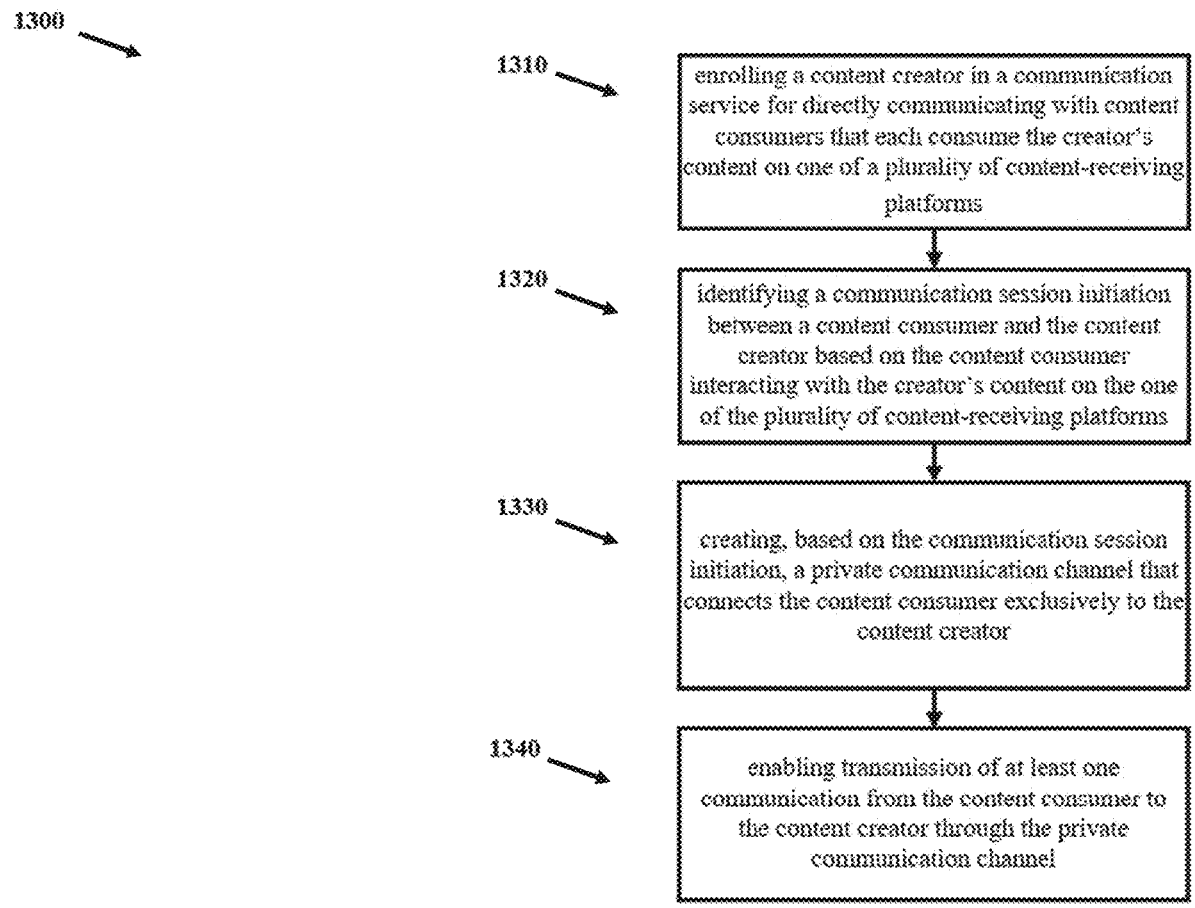
FIG. 13 is a flowchart illustrating an example method for implementing a prepaid answer in a centralized forum in communicating among various social media platforms.

FIG. 13 illustrates an example method 1300 for applying assisted response techniques in replying to the content consumer in a private communication channel in accordance with one or more embodiments described herein. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

The method shown in FIG. 13 is provided by way of example, as there are a variety of ways to carry out the method. Additionally, while the example method is illustrated with a particular order of operations, those of ordinary skill in the art will appreciate that FIG. 13 and the modules shown therein can be executed in any order and can include fewer or more modules than illustrated. Each module shown in FIG. 13 represents one or more operations, processes, methods or routines in the method.

At step 1310, the process 1300 includes enrolling a content creator in a communication service for directly communicating with content consumers that each consume the content creator's content on one of a plurality of content receiving platforms. As discussed above, the communication service provides a distinct channel of communication from a plurality of social platforms as part of direct communication between a content consumer and a content creator. In at least one aspect, the enrolling a content creator process can include the content creator onboarding a Direct/Private Communication Platform. This can then provide a direct, or otherwise private, communication channel in which content consumers can directly or privately communicate with the content creator. As follows, the content creator can designate which of their content platforms or accounts they want to associate with the direct communication platform. The direct communication platform can then add to the different content platforms that are associated with the direct communication platform functionalities for directly communicating with the content creator through the Direct Communication platform.

At step 1320, the process 1300 includes creating a private communication channel that connects the content consumer exclusively to the content creator. Examples of private communication channels include phone, emails, website chat, online messaging platforms, video conferencing, social media, and/or live chat. The private communication channel can be created through, or otherwise as part of, a direct communication platform that spans a plurality of different platforms used by the content creator to distribute content.

At step 1330, the process 1300 includes enabling transmission of at least one communication from a content consumer of the content consumers to the content creator through the private communication channel. In one aspect, the at least one communication is generated based on the content consumer interacting with the creator's content through one of the various platforms. In other aspects, the at least one communication is communicated to elicit a response from the content creator.

In at least one example, enabling the transmission of at least one communication from the content consumer to the content creator through the private communication channel involve enabling the exchange of messages, information, communications, or the like between the consumer and the creator. Accordingly, the facilitation of communications can include actively receiving questions and transmitting them to the creator. Alternatively, the facilitation of communication can include actively receiving the creator's answers and transmitting them to the consumer. In other aspects, the facilitation of communications can scan or ascertain published questions on the various social platforms and deliver the questions to the creator.

At step 1340, the process 1300 includes applying one or more assisted response techniques to assist the content creator in generating the response to the communication. By way of example, the use of AI/ML generative responder can generate responses based on content creator's private corpus of content, LLM, content creators' pool of knowledge, social data, or any combination thereof. In one example, the private corpus of content can comprise of the content creator's previous answer submitted, ratings of the consumers to the provide answer, and the like. The process 1300, in some aspects, can apply the AI/ML generative responder autonomously to questions with a threshold of previous accurate responses, post reviewed answer ratings, frequency of the question asked, and the like. In other aspects, the AI/ML generative responder can be applied preferentially based on the content creator's discretion or pre-generated with the option of the content creator to implement or decline.

At step 1350, the process 1300 includes enabling transmission of the response to the at least one communication from the content creator to the content consumer through the private communication channel. Upon the application of the AI/ML generative responder, the generated response can be transmitted to the content consumer via the private communication channel. Examples of providing answers through the private communication channel includes the direct communication platform sending the answer to the question of the content consumer via inbox, text messages, audio call, video conference, or publishing the answer on the original social platform.

Figure 14:
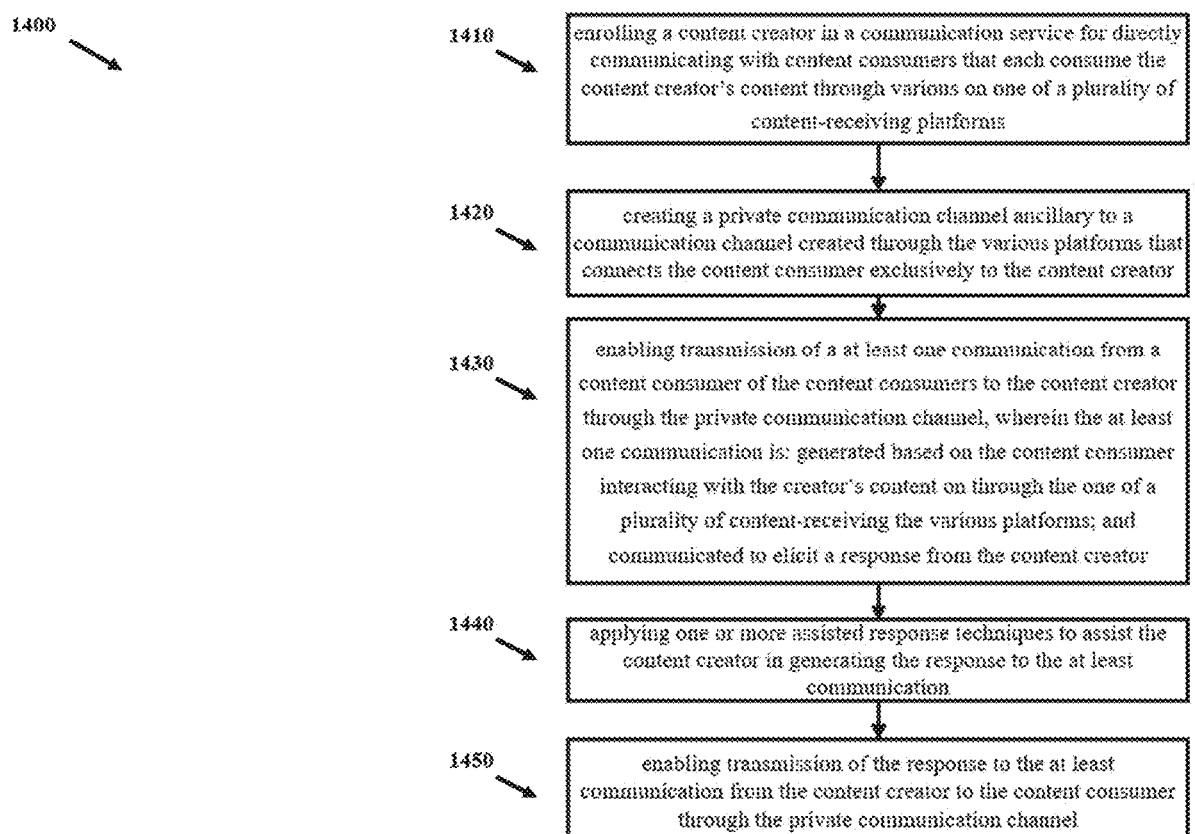
FIG. 14 is a flowchart illustrating an example method for implementing a centralized forum in communicating among various social media platforms.

FIG. 14 illustrates an example method 1400 of incorporating a service structure in establishing a private communication session between a content creator and content consumer in accordance with one or more embodiments described herein. Although the example method 1400 depicts a particular sequence of operations, the sequence may be altered without departing from the scope of the present disclosure. For example, some of the operations depicted may be performed in parallel or in a different sequence that does not materially affect the function of the method 1400. In other examples, different components of an example device or system that implements the method 1400 may perform functions at substantially the same time or in a specific sequence.

The method shown in FIG. 14 is provided by way of example, as there are a variety of ways to carry out the method. Additionally, while the example method is illustrated with a particular order of operations, those of ordinary skill in the art will appreciate that FIG. 14 and the modules shown therein can be executed in any order and can include fewer or more modules than illustrated. Each module shown in FIG. 14 represents one or more operations, processes, methods or routines in the method.

At step 1410, the process 1400 includes enrolling a content creator in a communication service for directly communicating with content consumers that each consume the creator's content through on one of a plurality of content-receiving platforms. As discussed above, the communication service provides a channel of communication from a plurality of social platforms into a distinct communication channel as part of direct communication between a content consumer and a content creator. In at least one aspect, the enrolling a content creator process can include the content creator onboarding a Direct/Private Communication Platform. Such an aspect can then provide a direct, or otherwise private, communication channel in which content consumers can directly or privately communicate with the content creator. As follows, the content creator can designate which content platforms or accounts they want to associate with the direct communication platform. The direct communication platform can then add to the different content platforms that are associated with the direct communication platform functionalities for directly communicating with the content creator through the Direct Communication platform. Further, the direct communication platform can derive social data from the selected social platforms of the creator. At step 1420, the process 1400 includes identifying a communication session initiation between a content consumer and the content creator based on the content consumer interacting with the creator's content on the plurality of content-receiving platforms. The communication session initiation can include a question that is asked or other applicable communication session initiation. For example, activating the functionalities such as a link, button, scannable QR code or the like. In other examples, the communication session initiation can include posting or submitting a question on the content creator's social platform or directly on the creator's direct communication platform, discussed in detailed above.

At step 1430, the process 1400 includes creating, based on the communication session initiation, a private communication channel that connects the content consumer exclusively to the content creator. Examples of private communication channels include phone, emails, website chat, online messaging platforms, video conferencing, social media, and/or live chat. The private communication channel can be created through or otherwise as part of a direct communication platform that spans a plurality of different platforms used by the content creator to distribute content.

At step 1440, the process 1400 includes identifying a service structure for controlling communications between the content consumer and the content creator through the private communication channel. Examples of service structures include the exchange of monetary or non-monetary payments to the content creator in return for the content creator to provide an expediate answer or certain form of answer. For example, certain considerations in the expediate answer includes a time restraint, certain medium of communication, urgency, or the like. Specific examples of the service structure include the consumer limiting the timing of the response to be within hours, within days, within weeks, instant or on demand, or the like. Specific examples of certain medium of communication the consumer can select from includes the answer being in a text format, audio format, video format, live audio and/or video call, or the like.

Aspects of implementing the service structure include the creator defining the type (i.e., timing of response) and kind (i.e., format of answer) of answer the creator is willing to offer. As such, the content consumer's question can have a higher priority in the query line.

At step 1450, the process 1400 includes enabling transmission of at least one communications from the content consumer to the content creator through the private communication channel based on the identified service structure. In at least one example, facilitating the transmission of the at least one communications between the content consumer and the content creator through the private communication channel involve enabling the exchange of messages, information, communications, or the like between the consumer and the creator. Accordingly, the facilitation of communications can include actively receiving questions and transmitting them to the creator. Alternatively, the facilitation/enablement of at least one communication can include actively receiving the creator's answers and transmitting them to the consumer. In at least one example, the transmitting of the at least one communication from the creator and consumer can be simultaneously. Moreover, the facilitation/enablement of at least one communication can scan or ascertain published questions and deliver the questions to the creator.

Figure 15:
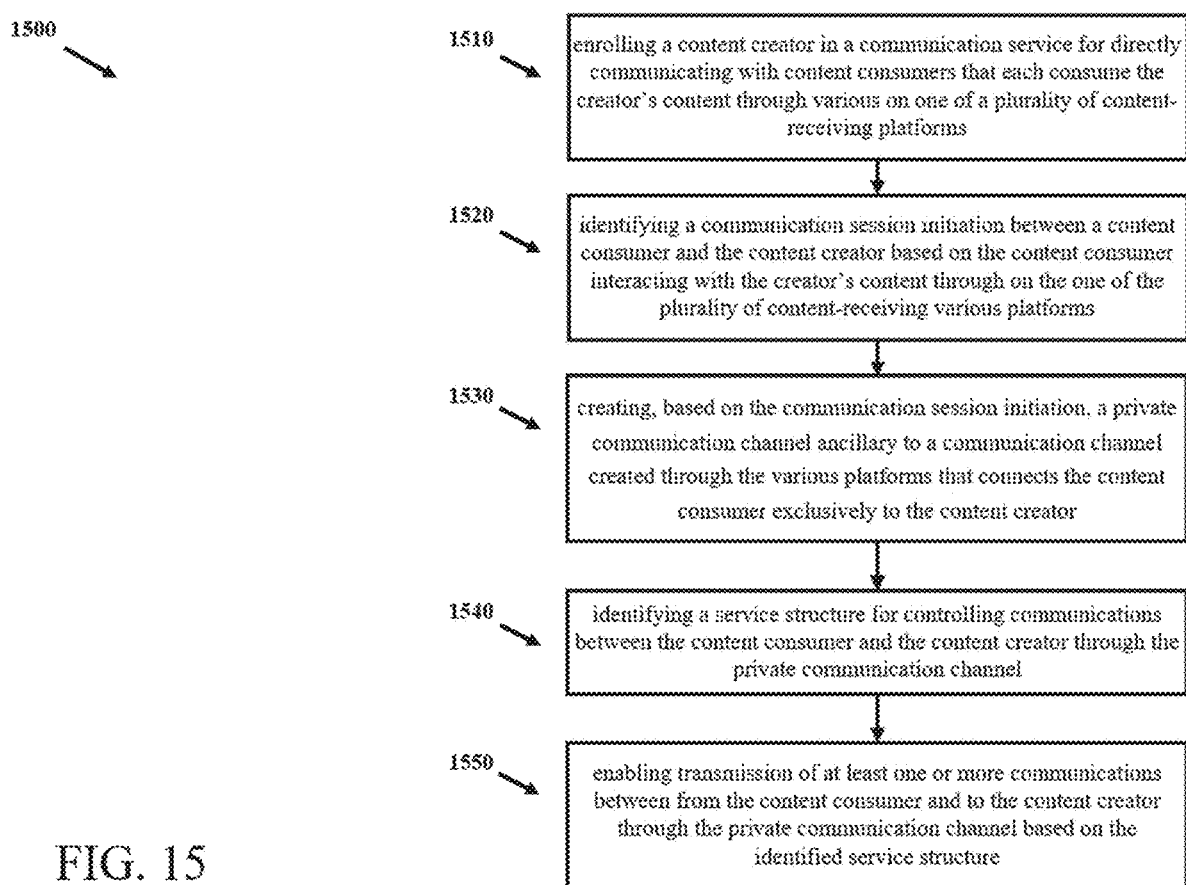
FIG. 15 illustrates an example of a deep learning neural network, according to some aspects of the present technology.

In FIG. 15, the disclosure now turns to a further discussion of models that can be used through the environments and techniques described herein.

An example of a deep learning neural network 1500 is depicted that can be used to implement all or a portion of the systems and techniques described herein. An input layer 1520 can be configured to receive sensor data and/or data relating to an environment surrounding an AV. Neural network 15100 includes multiple hidden layers 1522*a*, 1522*b*, through 1522*n*. The hidden layers 1522*a*, 1522*b*, through 1522*n* include "n" number of hidden layers, where "n" is an integer greater than or equal to one. The number of hidden layers can be made to include as many layers as needed for the given application. Neural network 1500 further includes an output layer 1521 that provides an output resulting from the processing performed by the hidden layers 1522*a*, 1522*b*, through 1522*n*.

Neural network 1500 is a multi-layer neural network of interconnected nodes. Each node can represent a piece of information. Information associated with the nodes is shared among the different layers and each layer retains information as information is processed. In some cases, the neural network 1500 can include a feed-forward network, in which case there are no feedback connections where outputs of the network are fed back into itself. In some cases, the neural network 1500 can include a recurrent neural network, which can have loops that allow information to be carried across nodes while reading in input.

Information can be exchanged between nodes through node-to-node interconnections between the various layers. Nodes of the input layer 1520 can activate a set of nodes in the first hidden layer 1522*a*. For example, as shown, each of the input nodes of the input layer 1520 is connected to each of the nodes of the first hidden layer 1522*a*. The nodes of the first hidden layer 1522*a* can transform the information of each input node by applying activation functions to the input node information. The information derived from the transformation can then be passed to and can activate the nodes of the next hidden layer 1522*b*, which can perform their own designated functions. Example functions include convolutional, up-sampling, data transformation, and/or any other suitable functions. The output of the hidden layer 1522*b* can then activate nodes of the next hidden layer, and so on. The output of the last hidden layer 1522*n* can activate one or more nodes of the output layer 1521, at which an output is provided. In some cases, while nodes in the neural network 1500 are shown as having multiple output lines, a node can have a single output and all lines shown as being output from a node represent the same output value.

In some cases, each node or interconnection between nodes can have a weight that is a set of parameters derived from the training of the neural network 1500. Once the neural network 1500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1100 to be adaptive to inputs and able to learn as more and more data is processed.

The neural network 1500 is pre-trained to process the features from the data in the input layer 1520 using the different hidden layers 1522*a*, 1522*b*, through 1522*n* in order to provide the output through the output layer 1521.

In some cases, the neural network 1500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 1100 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 1100 can perform a backward pass by determining which inputs (weights) most contributed to the loss of the network, and can adjust the weights so that the loss decreases and is eventually minimized.

The neural network 1500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 1500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 16:
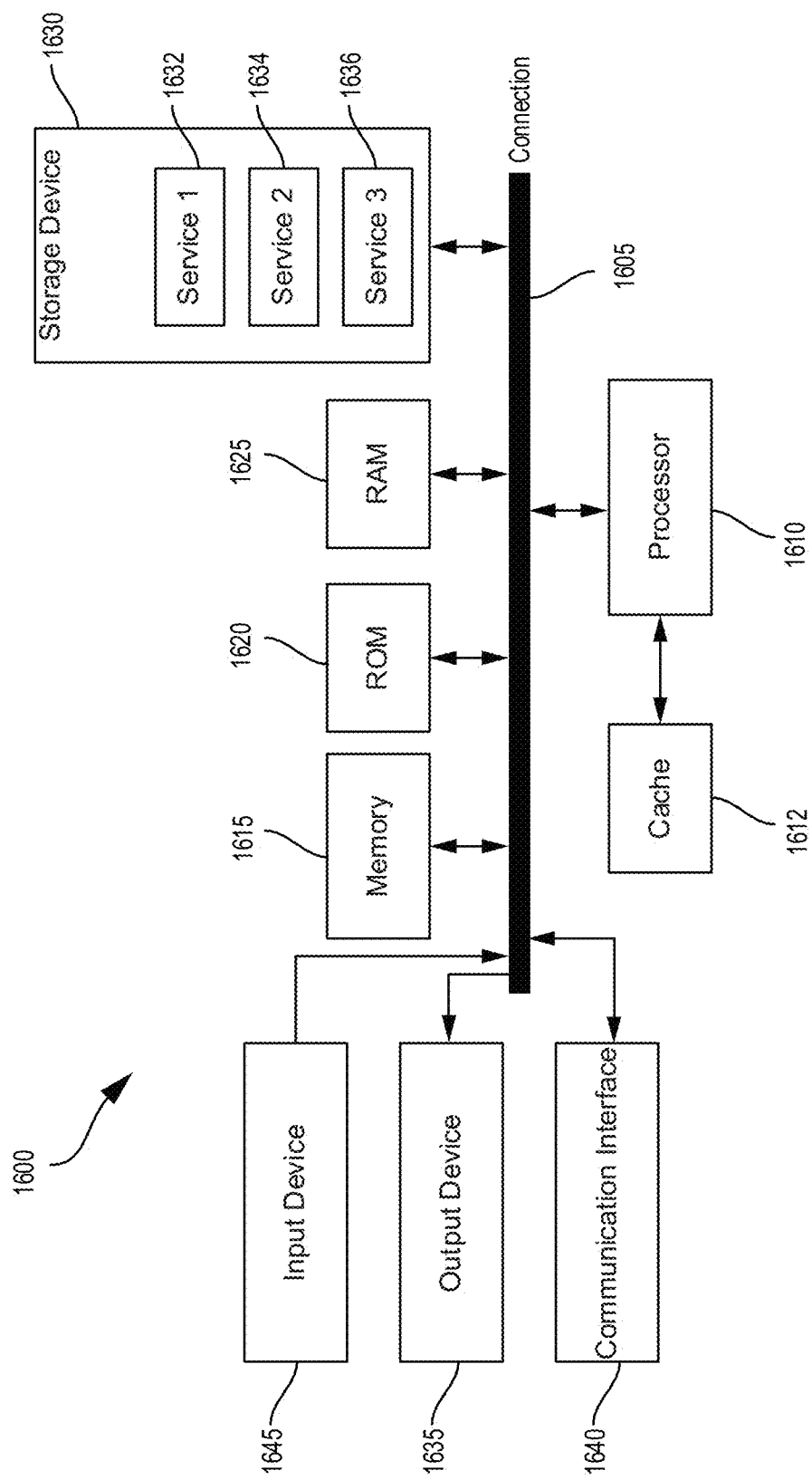
FIG. 16 illustrates an example processor-based system with which some aspects of the subject technology can be implemented.

FIG. 16 illustrates an example processor-based system with which some aspects of the subject technology can be implemented.

In this example, a processor-based system 1620 can be any computing device making up, or any component thereof in which the components of the system are in communication with each other using connection 1605. Connection 1605 can be a physical connection via a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (Central Processing Unit (CPU) or processor) 1610 and connection 1605 that couples various system components including system memory 1615, such as Read-Only Memory (ROM) 1620 and Random-Access Memory (RAM) 1625 to processor 1610. Computing system 1600 can include a cache of high-speed memory 1612 connected directly with, in close proximity to, or integrated as part of processor 1610.

Processor 1610 can include any general-purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms known to those of skill in the art. In some instances, multimodal systems can enable a user to provide multiple types of input/output to communicate with computing system 1600. Computing system 1600 can include communications interface 1640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1630 can include software services, servers, services, etc., that when the code that defines such software is executed by the processor 1610, it causes the system 1600 to perform a function. In some embodiments, a hardware service that performs a particular function can include the software component stored in a computer-readable medium in connection with the necessary hardware components, such as processor 1610, connection 1605, output device 1635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1. A method comprising: enrolling a content creator in a communication service for directly communicating with content consumers that each consume the creator's content on one of a plurality of content-receiving platforms; identifying a communication session initiation between a content consumer and the content creator based on the content consumer interacting with the creator's content on the one of the plurality of content-receiving platforms; creating, based on the communication session initiation, a private communication channel that connects the content consumer exclusively to the content creator; and enabling transmission of at least one communication from the content consumer to the content creator through the private communication channel.

Aspect 2. The method of Aspect 1, wherein the at least one communication is a question from the content consumer to the content creator that is generated based on the content consumer interacting with the creator's content.

Aspect 3. The method of any of Aspects 1 to 2, wherein the communication session initiation is a comment that is posted for the content creator from the content consumer on the content-receiving platform.

Aspect 4. The method of Aspect 3, wherein the at least one communication is a question from the content consumer to the content creator that is generated based on the content consumer interacting with the creator's content on the one of the plurality of the content-receiving platforms.

Aspect 5. The method of Aspect 3, further comprising: accessing a feed of comments by a plurality of content consumers to the content creator on the one of a plurality of content-receiving platforms; recognizing that the comment that is sent to the content creator by the content consumer is a question that is generated based on the content consumer interacting with the creator's content through the one of a plurality of content-receiving platforms; and enabling transmission of the question as a communication between the content consumer and the content creator through the private communication channel based on the comment being a request for information.

Aspect 6. The method of any of Aspects 1 to 5, wherein the communication session initiation is the content consumer interacting with a link that is presented to the content consumer through the one of the plurality of content-receiving platforms.

Aspect 7. The method of any of Aspects 1 to 6, further comprising: selecting whether to send a communication of the one or more communications between the content consumer and the content creator either synchronously or asynchronously through the private communication channel; and transmitting the communication as either a synchronous or an asynchronous message between the content consumer and the content creator based on the selection to send the communication either synchronously or asynchronously.

Aspect 8. The method of any of Aspects 1 to 7, wherein the at least one communication comprises a direct communication that originates from the content consumer and is presented to the content creator through a unified platform that both: creates corresponding private communication channels between the content consumers and the content creator; and facilitates direct communications between the content consumers and the content creator through the corresponding private communication channels.

Aspect 9. The method of Aspect 8, wherein each of the corresponding private communication channels is specific to a corresponding content consumer of the content consumers.

Aspect 10. The method of Aspect 8, wherein the private communication channel comprises at least one of: an email communication channel, a short message service communication channel, a text communication channel, a video communication channel, an augmented reality communication channel, a virtual reality communication channel, and combinations thereof.

Aspect 11. The method of Aspect 8, wherein the unified platform: aggregates communications that are sent from content consumers to the content creator through direct communication channels; and presents the aggregated communications to the content creator.

Aspect 12. The method of Aspect 8, wherein the direct communications occur based on communications from the content consumers to the content creator across the plurality of content-receiving platforms.

Aspect 13. The method of Aspect 8, wherein a direct communication from the content creator to the content consumer is an answer to a question that was sent by the content consumer to the content creator through a private communication channel between the content creator and the content consumer through the unified platform.

Aspect 14. The method of any of Aspects 1 to 13, further comprising: identifying that a communication of the one or more communications that is sent through the private communication channel from the content consumer to the content creator is in a language that is foreign to the content creator; translating the communication into a specific language associated with the content creator; and presenting the translated communication to the content creator.

Aspect 15. The method of Aspect 14, further comprising: accessing a responsive communication from the content creator; translating the responsive communication into a corresponding language in which the communication is transmitted from the content consumer to the content creator; and presenting the translated responsive communication to the content consumer.

Aspect 16. The method of any of Aspects 1 to 15, wherein the one or more communications between the content consumer and the content creator comprise one or more attachments related to the content.

Aspect 17. The method of any of Aspects 1 to 16, wherein the one or more communications between the content consumer and the content creator comprise one or more potential follow up questions in relation to the content.

Aspect 18. An apparatus comprising one or more processors; and at least one computer-readable storage medium having stored therein instructions which, when executed by the one or more processors, cause the one or more processors to: enroll a content creator in a communication service for directly communicating with content consumers that consume the creator's content through plurality of content-receiving platforms; identify a communication session initiation between a content consumer and the content creator based on the content consumer interacting with the creator's content through one of the plurality of content-receiving platforms; create, based on the communication session initiation, a private communication channel that connects the content consumer exclusively to the content creator; and facilitate transmission of one or more communications between the content consumer and the content creator through the private communication channel.

Aspect 19. The apparatus of Aspect 18 wherein the communication session initiation is a comment that is posted for the content creator from the content consumer through the one of the plurality of content-receiving platforms and the instructions further cause the one or more processors to: access a feed of comments by a plurality of content consumers to the content creator through the one of the plurality of content-receiving platforms; recognize that the comment that is sent to the content creator by the content consumer is a question that is generated based on the content consumer interacting with the creator's content through the one of the plurality of content-receiving platforms; and facilitate transmission of the question as a communication between the content consumer and the content creator through the private communication channel based on the comment being a request for information.

Aspect 20. A non-transitory computer-readable medium instructions storing instructions for causing one or more processors to: enroll a content creator in a communication service for directly communicating with content consumers that consume the creator's content through plurality of content-receiving platforms; identify a communication session initiation between a content consumer and the content creator based on the content consumer interacting with the creator's content through one of the plurality of content-receiving platforms; create, based on the communication session initiation, a private communication channel that connects the content consumer exclusively to the content creator; and facilitate transmission of one or more communications between the content consumer and the content creator through the private communication channel.

Aspect 21. A method comprising: enrolling a content creator in a communication service for directly communicating with content consumers that each consume the content creator's content through a plurality of content-receiving platforms; creating a private communication channel that connects the content consumer exclusively to the content creator; and enabling transmission of at least one communication from a content consumer of the content consumers to the content creator through the private communication channel, wherein the communication is: generated based on the content consumer interacting with the creator's content on the one of a plurality of content-receiving platforms; and communicated to elicit a response from the content creator; applying one or more assisted response techniques to assist the content creator in generating the response to the communication; and enabling transmission of the response to the communication from the content creator to the content consumer through the private communication channel.

Aspect 22. The method of Aspect 21, wherein the at least one communication from the content consumer to the content creator is a question for the content consumer that is generated based on the content consumer consuming the creator's content and the response to the at least one communication is a response to the question.

Aspect 23. The method of Aspect 22, wherein the one or more assisted response techniques include: generating a suggested answer to the question; and enabling transmission of the response to the at least one communication from the content creator to the content consumer based on the suggested answer.

Aspect 24. The method of Aspect 23, wherein the one or more assisted response techniques include: determining whether the content creator has answered a same question or a similar question to the question that is in the at least one communication from the content consumer to the content creator; and generating the suggested answer based on a response made by the content creator to the same question or the similar question if the content creator has answered the same question or the similar question.

Aspect 25. The method of Aspect 23, further comprising automatically transmitting the suggested answer as the response to the at least one communication from the content creator to the content consumer based on irrespective of approval of the suggested answer from the content creator.

Aspect 26. The method of Aspect 25, wherein suggested answer is automatically transmitted as the response to the at least one communication based on a degree of similarity between the question and a question previously answered by the content creator.

Aspect 27. The method of Aspect 23, further comprising: presenting the suggested answer to the content creator; and transmitting the suggested answer as the response to the at least one communication from the content creator to the content consumer based on approval of the suggested answer from the content creator.

Aspect 28. The method of Aspect 27, further comprising: accessing feedback of the suggested answer from the content creator; modifying the suggested answer based on the feedback from the content creator to generate a modified suggested answer; and transmitting the modified suggested answer as the response to the at least one communication as part of transmitting the suggested answer as the response to the at least one communication from the content creator to the content consumer based on the approval of the suggested answer from the content creator.

Aspect 29. The method of Aspect 23, wherein the suggested answer to the question is generated by applying one or more large language models to the question.

Aspect 30. The method of Aspect 29, accessing feedback of the question from the content creator; modifying the question based on the feedback from the content creator to generate a modified question; and applying the one or more language models to the modified question to generate the suggested answer.

Aspect 31. The method of Aspect 22, wherein applying one or more assisted response techniques to assist the content creator in generating the response to the at least one communication further comprises: determining whether the question is answered in the creator's content; and automatically generating the response to the at least one communication that includes an indication that an answer to the question is in the creator's content that the content consumer interacted with in generating the question.

Aspect 32. The method of Aspect 31, wherein the response to the at least one communication is automatically generated to include an indication of a location of the answer to the question in the creator's content.

Aspect 33. The method of Aspect 22, wherein the one or more assisted response techniques account for answer feedback from content consumers in generating the response to the question.

Aspect 34. An apparatus comprising one or more processors and at least one computer-readable storage medium having stored therein instructions which, when executed by the one or more processors, cause the one or more processors to: enroll a content creator in a communication service for directly communicating with content consumers that each consume the content creator's content through plurality of content-receiving platforms; create a private communication channel that connects the content consumer exclusively to the content creator; and enabling transmission of at least one communication from a content consumer of the content consumers to the content creator through the private communication channel, wherein the communication is: generated based on the content consumer interacting with the creator's content on the one of a plurality of content-receiving platforms; and communicated to elicit a response from the content creator; apply one or more assisted response techniques to assist the content creator in generating the response to the communication; and enabling transmission of the response to the at least one communication from the content creator to the content consumer through the private communication channel.

Aspect 35. The apparatus of Aspect 34, wherein the at least one communication from the content consumer to the content creator is a question for the content consumer that is generated based on the content consumer consuming the creator's content and the response to the at least one communication is a response to the question and the one or more assisted response techniques include: generating a suggested answer to the question; and enabling transmission of the response to the at least one communication from the content creator to the content consumer based on the suggested answer.

Aspect 36. The apparatus of Aspect 35, wherein the instructions are further configured to cause the one or more processors to: determine whether the content creator has answered a same question or a similar question to the question that is in the at least one communication from the content consumer to the content creator; and generate the suggested answer based on a response made by the content creator to the same question or the similar question if the content creator has answered the same question or the similar question.

Aspect 37. The apparatus of Aspect 35, wherein the instructions are further configured to cause the one or more processors to: present the suggested answer to the content creator; and access feedback of the suggested answer from the content creator;
    modify the suggested answer based on the feedback from the content creator to generate a modified suggested answer; and transmit the modified suggested answer as the response to the at least one communication as part of transmitting the suggested answer as the response to the at least one communication from the content creator to the content consumer based on approval of the suggested answer from the content creator.

Aspect 38. The apparatus of Aspect 35, wherein the instructions are further configured to cause the one or more processors to apply one or more large language models to the question to generate the suggested answer to the question.

Aspect 39. The apparatus of Aspect 35, wherein the instructions are further configured to cause the one or more processors to: determine whether the question is answered in the creator's content; and automatically generate the response to the at least one communication that includes an indication that an answer to the question is in the creator's content that the content consumer interacted with in generating the question.

Aspect 40. A non-transitory computer-readable storage medium storing instructions for causing one or more processors to: enroll a content creator in a communication service for directly communicating with content consumers that each consume the content creator's content on one of a plurality of content-receiving platforms; create a private communication channel ancillary that connects the content consumer exclusively to the content creator; and enabling transmission of at least one communication from a content consumer of the content consumers to the content creator through the private communication channel, wherein the communication is: generated based on the content consumer interacting with the creator's content on the one of a plurality of content-receiving platforms; and communicated to elicit a response from the content creator; apply one or more assisted response techniques to assist the content creator in generating the response to the communication; and enabling transmission of the response to the communication from the content creator to the content consumer through the private communication channel.

Aspect 41. A method comprising: enrolling a content creator in a communication service for directly communicating with content consumers that consume the creator's content through plurality of content-receiving platforms; identifying a communication session initiation between a content consumer and the content creator based on the content consumer interacting with the creator's content through one of the plurality of content-receiving platforms; creating, based on the communication session initiation, a private communication channel that connects the content consumer exclusively to the content creator; identifying a service structure for controlling communications between the content consumer and the content creator through the private communication channel; and enabling transmission of one or more communications between the content consumer and the content creator through the private communication channel based on the identified service structure.

Aspect 42. The method of Aspect 41, wherein the service structure comprises paying to receive a response from the content creator, the method further comprising: selecting a payment amount to charge for receiving the response from the content creator; facilitating charging the content consumer the payment amount; and enabling transmission of the response from the content creator to the content consumer through the private communication channel based on tendering of the payment amount by the content consumer.

Aspect 43. The method of Aspect 42, wherein the payment amount is selected based on demand of the content creator in responding to the at least one communication of content consumers who consume the creator's content.

Aspect 44. The method of Aspect 42, wherein the payment amount is selected through application of a machine learning model.

Aspect 45. The method of Aspect 42, wherein the payment amount is selected based on an urgency of the content consumer in receiving the response from the content creator.

Aspect 46. The method of Aspect 45, further comprising: presenting the payment amount to the content consumer; presenting an expected response time for receiving the response from the content creator based on the payment amount; and notifying the content creator of the expected response time if the payment amount is tendered by the content consumer.

Aspect 47. The method of Aspect 42, wherein the service structure comprises providing the response from the content creator to the content consumer while facilitating tendering of a gratuity from the content consumer to the content creator.

Aspect 48. The method of Aspect 47, wherein the service structure further comprises providing the response from the content creator to the content consumer for free while facilitating tendering of the gratuity.

Aspect 49. The method of Aspect 47, wherein the service structure further comprises providing the response from the content creator to the content consumer for a payment amount while facilitating tendering of the gratuity.

Aspect 50. The method of Aspect 47, further comprising: identifying a suggested gratuity amount; and presenting an indication of the suggested gratuity amount to the content consumer for facilitating the tendering of the gratuity from the content consumer to the content creator.

Aspect 51. The method of Aspect 50, wherein the suggested gratuity amount is identified through application of a machine learning model.

Aspect 52. The method of Aspect 50, wherein the suggested gratuity amount is identified based on characteristics of the content creator in relation to making content.

Aspect 53. The method of Aspect 50, wherein the suggested gratuity amount is identified based on ratings of the content creator in responding to the at least one communication of content consumers who consume the creator's content.

Aspect 54. The method of any of Aspects 41 to 53, wherein the service structure comprises providing a response from the content creator to the content consumer free of charge.

Aspect 55. An apparatus comprising one or more processors; and at least one computer-readable storage medium having stored therein instructions which, when executed by the one or more processors, cause the one or more processors to: enroll a content creator in a communication service for directly communicating with content consumers that consume the creator's content through plurality of content-receiving platforms; identify a communication session initiation between a content consumer and the content creator based on the content consumer interacting with the creator's content through one of the plurality of content-receiving platforms; create, based on the communication session initiation, a private communication channel that connects the content consumer exclusively to the content creator; identify a service structure for controlling communications between the content consumer and the content creator through the private communication channel; and facilitate transmission of one or more communications between the content consumer and the content creator through the private communication channel based on the identified service structure.

Aspect 56. The apparatus of Aspect 55, wherein the service structure comprises paying to receive a response from the content creator and the instructions are further configured to cause the one or more processors to: select a payment amount to charge for receiving the response from the content creator; facilitate charging the content consumer the payment amount; and facilitate transmission of the response from the content creator to the content consumer through the private communication channel based on tendering of the payment amount by the content consumer.

Aspect 57. The apparatus of Aspect 56, wherein the payment amount is selected based on an urgency of the content consumer in receiving the response from the content creator and the instructions are further configured to cause the one or more processors to: present the payment amount to the content consumer; present an expected response time for receiving the response from the content creator based on the payment amount; and notify the content creator of the expected response time if the payment amount is tendered by the content consumer.

Aspect 58. The apparatus of any of Aspects 55-57, wherein the service structure comprises providing the response from the content creator to the content consumer while facilitating tendering of a gratuity from the content consumer to the content creator and the instructions are further configured to cause the one or more processors to: identify a suggested gratuity amount; and present an indication of the suggested gratuity amount to the content consumer for facilitating the tendering of the gratuity from the content consumer to the content creator.

Aspect 59. The apparatus of any of Aspects 55-58, wherein the service structure comprises providing a response from the content creator to the content consumer free of charge.

Aspect 60. A non-transitory computer-readable storage medium storing for causing one or more processors to: enroll a content creator in a communication service for directly communicating with content consumers that consume the creator's content through plurality of content-receiving platforms; identify a communication session initiation between a content consumer and the content creator based on the content consumer interacting with the creator's content through one of the plurality of content-receiving platforms; create, based on the communication session initiation, a private communication channel that connects the content consumer exclusively to the content creator; identify a service structure for controlling communications between the content consumer and the content creator through the private communication channel; and facilitate/enable transmission of at least one communication from the content consumer to the content creator through the private communication channel based on the identified service structure.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
    enrolling a content creator in a centralized messaging platform, wherein the centralized messaging platform is a communication service for directly communicating with content consumers that each consume the creator's content on one of a plurality of content-receiving platforms;
    identifying a communication session initiated by a content consumer based on the content consumer interacting with the creator's content on the one of the plurality of content-receiving platforms;
    creating, based on the communication session initiated by the content consumer, a private communication channel that connects the content consumer exclusively to the content creator, wherein the private communication channel includes a citation of the creator's content interacted by the content consumer;
    identifying a service structure for controlling communications between the content consumer and the content creator through the private communication channel;
    enabling transmission of at least one communication from the content consumer to the content creator through the private communication channel based on the identified service structure;
    based on the identified service structure, applying one or more assisted response techniques to assist the content creator in generating the response to the at least one communication, wherein the one or more assisted response techniques comprise:
        generating a suggested answer to a question;
        presenting the suggested answer to the content creator;
        accessing feedback of the suggested answer from the content creator;
        modifying the suggested answer based on the feedback from the content creator to generate a modified suggested answer; and
        as the response to the at least one communication, transmitting either the suggested answer or modified suggested answer from the content creator to the content consumer based on an approval of the modified suggested answer from the content creator.

2. The method of claim 1, wherein the service structure comprises paying to receive a response from the content creator, the method further comprising:
    selecting a payment amount to charge for receiving the response from the content creator;
    facilitating charging the content consumer the payment amount; and
    enabling transmission of the response from the content creator to the content consumer through the private communication channel based on tendering of the payment amount by the content consumer.

3. The method of claim 2, wherein the payment amount is selected through application of a machine learning model.

4. The method of claim 2, wherein the payment amount is selected based on an urgency of the content consumer in receiving the response from the content creator.

5. The method of claim 4, further comprising:
    presenting the payment amount to the content consumer;
    presenting an expected response time for receiving the response from the content creator based on the payment amount; and
    notifying the content creator of the expected response time if the payment amount is tendered by the content consumer.

6. The method of claim 2, wherein the service structure comprises providing the response from the content creator to the content consumer while facilitating tendering of a gratuity from the content consumer to the content creator.

7. The method of claim 6, further comprising:
    identifying a suggested gratuity amount; and
    presenting an indication of the suggested gratuity amount to the content consumer for facilitating the tendering of the gratuity from the content consumer to the content creator.

8. The method of claim 7, wherein the suggested gratuity amount is identified through application of a machine learning model.

9. The method of claim 7, wherein the suggested gratuity amount is identified based on characteristics of the content creator in relation to making content.

10. The method of claim 7, wherein the suggested gratuity amount is identified based on ratings of the content creator in responding to the at least one communication of content consumers who consume the creator's content.

11. A system comprising:
    a memory; and
    at least one processor coupled to the memory, wherein the at least one processor is configured to:
        enroll a content creator in a centralized messaging platform, wherein the centralized messaging platform is a communication service for directly communicating with content consumers that each consume the creator's content on one of a plurality of content-receiving platforms;

identify a communication session initiated by a content consumer based on the content consumer interacting with the creator's content on the one of the plurality of content-receiving platforms;

create, based on the communication session initiated by the content consumer, a private communication channel that connects the content consumer exclusively to the content creator, wherein the private communication channel includes a citation of the creator's content interacted by the content consumer;

identify a service structure for controlling communications between the content consumer and the content creator through the private communication channel;

enable transmission of at least one communication from the content consumer to the content creator through the private communication channel based on the identified service structure;

based on the identified service structure, apply one or more assisted response techniques to assist the content creator in generating the response to the at least one communication, wherein the one or more assisted response techniques comprise:

generating a suggested answer to a question;

presenting the suggested answer to the content creator;

accessing feedback of the suggested answer from the content creator;

modifying the suggested answer based on the feedback from the content creator to generate a modified suggested answer; and as the response to the at least one communication, transmitting either the suggested answer or modified suggested answer from the content creator to the content consumer based on an approval of the modified suggested answer from the content creator.

12. The system of claim 11, wherein the service structure comprises paying to receive a response from the content creator, wherein the at least one processor is further configured to:

select a payment amount to charge for receiving the response from the content creator;

facilitate charging the content consumer the payment amount; and enable transmission of the response from the content creator to the content consumer through the private communication channel based on tendering of the payment amount by the content consumer.

13. The system of claim 12, wherein the payment amount is selected based on an urgency of the content consumer in receiving the response from the content creator.

14. The system of claim 13, wherein the at least one processor is configured to:

present the payment amount to the content consumer;

present an expected response time for receiving the response from the content creator based on the payment amount; and notify the content creator of the expected response time if the payment amount is tendered by the content consumer.

15. A non-transitory computer-readable medium comprising instructions, the instructions, when executed by a computer system, cause the computing system to:

enroll a content creator in a centralized messaging platform, wherein the centralized messaging platform is a communication service for directly communicating with content consumers that each consume the creator's content on one of a plurality of content-receiving platforms;

identify a communication session initiated by a content consumer based on the content consumer interacting with the creator's content on the one of the plurality of content-receiving platforms;

create, based on the communication session initiated by the content consumer, a private communication channel that connects the content consumer exclusively to the content creator, wherein the private communication channel includes a citation of the creator's content interacted by the content consumer;

identify a service structure for controlling communications between the content consumer and the content creator through the private communication channel;

enable transmission of at least one communication from the content consumer to the content creator through the private communication channel based on the identified service structure;

based on the identified service structure, apply one or more assisted response techniques to assist the content creator in generating the response to the at least one communication, wherein the one or more assisted response techniques comprise:

generating a suggested answer to a question;

presenting the suggested answer to the content creator;

accessing feedback of the suggested answer from the content creator;

modifying the suggested answer based on the feedback from the content creator to generate a modified suggested answer; and as the response to the at least one communication, transmitting either the suggested answer or modified suggested answer from the content creator to the content consumer based on an approval of the modified suggested answer from the content creator.

16. The non-transitory computer-readable medium of claim 15, wherein the service structure comprises paying to receive a response from the content creator, wherein the non-transitory computer-readable medium further comprises instructions that, when executed by the computing system, cause the computing system to:

select a payment amount to charge for receiving the response from the content creator;

facilitate charging the content consumer the payment amount; and enable transmission of the response from the content creator to the content consumer through the private communication channel based on tendering of the payment amount by the content consumer.

17. The non-transitory computer-readable medium of claim 16, wherein the payment amount is selected based on an urgency of the content consumer in receiving the response from the content creator.

18. The non-transitory computer-readable medium of claim 17, wherein the non-transitory computer-readable medium further comprises instructions that, when executed by the computing system, cause the computing system to:

present the payment amount to the content consumer;

present an expected response time for receiving the response from the content creator based on the payment amount; and notify the content creator of the expected response time if the payment amount is tendered by the content consumer.

19. The non-transitory computer-readable medium of claim 16, wherein the payment amount is selected through application of a machine learning model.

20. The non-transitory computer-readable medium of claim 16, wherein the service structure comprises providing the response from the content creator to the content consumer while facilitating tendering of a gratuity from the content consumer to the content creator.

* * * * *